(12) United States Patent
Dawson et al.

(10) Patent No.: US 12,132,286 B2
(45) Date of Patent: *Oct. 29, 2024

(54) CONNECTOR SYSTEM FOR A COMPONENT IN A POWER MANAGEMENT SYSTEM IN A MOTOR VEHICLE

(71) Applicant: Eaton Intelligent Power Limited, Dublin (IE)

(72) Inventors: James Dawson, Carol Stream, IL (US); Jeffrey Chojnacki, Carol Stream, IL (US); Jason Degen, Carol Stream, IL (US); Brantley Natter, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,373

(22) Filed: Jul. 31, 2023

(65) Prior Publication Data

US 2024/0030668 A1    Jan. 25, 2024

Related U.S. Application Data

(63) Continuation of application No. 17/505,534, filed on Oct. 19, 2021, now Pat. No. 11,721,942, which is a
(Continued)

(51) Int. Cl.
*B60L 53/20* (2019.01)
*H01R 13/506* (2006.01)
(Continued)

(52) U.S. Cl.
CPC ............ *H01R 31/065* (2013.01); *B60L 53/20* (2019.02); *H01R 13/506* (2013.01); *H01R 13/5219* (2013.01)

(58) Field of Classification Search
None
See application file for complete search history.

(56) References Cited

U.S. PATENT DOCUMENTS

| 4,201,438 A | 5/1980 | Shea |
| 4,416,504 A | 11/1983 | Sochor |

(Continued)

FOREIGN PATENT DOCUMENTS

| CN | 1722537 A | 1/2006 |
| CN | 102714369 A | 10/2012 |

(Continued)

OTHER PUBLICATIONS

Website entitled High Power Lock Box, available at :<https://web.archive.org/web/20200812181656/https://royalpowersolutions.com/products/battery-power-electronics/high-power-lock-box> (Royal Power Solutions) Aug. 12, 2020.
(Continued)

*Primary Examiner* — Tho D Ta
(74) *Attorney, Agent, or Firm* — Meunier Carlin & Curfman LLC

(57) ABSTRACT

The present disclosure relates to a connector system that provides a sealed and grounded electrical connection for a component of a power management system, like those found in a battery-powered motor vehicle. The connector system includes a male connector assembly and an adaptor assembly. The adaptor assembly includes: (i) a capacitor assembly, (ii) a female terminal assembly, and (iii) a busbar assembly. An internal electrical connection state is defined when: (a) the female terminal assembly is electrically coupled to the capacitor assembly, (b) the capacitor assembly is electrically coupled to the busbar assembly, and (c) the busbar assembly is electrically coupled to an extent of the component of the power management system. In the internal electrical connection state, the electrical couplings are sealed from the
(Continued)

external environment which increases the operating life, durability and reliability of the adaptor assembly, the connector system and the power management system component.

20 Claims, 63 Drawing Sheets

Related U.S. Application Data continuation of application No. PCT/US2021/033446, filed on May 20, 2021, which is a continuation-in-part of application No. PCT/US2020/049870, filed on Sep. 9, 2020.

(60) Provisional application No. 62/897,658, filed on Sep. 9, 2019.

(51) Int. Cl.
  *H01R 13/52* (2006.01)
  *H01R 31/06* (2006.01)

(56) References Cited

U.S. PATENT DOCUMENTS

| | | |
|---|---|---|
| 4,534,610 A | 8/1985 | Takihara |
| 4,540,235 A | 9/1985 | Lolic |
| 4,583,812 A | 4/1986 | Gross, Jr. |
| 4,593,464 A | 6/1986 | Williams |
| 4,632,483 A | 12/1986 | Verin |
| 4,713,018 A | 12/1987 | Sutton |
| 4,895,531 A | 1/1990 | Vignoli |
| 4,902,244 A | 2/1990 | Endo |
| 4,932,877 A | 6/1990 | Zinn |
| 4,938,720 A | 7/1990 | Romak |
| 4,975,066 A | 12/1990 | Sucheski |
| 4,983,127 A | 1/1991 | Kawai |
| 5,007,865 A | 4/1991 | Jakobeit |
| 5,035,661 A | 7/1991 | Steinhardt |
| 5,042,433 A | 8/1991 | Monnier |
| 5,062,918 A | 11/1991 | Zodrow |
| 5,094,636 A | 3/1992 | Zinn |
| 5,102,752 A | 4/1992 | Hope |
| 5,120,255 A | 6/1992 | Kouda |
| 5,162,004 A | 11/1992 | Kuzuno |
| 5,169,336 A | 12/1992 | Taguchi |
| 5,188,545 A | 2/1993 | Hass |
| 5,240,439 A | 8/1993 | Egenolf |
| 5,273,766 A | 12/1993 | Long |
| 5,288,252 A | 2/1994 | Steinhardt |
| 5,295,873 A | 3/1994 | Walbrecht |
| 5,334,058 A | 8/1994 | Hotea |
| 5,338,229 A | 8/1994 | Egenolf |
| 5,361,377 A | 11/1994 | Miller |
| 5,362,262 A | 11/1994 | Hotea |
| 5,391,097 A | 2/1995 | Kerul |
| 5,415,571 A | 5/1995 | Lutsch |
| 5,419,723 A | 5/1995 | Villiers |
| 5,437,566 A | 8/1995 | Zinn |
| 5,486,123 A | 1/1996 | Miyazaki |
| 5,536,184 A | 7/1996 | Wright |
| 5,551,897 A | 9/1996 | Alwine |
| 5,562,506 A | 10/1996 | Wright |
| 5,573,434 A | 11/1996 | Ittah |
| 5,607,328 A | 3/1997 | Joly |
| 5,624,283 A | 4/1997 | Hotea |
| 5,664,972 A | 9/1997 | Zinn |
| 5,716,245 A | 2/1998 | Kameyama |
| 5,810,627 A | 9/1998 | Gierut |
| 5,827,094 A | 10/1998 | Aizawa |
| 5,863,225 A | 1/1999 | Liebich |
| 5,868,590 A | 2/1999 | Dobbelaere |
| 5,938,485 A | 8/1999 | Hotea |
| 5,941,740 A | 8/1999 | Neuer |
| 5,951,338 A | 9/1999 | Seko |
| 5,954,548 A | 9/1999 | Stabroth |
| 5,966,291 A | 10/1999 | Hermann |
| 5,975,964 A | 11/1999 | Seko |
| 5,980,336 A | 11/1999 | Hall |
| 6,042,433 A | 3/2000 | Chen |
| 6,062,918 A | 5/2000 | Myer |
| 6,095,867 A | 8/2000 | Brandt |
| 6,102,752 A | 8/2000 | Bommel |
| 6,126,495 A | 10/2000 | Lolic |
| 6,186,840 B1 | 2/2001 | Geltsch |
| 6,257,931 B1 | 7/2001 | Sakurai |
| 6,261,116 B1 | 7/2001 | Ceru |
| 6,273,766 B1 | 8/2001 | Zennamo, Jr. |
| 6,361,377 B1 | 3/2002 | Saka |
| 6,371,813 B2 | 4/2002 | Ramey |
| 6,390,830 B1 | 5/2002 | Onizuka |
| 6,394,858 B1 | 5/2002 | Geltsch |
| 6,402,571 B1 | 6/2002 | Muller |
| 6,475,040 B1 | 11/2002 | Myer |
| 6,514,098 B2 | 2/2003 | Marpoe, Jr. |
| 6,561,841 B2 | 5/2003 | Norwood |
| 6,565,396 B2 | 5/2003 | Saka |
| 6,679,736 B2 | 1/2004 | Saka |
| 6,695,644 B2 | 2/2004 | Zhao |
| 6,722,926 B2 | 4/2004 | Chevassus-More |
| 6,761,577 B1 | 7/2004 | Koehler |
| 6,814,625 B2 | 11/2004 | Richmond |
| 6,824,170 B2 | 11/2004 | Lee |
| 6,872,103 B1 | 3/2005 | Flieger |
| 6,921,283 B2 | 7/2005 | Zahlit |
| 6,994,600 B2 | 2/2006 | Coulon |
| 7,014,515 B2 | 3/2006 | Lutsch |
| 7,150,660 B2 | 12/2006 | Allgood |
| 7,175,488 B2 | 2/2007 | Pavlovic |
| 7,192,318 B2 | 3/2007 | Hotea |
| 7,278,891 B2 | 10/2007 | Cvasa |
| 7,300,319 B2 | 11/2007 | Lutsch |
| 7,314,377 B2 | 1/2008 | Northey |
| 7,329,132 B1 | 2/2008 | Kamath |
| 7,329,158 B1 | 2/2008 | Roberts |
| 7,338,305 B2 | 3/2008 | Norwood |
| 7,491,100 B2 | 2/2009 | Johannes |
| 7,494,352 B2 | 2/2009 | Furio |
| 7,497,723 B2 | 3/2009 | Brassell |
| 7,503,776 B1 | 3/2009 | Pavlovic |
| 7,520,773 B2 | 4/2009 | Siebens |
| 7,563,133 B2 | 7/2009 | Stein |
| 7,568,921 B2 | 8/2009 | Pavlovic |
| 7,595,715 B2 | 9/2009 | Pavlovic |
| 7,613,003 B2 | 11/2009 | Pavlovic |
| 7,647,954 B2 | 1/2010 | Garber |
| 7,651,344 B2 | 1/2010 | Wu |
| 7,682,180 B2 | 3/2010 | Brown |
| 7,713,096 B2 | 5/2010 | Pavlovic |
| 7,758,369 B2 | 7/2010 | Miller |
| 7,766,706 B2 | 8/2010 | Kawamura |
| 7,780,489 B2 | 8/2010 | Stuklek |
| 7,837,519 B2 | 11/2010 | Copper |
| 7,874,851 B2 | 1/2011 | Shimizu |
| 7,876,193 B2 | 1/2011 | Pavlovic |
| 7,892,050 B2 | 2/2011 | Pavlovic |
| 7,927,127 B1 | 4/2011 | Glick |
| 7,942,682 B2 | 5/2011 | Copper |
| 7,942,683 B2 | 5/2011 | Copper |
| 7,963,782 B2 | 6/2011 | Hughes |
| 7,976,351 B2 | 7/2011 | Boemmel |
| 7,988,505 B2 | 8/2011 | Hotea |
| 8,111,052 B2 | 2/2012 | Glovinsky |
| 8,128,426 B2 | 3/2012 | Glick |
| 8,167,337 B2 | 5/2012 | Bruno |
| 8,202,124 B1 | 6/2012 | Natter |
| 8,206,175 B2 | 6/2012 | Boyd |
| 8,235,292 B2 | 8/2012 | Talboys |
| 8,242,874 B2 | 8/2012 | Pavlovic |
| 8,277,243 B1 | 10/2012 | Hernandez |
| 8,282,429 B2 | 10/2012 | Glick |
| 8,366,497 B2 | 2/2013 | Glick |

(56) References Cited

U.S. PATENT DOCUMENTS

| | | |
|---|---|---|
| 8,388,389 B2 | 3/2013 | Costello |
| 8,422,230 B2 | 4/2013 | Aiba |
| 8,430,689 B2 | 4/2013 | Myer |
| 8,446,733 B2 | 5/2013 | Hampo |
| 8,449,338 B2 | 5/2013 | Gong |
| 8,475,220 B2 | 7/2013 | Glick |
| 8,651,892 B2 | 2/2014 | Arant |
| 8,662,935 B2 | 3/2014 | Jouas |
| 8,668,506 B2 | 3/2014 | Stack |
| 8,678,867 B2 | 3/2014 | Glick |
| 8,758,043 B2 | 6/2014 | Ohyama |
| 8,795,007 B2 | 8/2014 | Itou |
| 8,840,436 B2 | 9/2014 | Mott |
| 8,858,264 B2 | 10/2014 | Mott |
| 8,858,274 B2 | 10/2014 | Jakoplic |
| 8,941,731 B2 | 1/2015 | Barba |
| 8,944,844 B2 | 2/2015 | Myer |
| 8,956,190 B2 | 2/2015 | Natter |
| 8,968,021 B1 | 3/2015 | Kennedy |
| 8,974,244 B2 | 3/2015 | Aihara |
| 8,992,270 B2 | 3/2015 | Glick |
| 8,998,655 B2 | 4/2015 | Glick |
| 9,011,186 B2 | 4/2015 | Wirth |
| 9,048,552 B2 | 6/2015 | Eyles |
| 9,059,542 B2 | 6/2015 | Oh |
| 9,077,114 B2 | 7/2015 | Oh |
| 9,142,902 B2 | 9/2015 | Glick |
| 9,166,322 B2 | 10/2015 | Glick |
| 9,190,756 B2 | 11/2015 | Glick |
| 9,225,116 B2 | 12/2015 | McKibben |
| 9,236,682 B2 | 1/2016 | Glick |
| 9,257,804 B1 | 2/2016 | Beck |
| 9,293,852 B2 | 3/2016 | Glick |
| 9,300,069 B2 | 3/2016 | Morello |
| 9,353,894 B2 | 5/2016 | Richards |
| 9,356,394 B2 | 5/2016 | Kennedy |
| 9,368,904 B2 | 6/2016 | Natter |
| 9,379,470 B2 | 6/2016 | Glick |
| 9,431,740 B2 | 8/2016 | Glick |
| 9,437,974 B2 | 9/2016 | Glick |
| 9,444,168 B2 | 9/2016 | Horiuchi |
| 9,444,205 B2 | 9/2016 | Rangi |
| 9,455,516 B2 | 9/2016 | Gutenschwager |
| 9,502,783 B2 | 11/2016 | Martin |
| 9,525,254 B2 | 12/2016 | Chen |
| 9,537,241 B2 | 1/2017 | Rivera |
| 9,548,553 B2 | 1/2017 | Glick |
| 9,583,860 B1 | 2/2017 | Dewitte |
| 9,608,369 B1 | 3/2017 | Brandt |
| 9,620,869 B2 | 4/2017 | Listing |
| 9,653,859 B1 | 5/2017 | Moore |
| 9,680,256 B1 | 6/2017 | Lane |
| 9,705,229 B2 | 7/2017 | Itou |
| 9,705,254 B2 | 7/2017 | Lampert |
| 9,711,885 B2 | 7/2017 | Hamai |
| 9,748,693 B1 | 8/2017 | Exenberger |
| 9,841,454 B2 | 12/2017 | Gelonese |
| 9,847,591 B2 | 12/2017 | Glick |
| 9,876,317 B2 | 1/2018 | Glick |
| 9,905,950 B2 | 2/2018 | Marsh |
| 9,905,953 B1 | 2/2018 | Pavlovic |
| 9,905,955 B2 | 2/2018 | Endo |
| 9,948,044 B2 | 4/2018 | Harris, III |
| 10,014,614 B2 | 7/2018 | Davies |
| 10,014,631 B1 | 7/2018 | Chambly |
| 10,038,278 B2 | 7/2018 | Lane |
| 10,044,140 B1 | 8/2018 | Gianrossi |
| 10,122,117 B2 | 11/2018 | Miller |
| 10,135,168 B2 | 11/2018 | Pavlovic |
| 10,178,754 B2 | 1/2019 | Kobayashi |
| 10,184,970 B2 | 1/2019 | Maalouf |
| 10,218,117 B1 | 2/2019 | Probert |
| 10,276,959 B2 | 4/2019 | Lehner |
| 10,283,889 B2 | 5/2019 | Glick |
| 10,355,414 B1 | 7/2019 | Alvarado |
| 10,594,058 B2 | 3/2020 | Kan |
| 10,693,252 B2 | 6/2020 | Pavlovic |
| 11,069,999 B2 | 7/2021 | Fisher |
| 11,223,150 B2 | 1/2022 | Pavlovic |
| 11,239,597 B2 | 2/2022 | Dawson et al. |
| 11,296,462 B2 | 4/2022 | Schneider et al. |
| 11,398,696 B2 | 7/2022 | Pavlovic |
| 11,411,336 B2 | 8/2022 | Pavlovic |
| 11,476,609 B2 | 10/2022 | Pavlovic |
| 11,721,942 B2 * | 8/2023 | Dawson ............ H01R 31/065 439/521 |
| 2001/0019924 A1 | 9/2001 | Heimueller |
| 2001/0021602 A1 | 9/2001 | Zanten |
| 2002/0016964 A1 | 2/2002 | Aratani |
| 2002/0019156 A1 | 2/2002 | Fukamachi |
| 2002/0049005 A1 | 4/2002 | Leve |
| 2002/0081888 A1 | 6/2002 | Regnier |
| 2002/0180272 A1 | 12/2002 | Yuasa |
| 2004/0150224 A1 | 8/2004 | Lee |
| 2005/0134037 A1 | 6/2005 | Bruno |
| 2005/0211934 A1 | 9/2005 | Garber |
| 2006/0040555 A1 | 2/2006 | Chen |
| 2006/0172618 A1 | 8/2006 | Yamashita |
| 2007/0123093 A1 | 5/2007 | Lutsch |
| 2007/0149050 A1 | 6/2007 | Oka |
| 2009/0197457 A1 | 8/2009 | Lanni |
| 2010/0056106 A1 | 3/2010 | Korhonen |
| 2011/0130023 A1 | 6/2011 | Kataoka |
| 2011/0168778 A1 | 7/2011 | Talboys |
| 2011/0171843 A1 | 7/2011 | Casses |
| 2012/0094551 A1 | 4/2012 | Corman |
| 2012/0129407 A1 | 5/2012 | Glick |
| 2012/0244756 A1 | 9/2012 | Jouas |
| 2013/0002102 A1 | 1/2013 | Chen |
| 2013/0004050 A1 | 1/2013 | Wu |
| 2013/0040505 A1 | 2/2013 | Hirakawa |
| 2013/0078874 A1 | 3/2013 | Itou |
| 2013/0109224 A1 | 5/2013 | Chin |
| 2013/0210292 A1 | 8/2013 | Schmidt |
| 2013/0215573 A1 | 8/2013 | Wagner |
| 2013/0337702 A1 | 12/2013 | Pavlovic |
| 2014/0087601 A1 | 3/2014 | Glick |
| 2014/0193995 A1 | 7/2014 | Barthelmes |
| 2014/0227915 A1 | 8/2014 | Glick |
| 2014/0244998 A1 | 8/2014 | Amenedo |
| 2015/0038000 A1 | 2/2015 | Glick |
| 2015/0072207 A1 | 3/2015 | Soleski |
| 2015/0074996 A1 | 3/2015 | Glick |
| 2015/0079859 A1 | 3/2015 | Glick |
| 2015/0162706 A1 | 6/2015 | Kennedy |
| 2015/0255912 A1 | 9/2015 | Natter |
| 2015/0255924 A1 | 9/2015 | Glick |
| 2015/0280381 A1 | 10/2015 | Rangi |
| 2015/0365400 A1 | 12/2015 | Cox |
| 2016/0028169 A1 | 1/2016 | Glick |
| 2016/0043505 A1 | 2/2016 | Wu |
| 2016/0336572 A1 | 11/2016 | Yoshida |
| 2017/0019381 A1 | 1/2017 | Khazan |
| 2017/0134424 A1 | 5/2017 | Egorov |
| 2017/0294764 A1 | 10/2017 | Shimizu |
| 2017/0338600 A1 | 11/2017 | Tanaka |
| 2018/0090900 A1 | 3/2018 | Horiuchi |
| 2018/0191095 A1 | 7/2018 | Pavlovic |
| 2018/0219305 A1 | 8/2018 | Wavering |
| 2018/0269624 A1 | 9/2018 | Iwabe |
| 2018/0351282 A1 | 12/2018 | Duan |
| 2019/0052025 A1 | 2/2019 | Buechli |
| 2019/0089083 A1 | 3/2019 | Pavlovic |
| 2019/0372262 A1 | 12/2019 | Christiano |
| 2020/0395700 A1 | 12/2020 | Pavlovic |
| 2021/0167538 A1 | 6/2021 | Pavlovic |
| 2022/0131299 A1 | 4/2022 | Pavlovic |

FOREIGN PATENT DOCUMENTS

| | | |
|---|---|---|
| CN | 103022756 | 4/2013 |
| CN | 103141000 | 6/2013 |
| CN | 203193080 | 9/2013 |
| CN | 2015100485492 | 5/2015 |

(56) References Cited

FOREIGN PATENT DOCUMENTS

| CN | 105225040 |   | 1/2016 |
|----|-----------|---|--------|
| CN | 206098831 | U | 4/2017 |
| CN | 206962160 |   | 2/2018 |
| CN | 107863610 |   | 3/2018 |
| CN | 111937250 |   | 11/2020 |
| DE | 4215162 | A1 | 12/1992 |
| DE | 4139100 | C1 | 1/1993 |
| DE | 19817924 |   | 10/1999 |
| DE | 102013211208 |   | 12/2014 |
| EP | 1291979 |   | 12/2004 |
| JP | H1040995 |   | 2/1998 |
| JP | H1050376 |   | 2/1998 |
| JP | H1050377 |   | 2/1998 |
| JP | 2011049107 |   | 3/2011 |
| JP | 2012043739 |   | 3/2012 |
| JP | 2016529675 | A | 9/2016 |
| JP | 2017010755 |   | 1/2017 |
| JP | 6989715 |   | 1/2022 |
| KR | 20160138442 |   | 12/2016 |
| WO | 2017195092 |   | 11/2017 |
| WO | 2019164536 |   | 8/2019 |
| WO | 2019229587 |   | 12/2019 |
| WO | 2019236976 |   | 12/2019 |
| WO | 2019237009 |   | 12/2019 |
| WO | 2019237046 |   | 12/2019 |
| WO | 2020150399 |   | 7/2020 |
| WO | 2021050499 |   | 3/2021 |

OTHER PUBLICATIONS

USCAR-2, Rev. 6.
USCAR-38, Rev. 1.
USCAR-37, Rev. 1.
USCAR-25, Rev. 3.
USCAR-21, Rev. 3.
USCAR-12, Rev. 5.
International Search Report and written Opinion issued in PCT/US2020/049870, dated Dec. 10, 2020, 20 pages.
International Search Report and Written Opinion issued in PCT/US21/33446, dated Aug. 24, 2021, 17 pages.
International Search Report from PCT/US2018/019787 dated Nov. 26, 2018 (3 pages).
Written Opinion from PCT/US2018/019787 dated Nov. 26, 2018 (10 pages).
International Search Report and Written Opinion issued in PCT/US2019/036070, dated Sep. 27, 2019, 8 pages.
International Search Report and Written Opinion issued in PCT/US2019/036010, dated Sep. 30, 2019, 13 pages.
International Search Report and written Opinion issued in PCT/US2019/036127, dated Oct. 4, 2019, 11 pages.
International Search Report and written Opinion issued in PCT/US20/013757, dated Dec. 10, 2020, 7 pages.
International Search Report and Written Opinion issued in PCT/US20/14484, dated Mar. 31, 2020, 7 pages.
Component of a DC Converter Assembly, Lincoln Aviator Part No. L1MZ14B227D (shorturl.at/nABE5), believed to be available before Jan. 2020.
International Search Report and Written Opinion issued in PCT/US21/43788, dated Dec. 23, 2021, 23 pages.
International Search Report and Written Opinion issued in PCT/US21/47180, dated Jan. 6, 2022, 18 pages.
International Search Report and Written Opinion issued in PCT/US21/43686, dated Dec. 23, 2021, 28 pages.
Office Action issued for U.S. Appl. No. 18/362,071, dated Feb. 8, 2024.

* cited by examiner

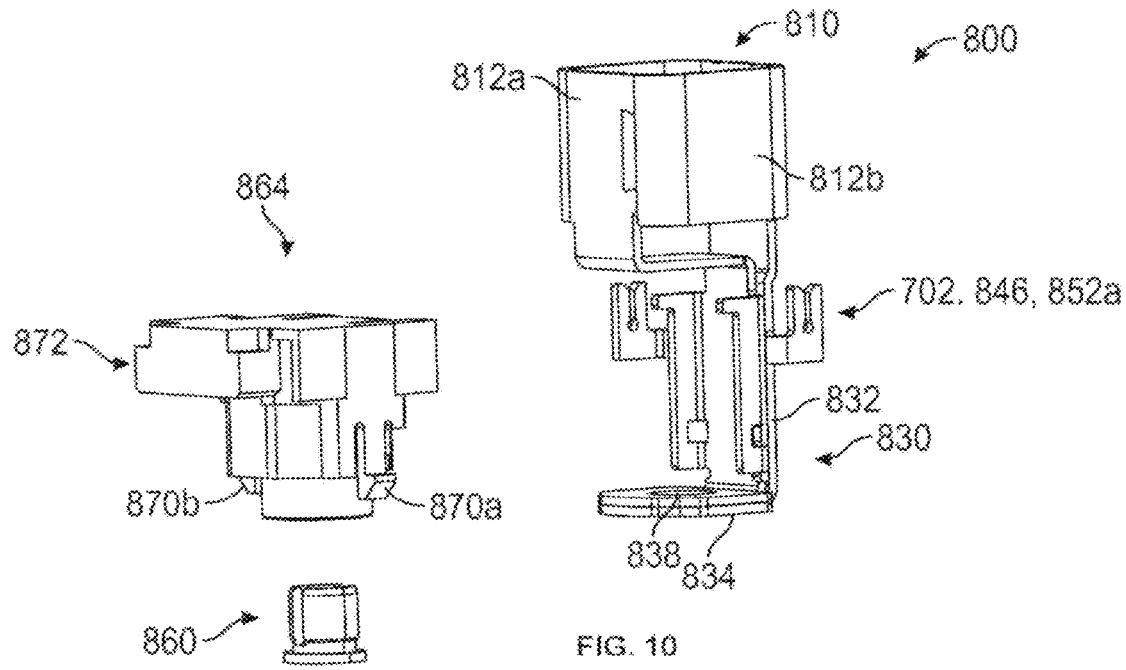
FIG. 10
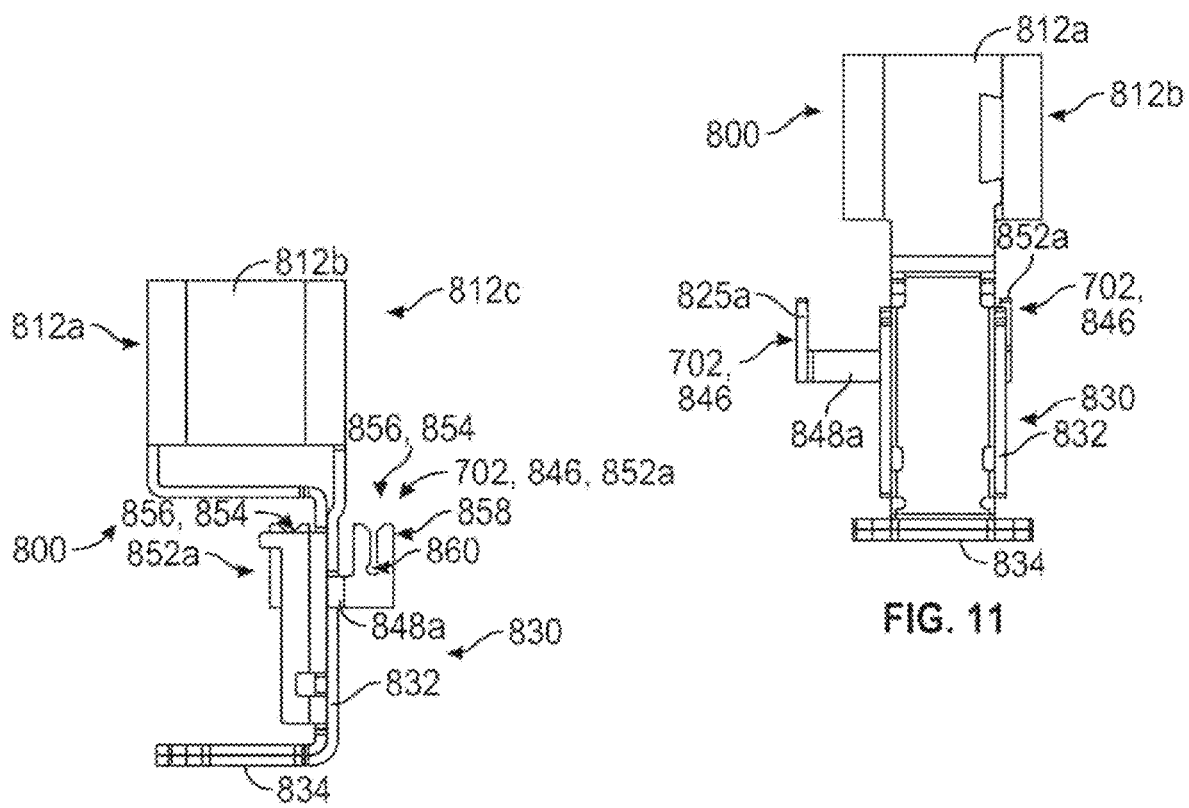
FIG. 12
FIG. 11

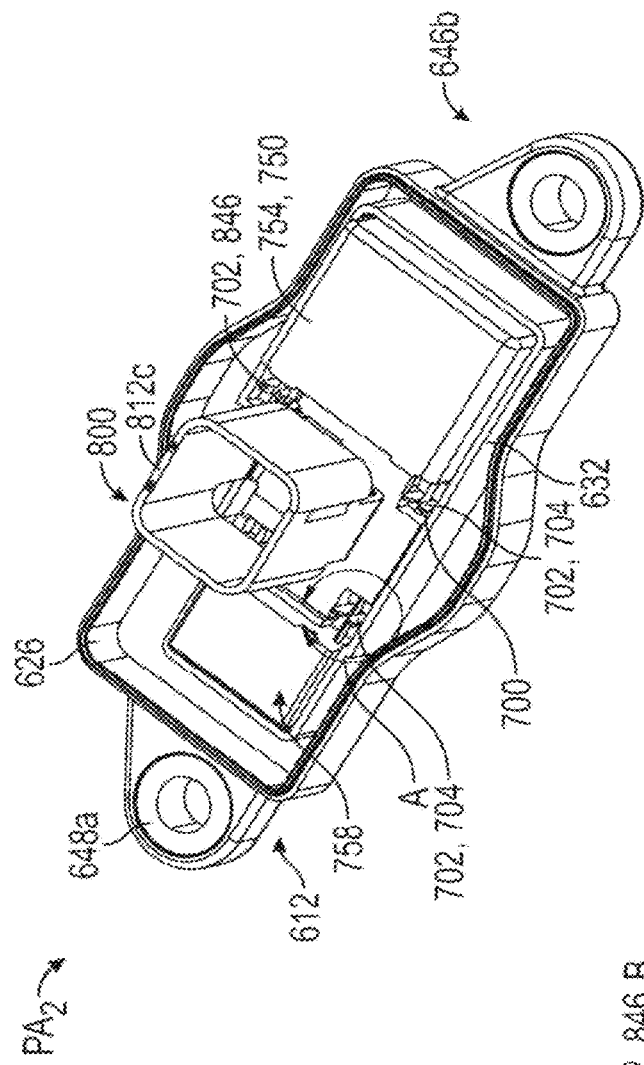
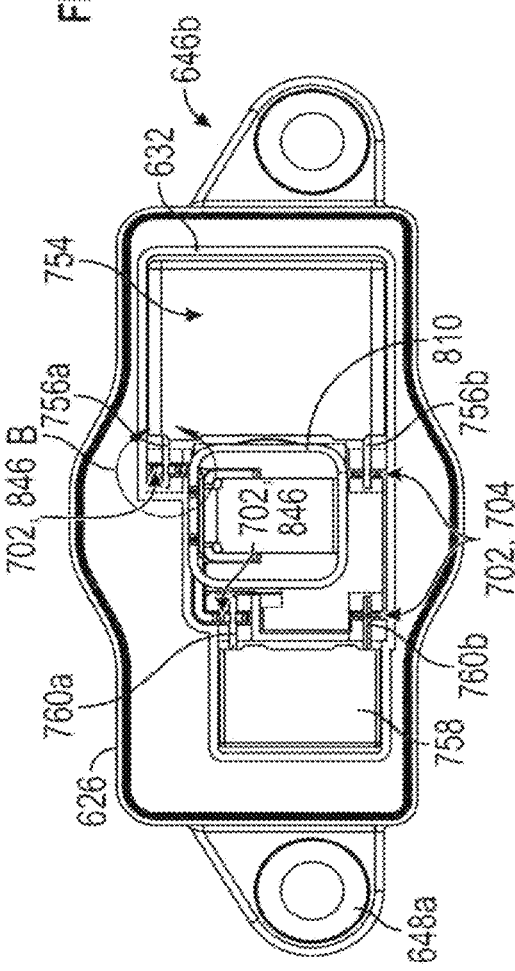
FIG. 26
FIG. 27

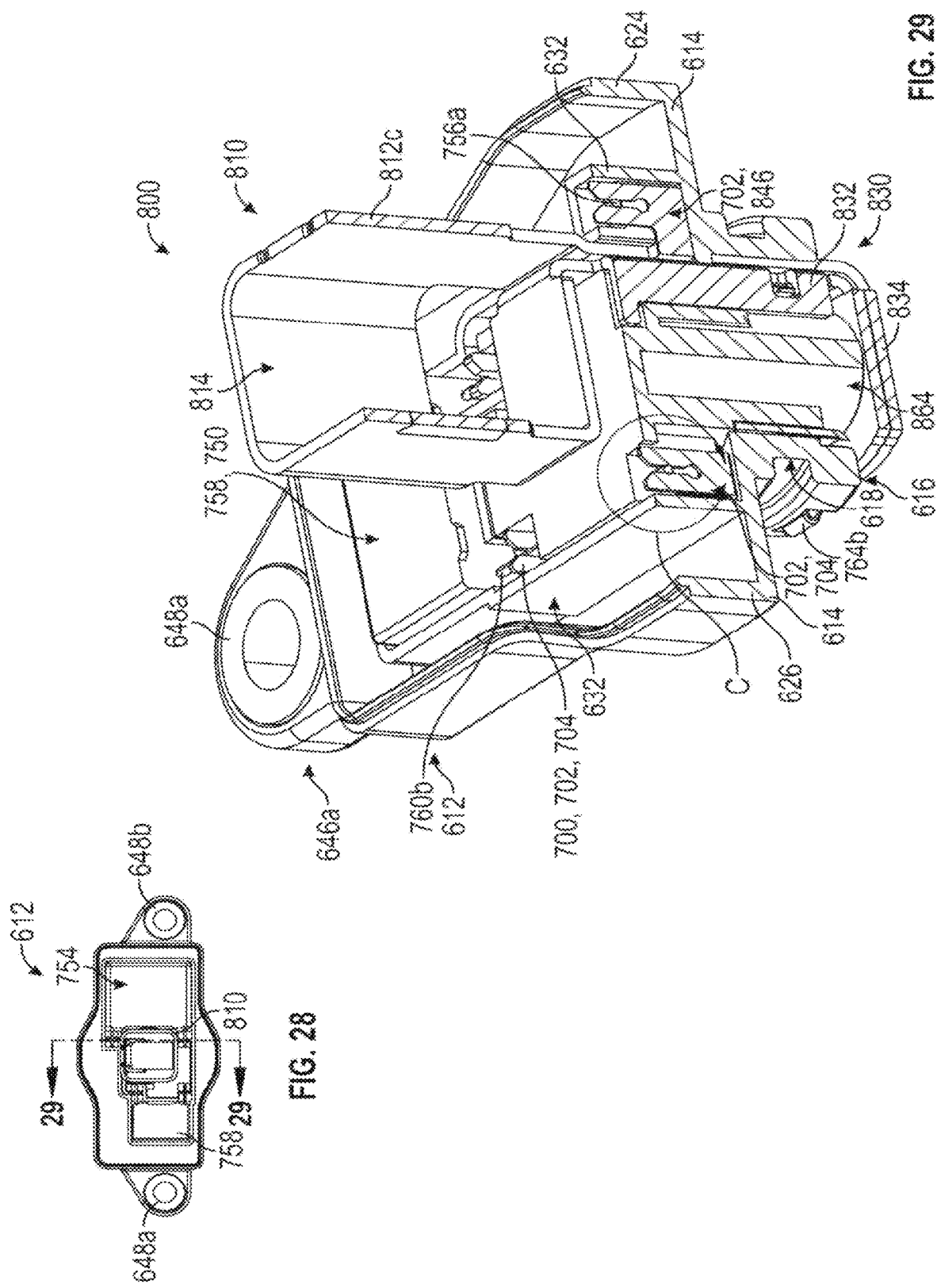

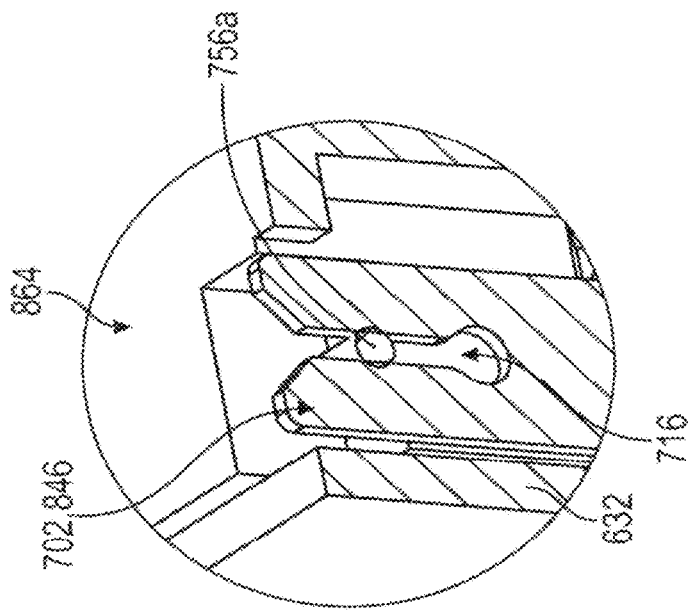
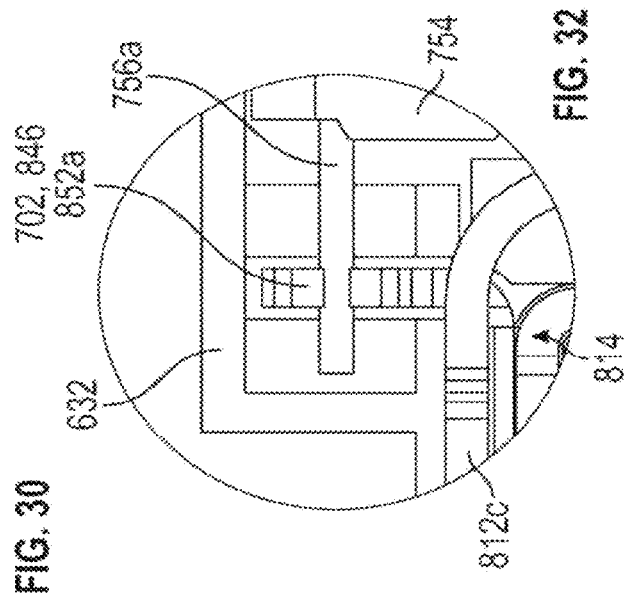
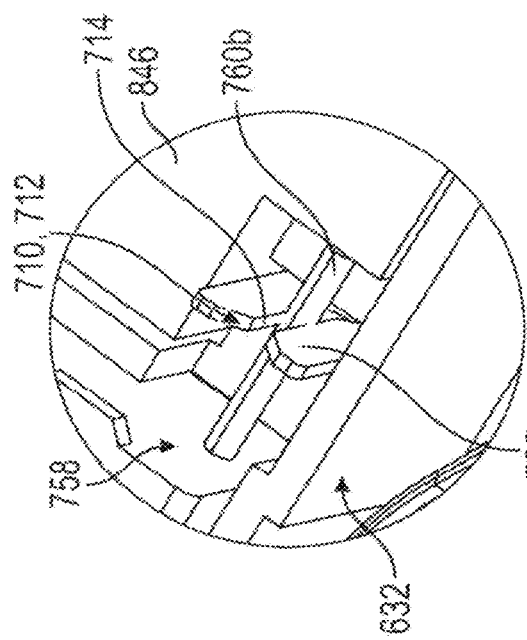

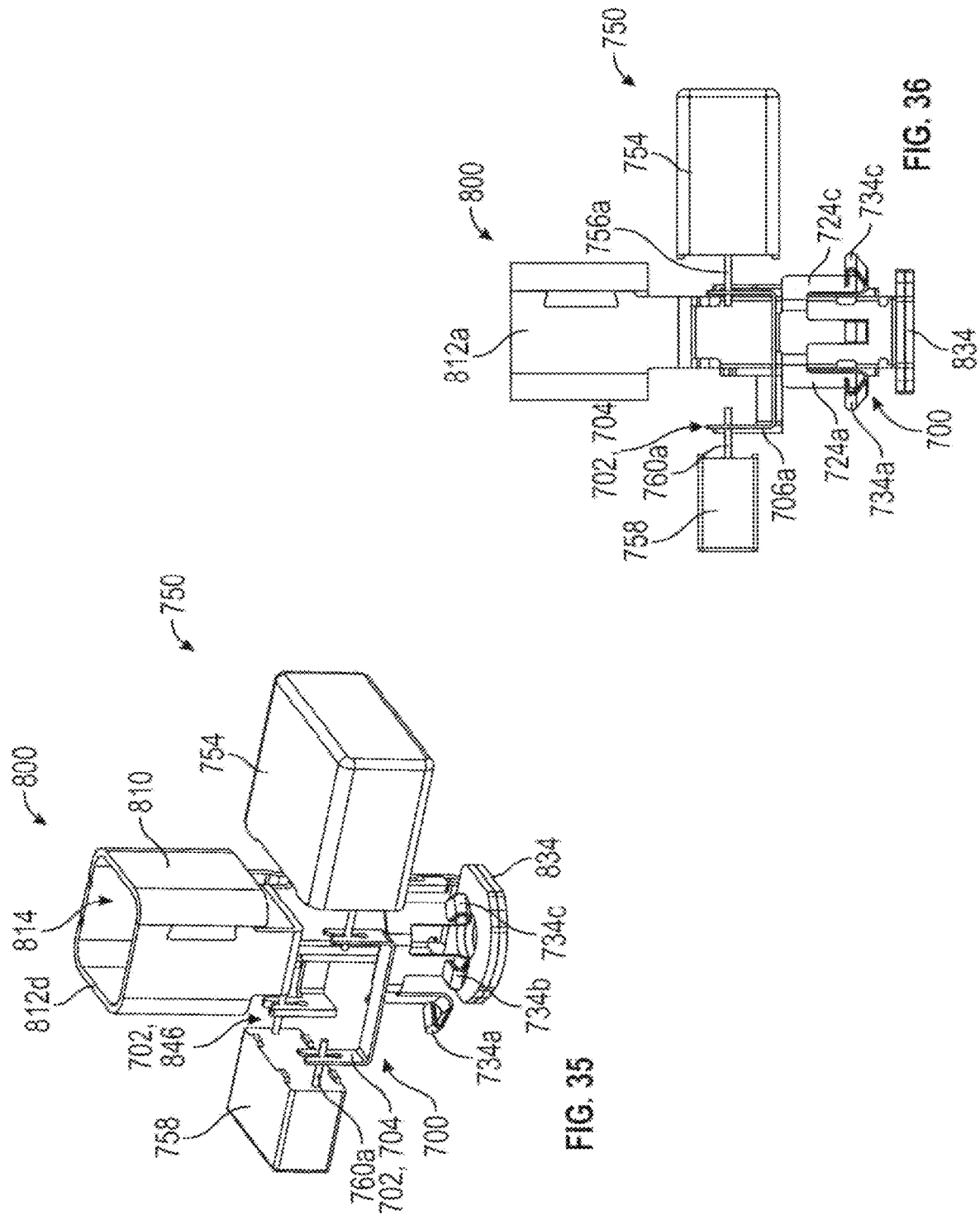

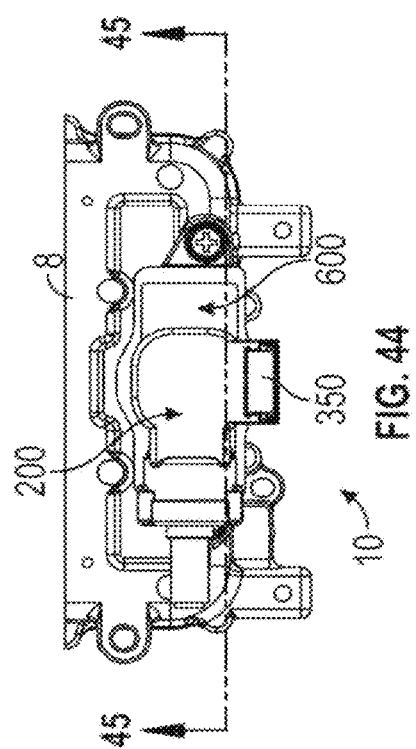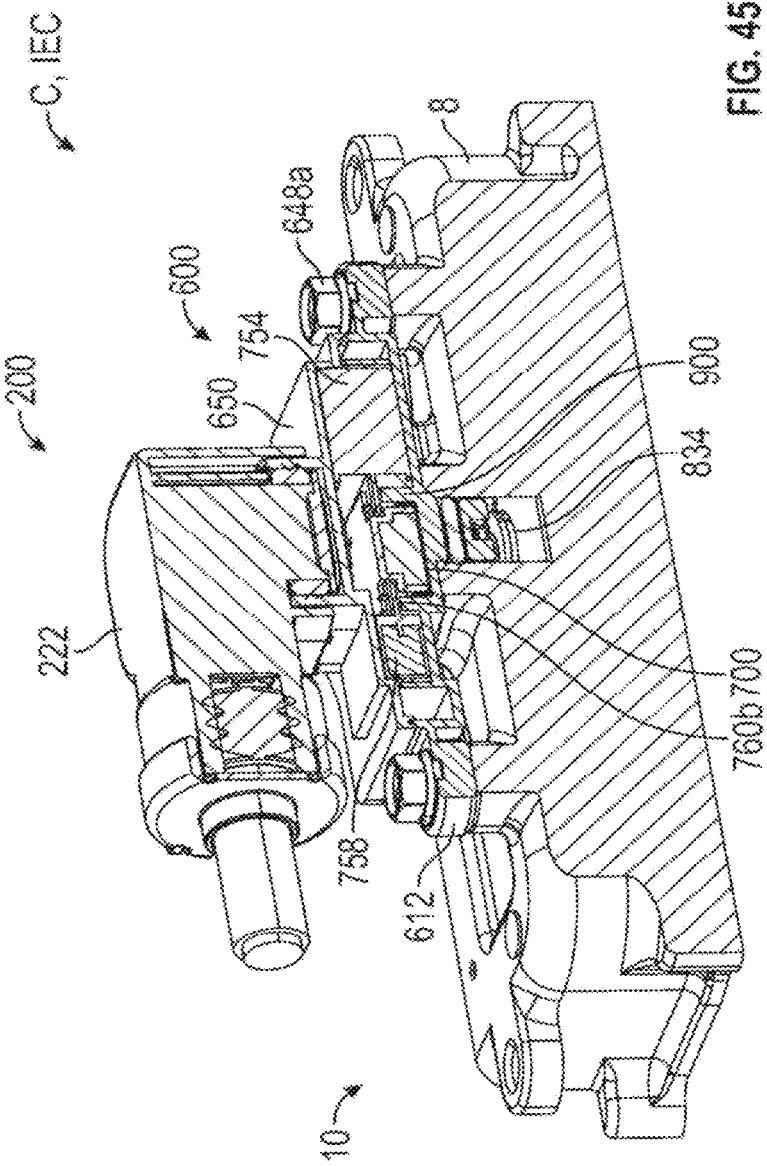

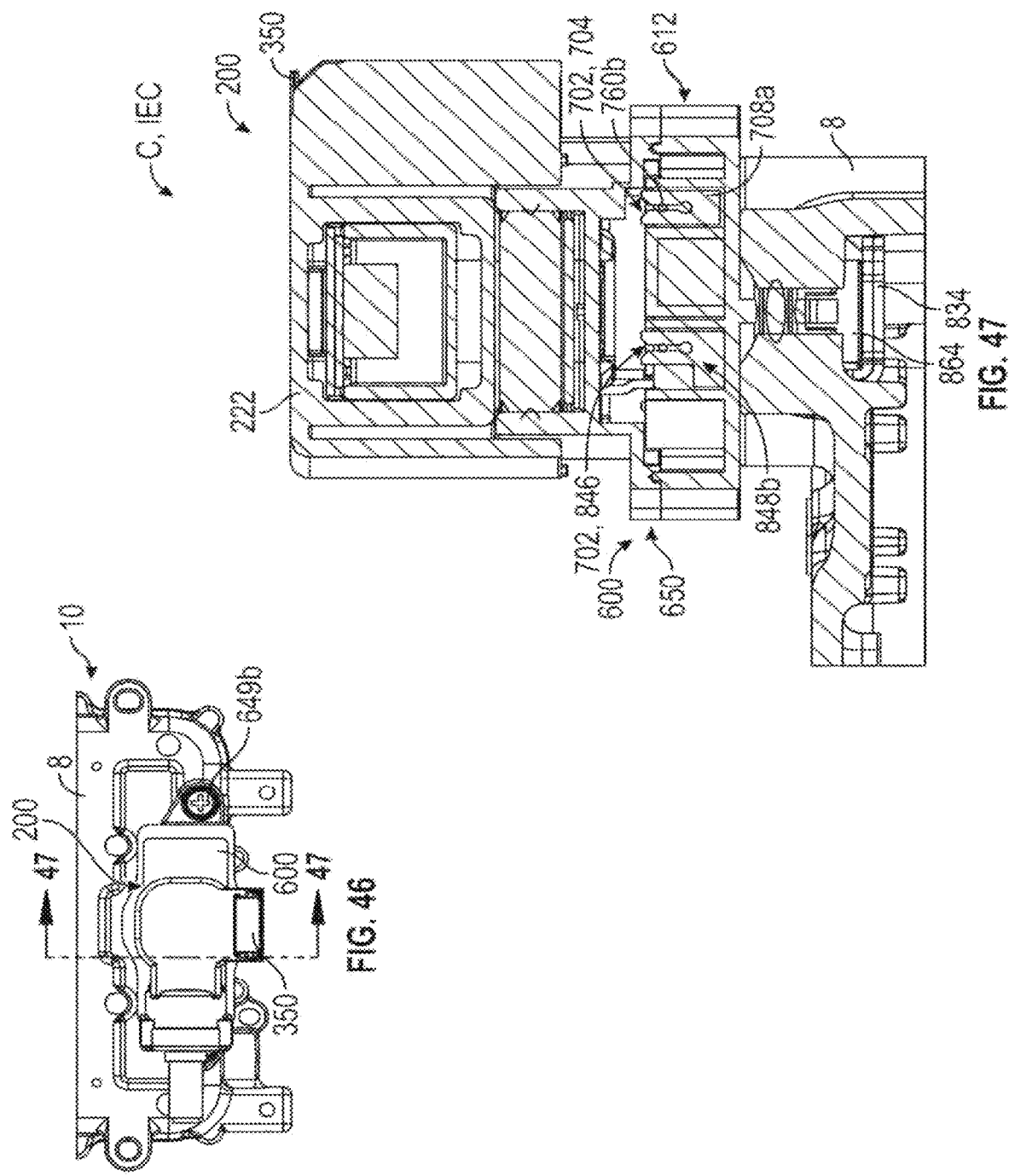

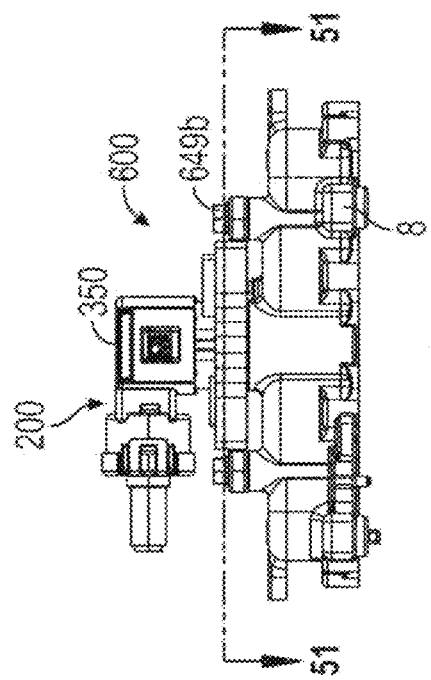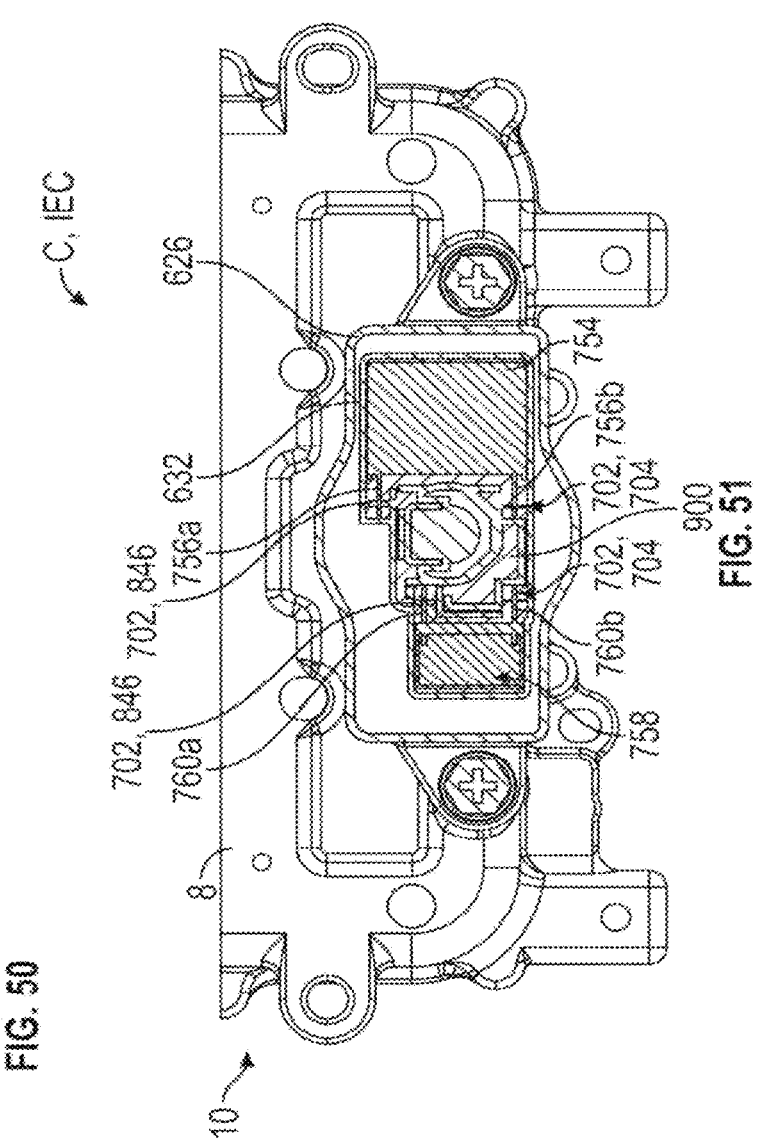

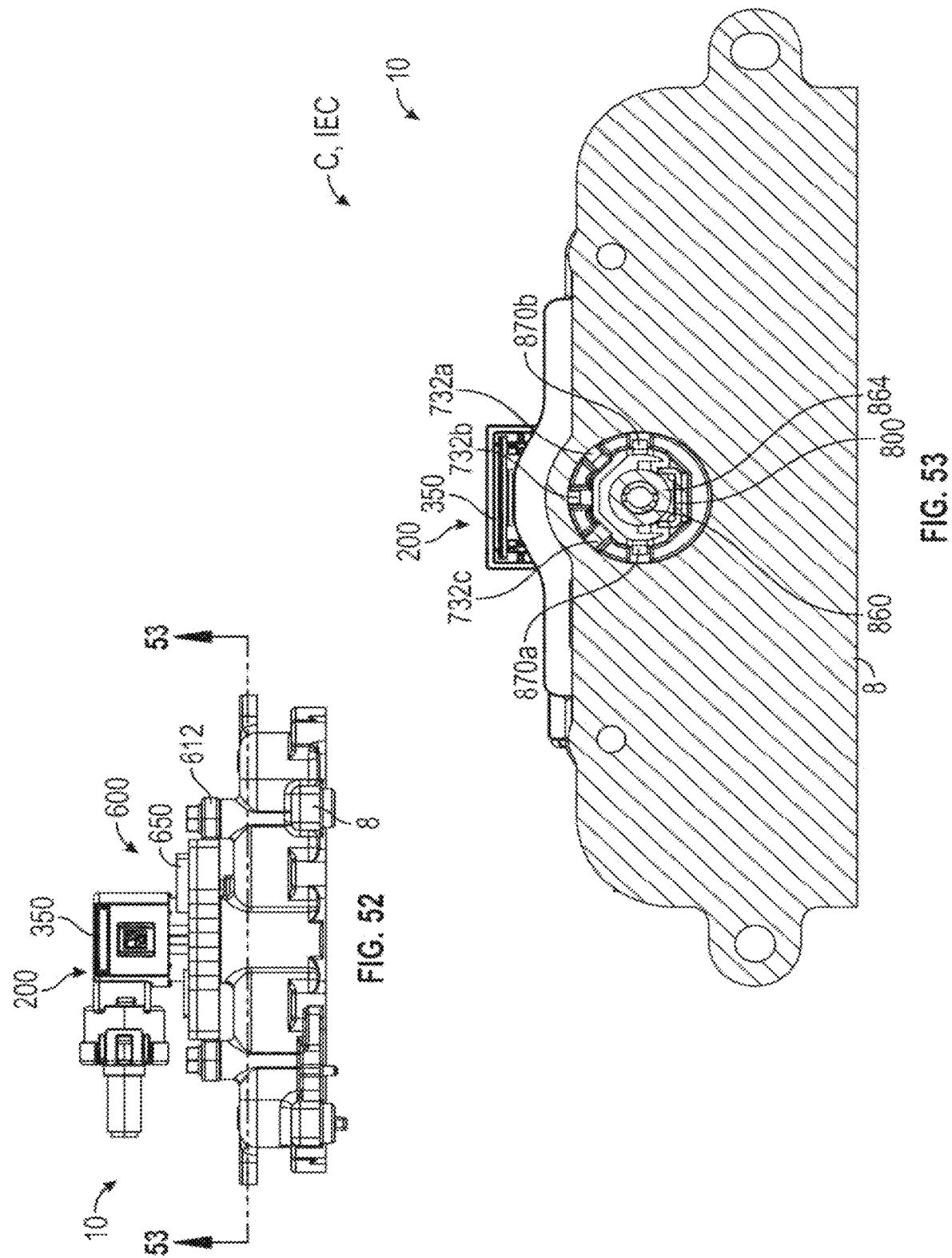

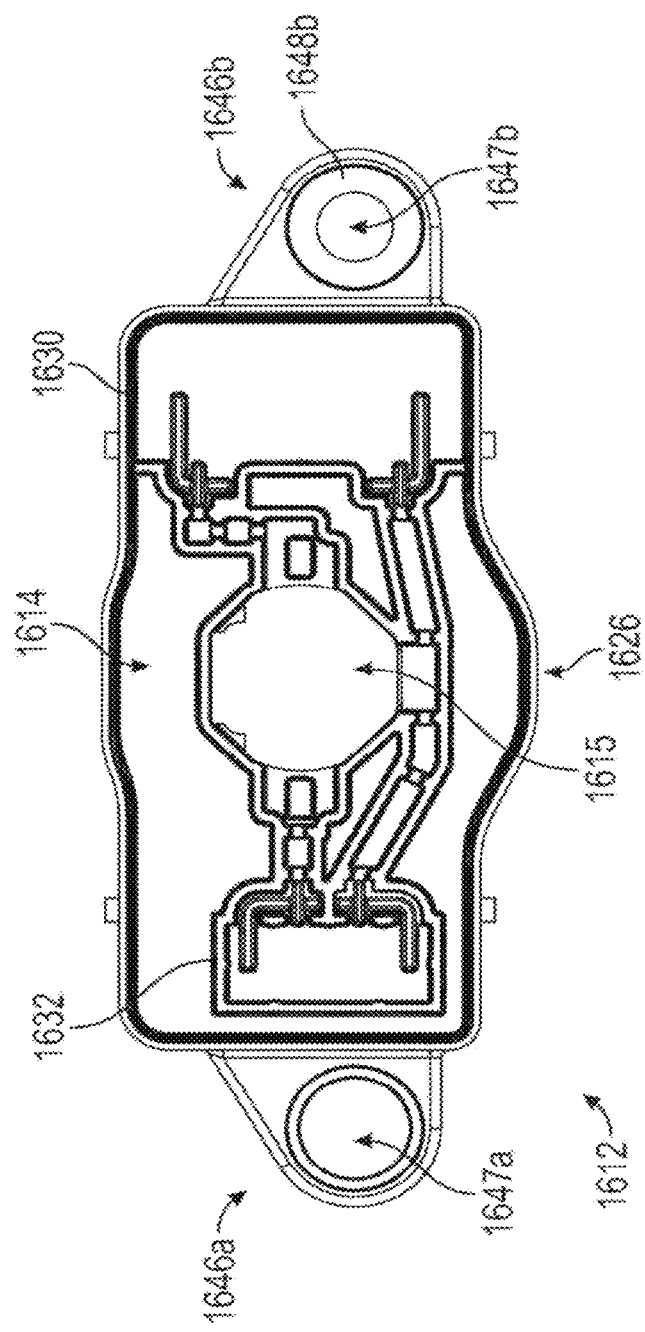
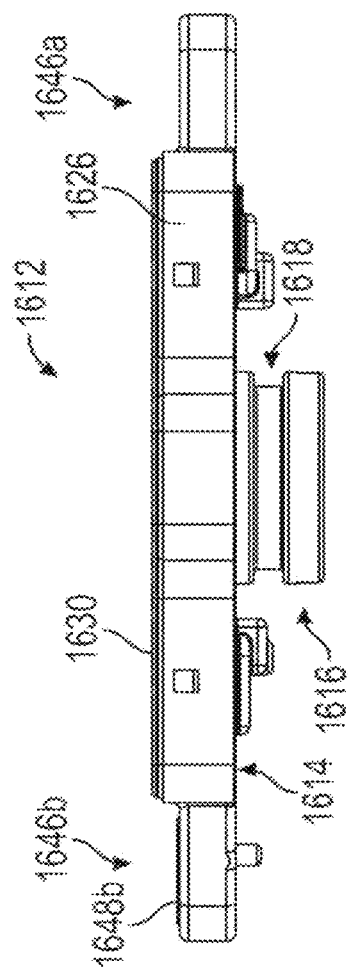
FIG. 58
FIG. 59

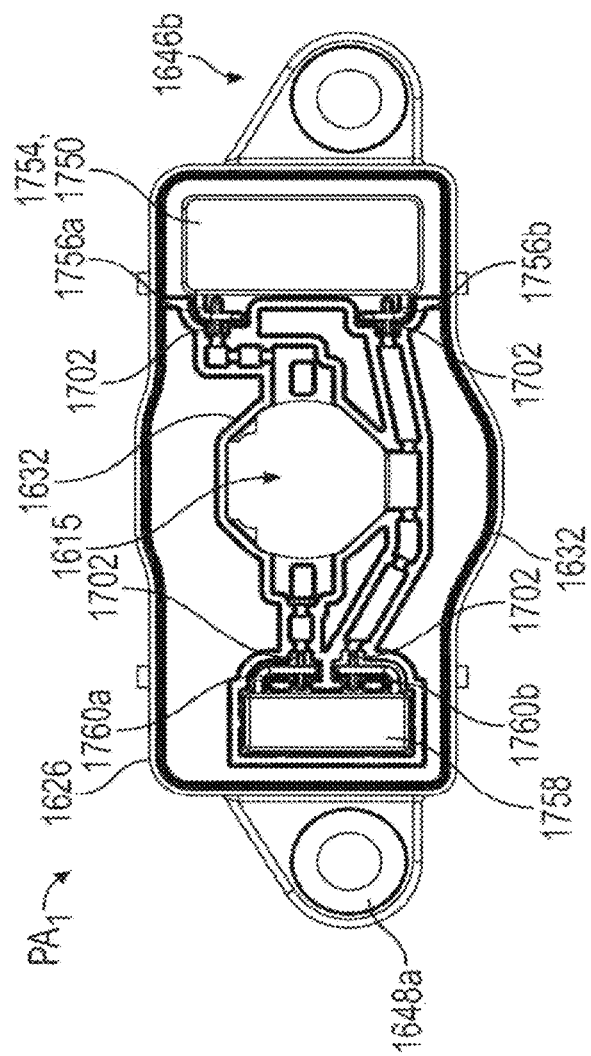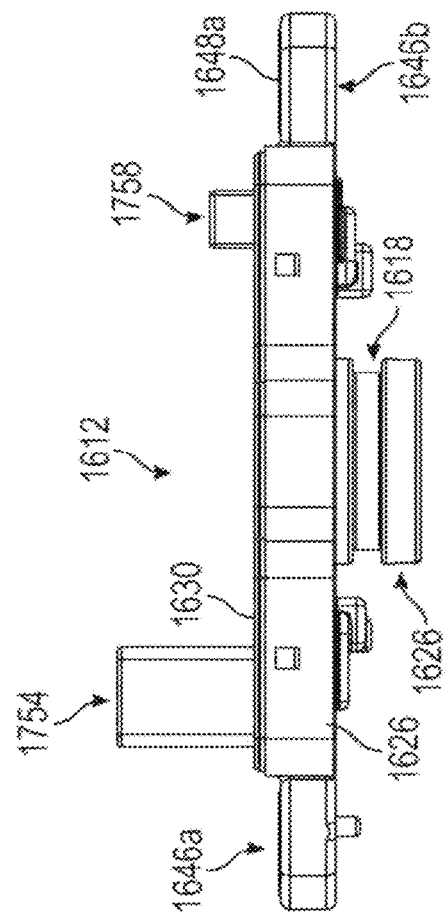

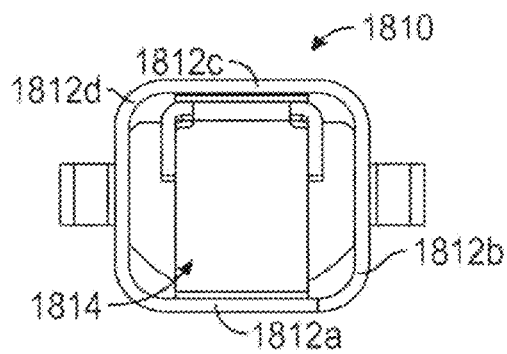
FIG. 83
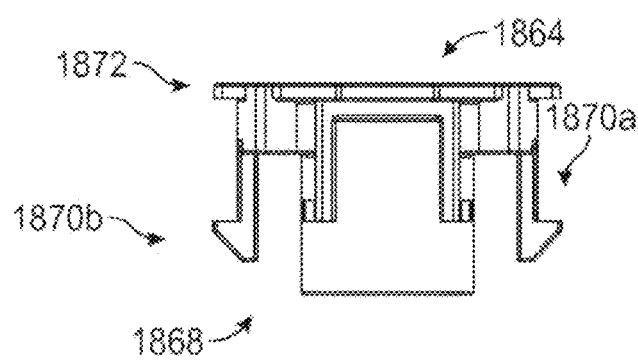
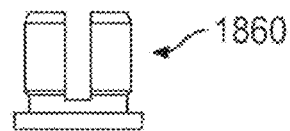
FIG. 84
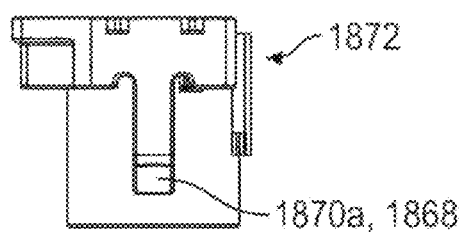
FIG. 85

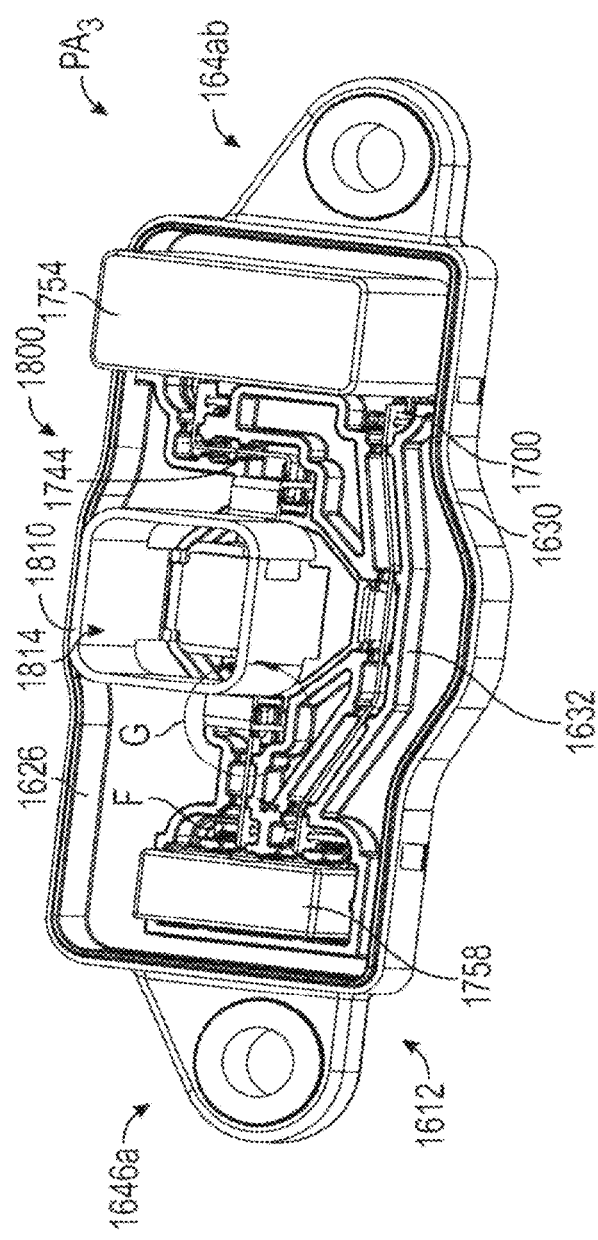
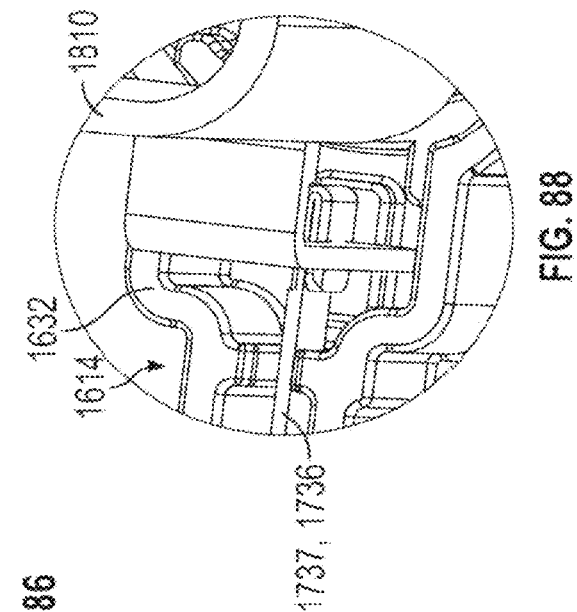
FIG. 86
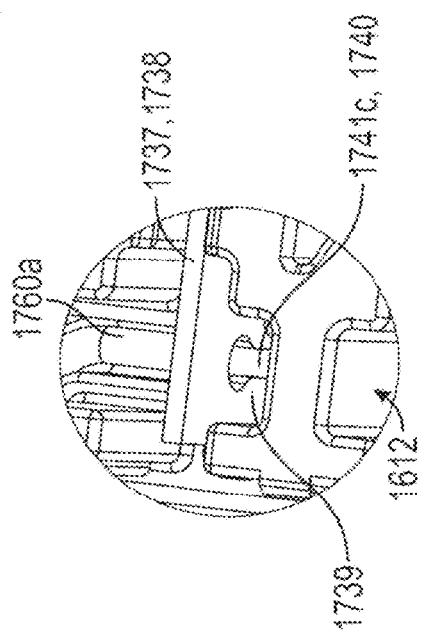
FIG. 87
FIG. 88

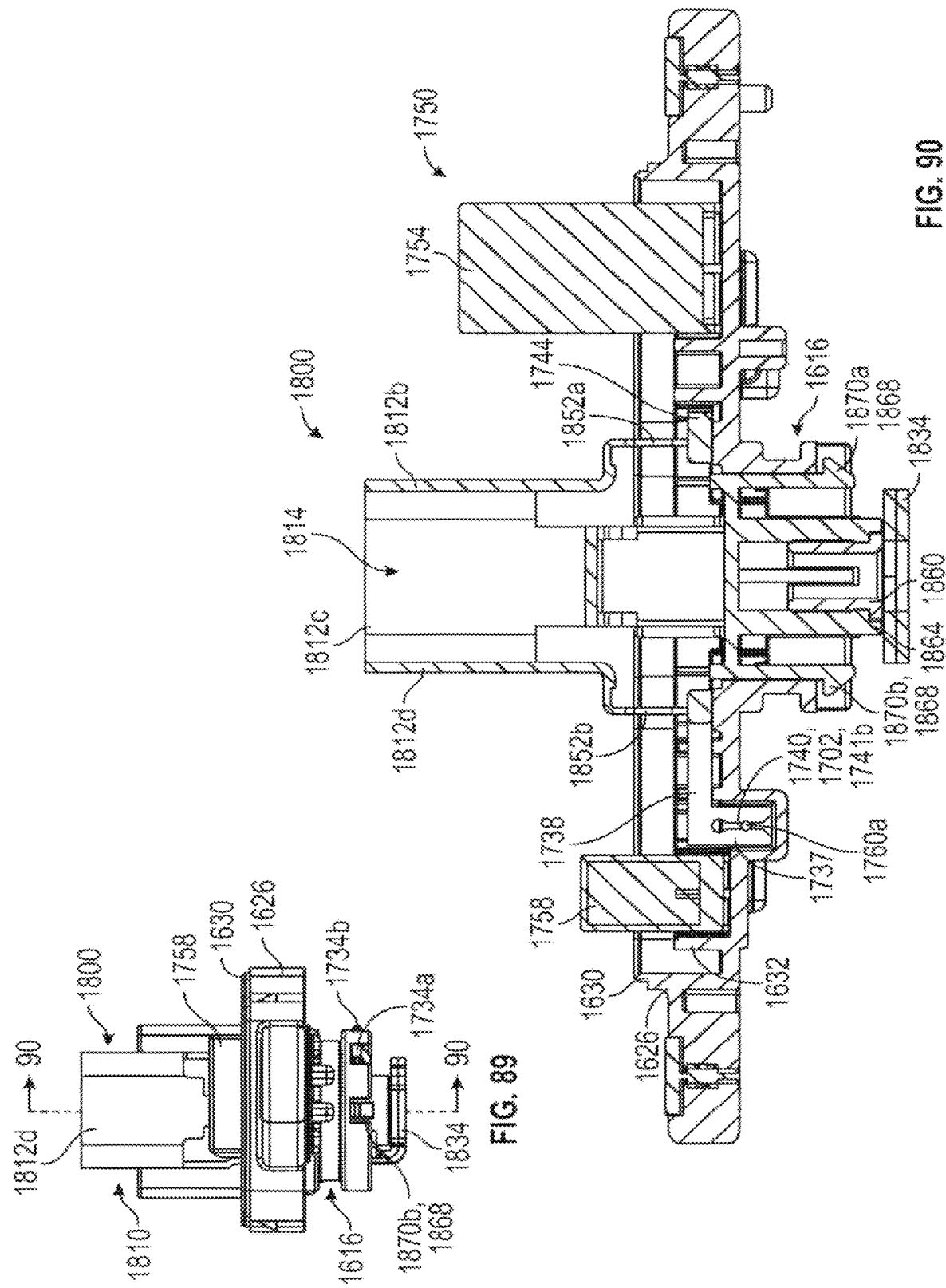

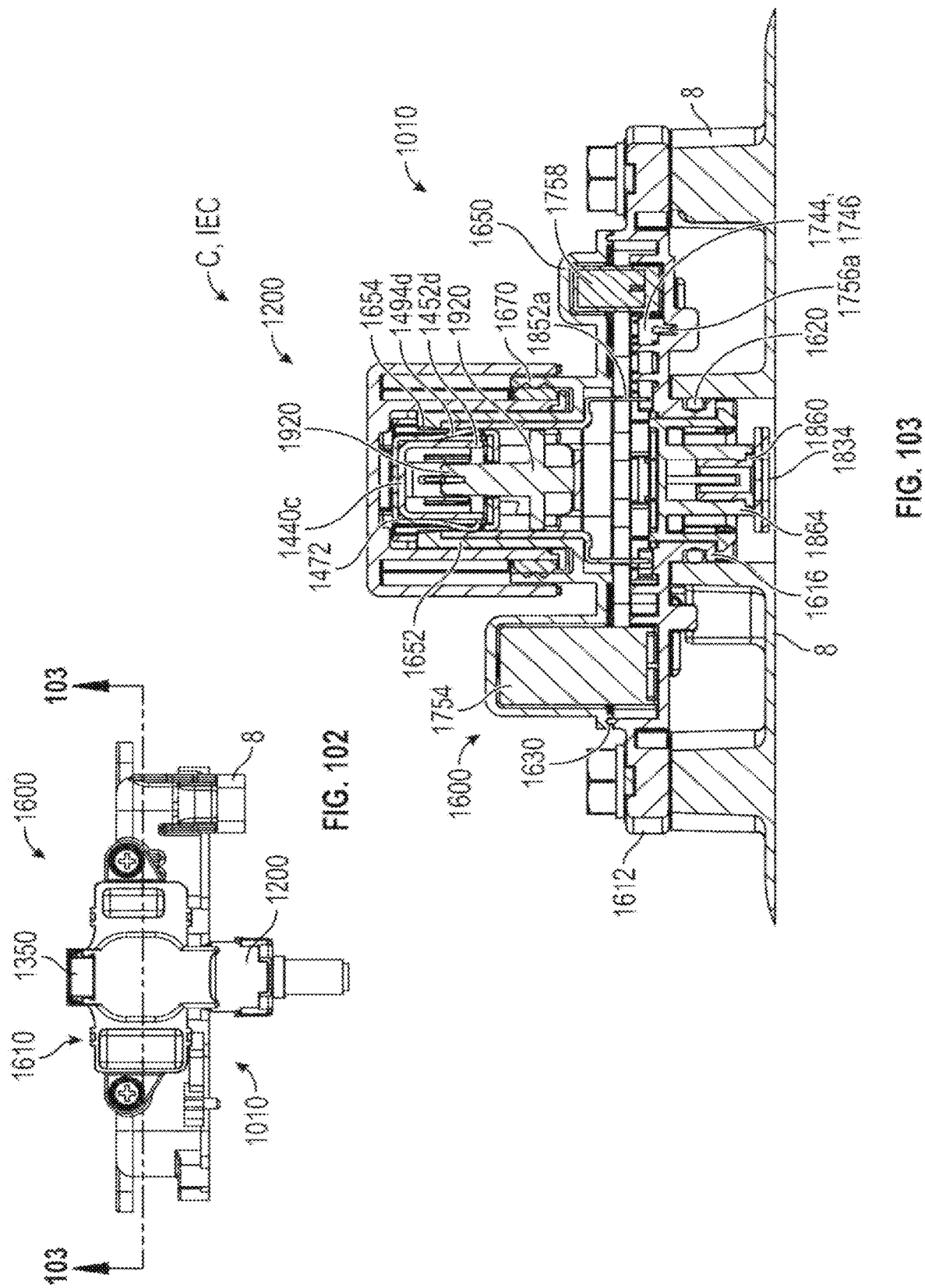

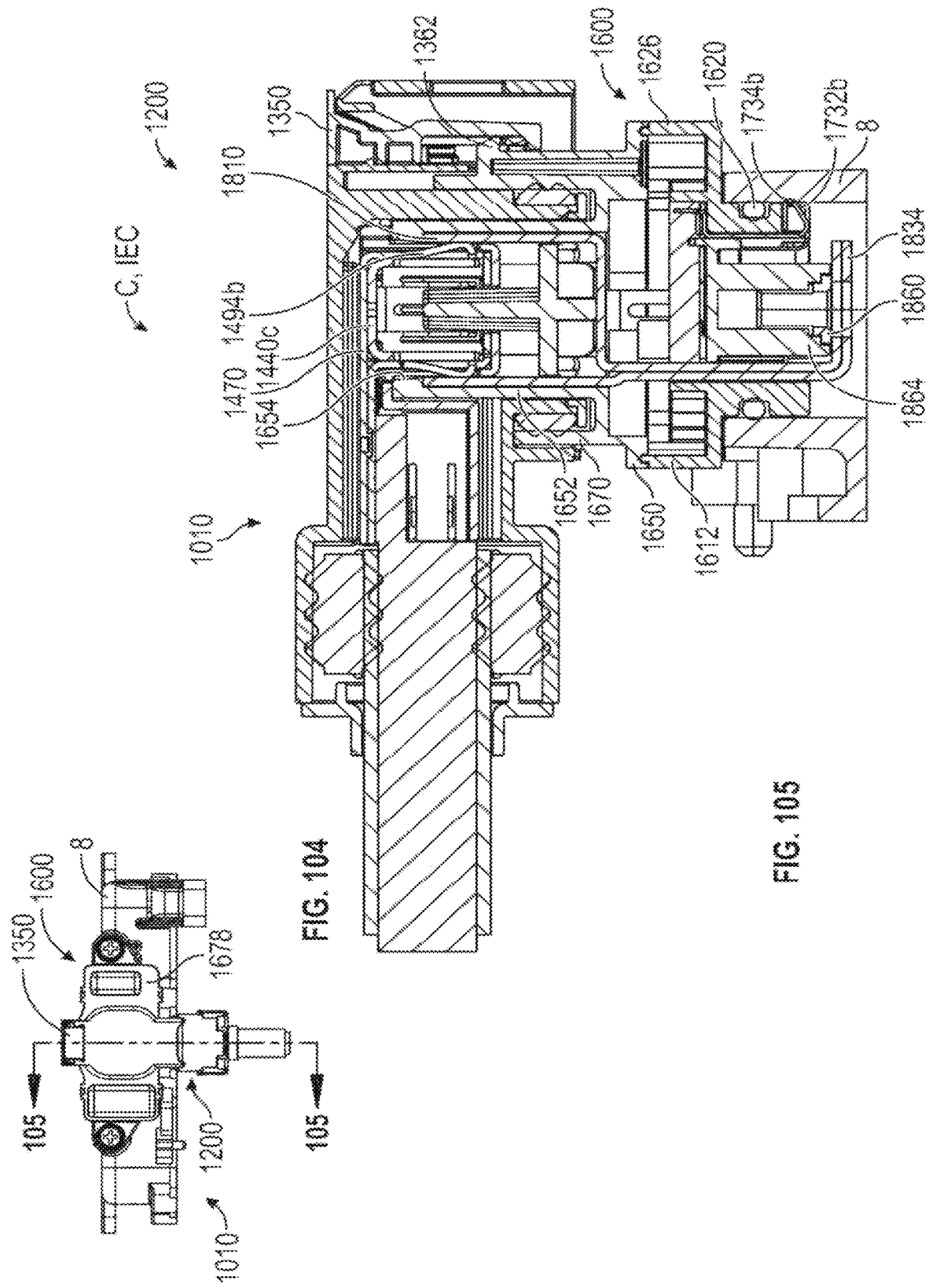

CONNECTOR SYSTEM FOR A COMPONENT IN A POWER MANAGEMENT SYSTEM IN A MOTOR VEHICLE

CROSS-REFERENCE TO RELATED APPLICATIONS

This application is a continuation of U.S. patent application Ser. No. 17/505,534, which is a Continuation of International Patent Application No. PCT/US2021/033446, which is a Continuation-In-Part from International Patent Application No. PCT/US2020/049870, which claims priority of U.S. Provisional Application No. 62/897,658. The disclosures set forth in the referenced applications are incorporated herein by reference in their entireties.

FIELD OF DISCLOSURE

The present disclosure relates to a connector system for a component in a power management system, such as a DC-DC converter found in battery-powered motor vehicles. The connector system provides a sealed and grounded electrical connection for the power management system component that is compliant with industry standards and/or specifications set by a regulatory body. The connector system includes a male connector assembly and an adaptor assembly with a female terminal assembly that are electrically and mechanically connected to the DC-DC converter.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. Considerable time, resources, and energy have been expended to develop power distribution components that meet the varied needs and complexities of the motor vehicle market; however, conventional power distribution components suffer from a variety of shortcomings.

Motor vehicles are challenging electrical environments for both the electrical components and the connector assemblies due to a number of conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes leads to significant repair and warranty costs. For example, the combined annual accrual for warranty by all of the automotive manufacturers and their direct suppliers is estimated to be between $50 billion and $150 billion, worldwide.

In light of these challenging electrical environments, considerable time, money, and energy have been expended to find power distribution assembly that meets all of the needs of these markets. A conventional power distribution assembly uses custom fabricated busbars. By utilizing custom fabricated busbars, any alterations to the power distribution system may require altering the configuration of one or more busbars. These alterations are expensive and time-consuming. Once the configuration of these custom-fabricated busbars is finalized and the busbars are manufactured, installers typically couple the busbars to power sources, power distribution assemblies, or devices utilize a combination of conventional fasteners (e.g., elongated fasteners, washers, nuts and/or studs). These conventional fasteners make installing the busbars within the application extremely difficult due to the protective equipment that an installer may be required to wear in order to protect themselves during this process. Finally, after the custom fabricated busbars are properly installed within the application, they are prone to high failure rates due to their configuration. Accordingly, there is an unmet need for an improved power distribution assembly that is boltless, modular suitable, and is suitable for use in power distribution systems found in automotive, marine and aviation applications. The description provided in the background section should not be assumed to be prior art merely because it is mentioned in or associated with the background section.

SUMMARY

The present disclosure relates to a connector system that provides a sealed and grounded electrical connection for a component of the power management system that is compliant with industry standards and/or specifications set by a regulatory body. The connector system is suitable for use with mechanically and electrically connecting power management components or devices found in an airplane, motor vehicle, a military vehicle, a bus, a locomotive, a tractor, marine applications, or telecommunications hardware. Accordingly, the connector system is well-suited to electrically and mechanically connect components or devices that are installed in these high-stress applications vehicles to ensure reliable, long-term performance and operation of the components, devices and vehicles.

In one embodiment, the system includes a male connector assembly and an adaptor assembly with a female terminal assembly that are designed to be coupled to a component in a power management system, such as a DC-DC converter found in battery-powered motor vehicles. The adaptor assembly includes a capacitor assembly having at least one capacitor and a female terminal assembly having a female terminal. The female terminal includes: (i) a receptacle dimensioned to receive a male terminal assembly and (ii) a female terminal coupling means that electrically couples the female terminal assembly to the at least one capacitor. The adaptor assembly also includes a busbar having: (i) a busbar coupling means that is configured to electrically couple the busbar to the at least one capacitor and (ii) a grounding coupler that is configured to be placed in contact with an extent the component of the power management system when the adaptor assembly is placed in contact with the component of the power management system. The connection from the female terminal to the extent of the power management system through the at least one capacitor and the busbar is sealed from the external environment.

In another embodiment, the system includes a male connector assembly and an adaptor assembly with a female terminal assembly that are designed to be coupled to a component in a power management system, such as a DC-DC converter found in battery-powered motor vehicles. The male connector assembly includes a male terminal assembly having an internal spring actuator or spring member, which is designed to interact with an extent of the male terminal to ensure that a proper connection is created between the male terminal and female terminal. The male terminal assembly has a male terminal body, which includes a plurality of contact arms. A spring member is nested inside the male terminal body. The spring member resists inward deflection and applies outwardly directed force on the contact arms thereby creating a positive connection and retention force. The adaptor assembly includes a capacitor assembly having a capacitor assembly and a female terminal assembly having a female terminal. The capacitor assembly includes at least one capacitor. The female terminal includes: (i) a receptacle dimensioned to receive the male terminal assembly and (ii) a female terminal coupling means that electrically couples the female terminal assembly to the at least one capacitor. The female terminal coupling means includes a pair of projections that have irregular openings, which are configured to electrically couple the female terminal to the at least one capacitor.

The adaptor assembly also includes a busbar having: (i) a busbar coupling means and (ii) a grounding coupler that is connected to the busbar coupling means via a bridge. The busbar coupling means includes a pair of projections that have irregular openings, which are configured to electrically couple the busbar to the at least one capacitor. The grounding coupler includes ground connecting portions that are formed from two linear extents that are connected to one another with two angular bends. The angular bends are configured such that enable the grounding coupler to make contact with an extent the component of the power management system when the adaptor assembly is placed in contact with the component of the power management system. Said contact between the grounding coupler and the component makes an electrical connection between the busbar and the component, which in turn makes an electrical connection from the female terminal to the extent of the power management system through the at least one capacitor. This electrical connection between the grounding coupler and the component is sealed from the external environment.

Additional structural and functional aspects and benefits of the system are disclosed in the Detailed Description section and the Figures.

BRIEF DESCRIPTION OF THE DRAWINGS

The accompanying drawings or figures, which are included to provide further understanding and are incorporated in and constitute a part of this specification, illustrate disclosed embodiments and together with the description serve to explain the principles of the disclosed embodiments. In the Figures, like reference numerals refer to the same or similar elements throughout the Figures. In the drawings:

FIG. 10 is a perspective view of the female terminal assembly of the adaptor assembly of FIG. 4, including: (i) a female terminal body, (ii) a catch can, and (iii) a catch can retainer;

FIG. 11 is a front view of the female terminal body of the female terminal assembly of FIG. 10;

FIG. 12 is a side view of the female terminal body of FIG. 11;

FIG. 26 is a perspective view of the lower extent of the adaptor assembly of FIG. 4, where the busbar, the female terminal assembly, and the capacitor assembly are installed in the lower adaptor housing and the adaptor assembly is in a second partially assembled state, $PA_2$;

FIG. 27 is a top view of the adaptor assembly of FIG. 26;

FIG. 28 is a top view of the adaptor assembly of FIG. 26;

FIG. 29 is a cross-sectional view of the adaptor assembly of FIG. 26 taken along line 29-29 of FIG. 28;

FIG. 30 is a zoomed-in view of area A of the adaptor assembly of FIG. 26;

FIG. 31 is a zoomed-in view of area B of the adaptor assembly of FIG. 29;

FIG. 32 is a zoomed-in view of area C of the adaptor assembly of FIG. 27;

FIG. 35 is a perspective view of a portion of the adaptor assembly of FIG. 26, where the lower adaptor housing has been removed to show the coupling of the capacitor assembly, the busbar, and the female terminal body;

FIG. 36 is a front view of the adaptor assembly of FIG. 35;

FIG. 44 is a top view of the connector system and the DC-DC converter of FIG. 43 in the connected position, $P_C$;

FIG. 45 is a cross-sectional view of the connector system and the DC-DC converter system taken along line 45-45 of FIG. 44;

FIG. 46 is a top view of the connector system and the DC-DC converter of FIG. 43 in the connected position $P_C$;

FIG. 47 is a cross-sectional view of the connector system and the DC-DC converter system taken along line 47-47 of FIG. 46;

FIG. 50 is a top view of the connector system and the DC-DC converter of FIG. 43 in the connected position, $P_C$;

FIG. 51 is a cross-sectional view of the connector system and the DC-DC converter system taken along line 51-51 of FIG. 50;

FIG. 52 is a top view of the connector system and the DC-DC converter of FIG. 43 in the connected position, $P_C$;

FIG. 53 is a cross-sectional view of the connector system and the DC-DC converter system taken along line 53-53 of FIG. 52;

FIG. 58 is a top view of the lower adaptor housing of FIG. 57;

FIG. 59 is a side view of the lower adaptor housing of FIG. 58;

FIG. 64 is a top view of the lower adaptor housing with the capacitor assembly installed therein, wherein the adaptor assembly is in a first partially assembled state, $PA_1$;

FIG. 65 is a side view of a portion of the adaptor assembly of FIG. 64;

FIG. 83 is a top view of the female terminal body of FIG. 79;

FIG. 84 is a front view of the catch can and the catch can retainer of FIG. 79;

FIG. 85 is a side view of the catch can and the catch can retainer of FIG. 79;

FIG. 86 is a perspective view of the lower adaptor housing with the capacitor assembly, the busbar assembly, and the female terminal assembly are installed therein, wherein the adaptor assembly is in a third partially assembled state, $PA_3$;

FIG. 87 is a first zoomed-in view of area F of the lower adaptor housing of FIG. 86;

FIG. 88 is a second zoomed-in view of area G of the lower adaptor housing of FIG. 86;

FIG. 89 is a side view of a portion of the adaptor assembly of FIG. 86;

FIG. 90 is a cross-sectional view of the adaptor assembly of FIG. 86 taken along line 90-90 of FIG. 89;

FIG. 102 is a top view of the connector system and the DC-DC converter of FIG. 54;

FIG. 103 is a cross-sectional view of the connector system and the DC-DC converter system taken along line 103-103 of FIG. 102;

FIG. 104 is a top view of the connector system and the DC-DC converter of FIG. 54;

FIG. 105 is a cross-sectional view of the connector system and the DC-DC converter taken along line 105-105 of FIG. 104;

DETAILED DESCRIPTION

Figure 1:
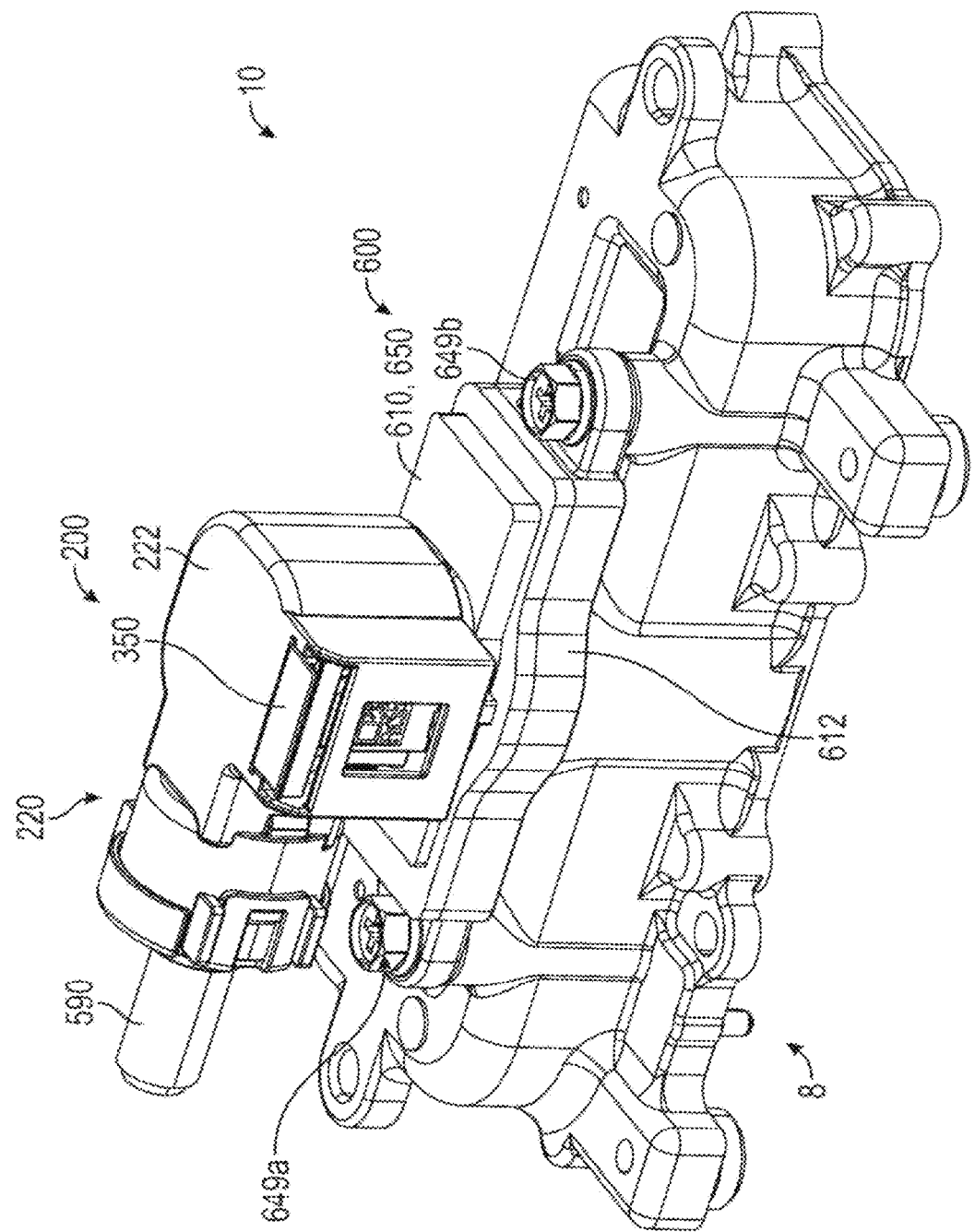
FIG. 1 is a perspective view of a first embodiment of a connector system for a DC-DC converter of a power management system like those found in a battery-powered motor vehicle.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings. In the Figures, like reference numerals refer to the same or similar elements throughout the Figures.

The Figures show a connector system 10 that includes a male connector assembly 200 and an adaptor assembly 600 with a female terminal assembly 800. The system 10 is designed to be coupled to a component in a power management system 2, such as the housing 8 of a DC-DC converter 7 found in battery-powered motor vehicles 1. In general terms, the DC-DC converter 7 converts a source of direct current (DC) from a first voltage level to a second voltage level. For example, the DC-DC converter 7 is designed to convert a higher voltage level (e.g., 48 volts) that is typically supplied by a battery pack 3 to a lower voltage level (e.g., 12 volts) for use by a current drawing device (e.g., instrumentation panel, entertainment system, navigation system, safety monitoring system, sensors, LED lighting, and etc.). Unlike conventional connector systems, the disclosed connector system provides a sealed electrical connection between the female terminal assembly 800 and the housing 8 of the DC-DC converter 7 through a capacitor assembly 750. This electrical connection that sealed from the external environment (e.g., outside of the housing 8) is beneficial because it substantially increases the durability and longevity of the system 10. In addition, the inclusion of the capacitor assembly 750 within the system 10 helps reduce electromagnetic noise that may otherwise be introduced into the system 10 or the environment/application 1 that the system 10 is installed therein. This allows for additional mounting locations for the DC-DC converter 7, such as positioning the converter 7 near or adjacent other electronics that are sensitive to electromagnetic noise while reducing the need to use additional electromagnetic noise shielding techniques which can be costly from both the materials and design standpoint. Further, the system 10 is substantially lighter weight (e.g., 70 grams) than conventional systems. Moreover, the system 10 is compliant with many of the USCAR standards (e.g., USCAR 2, USCAR 12, USCAR 25) and is a T4/V4/S3/D2/M2 compliant system 10. This means that the system 10 meets and exceeds: (i) T4 is exposure of the system 100 to 150° C., (ii) V4 is severe vibration, (iii) S1 is sealed high-pressure spray, (iv) D2 is 200 k mile durability, and (v) M2 is less than 45 Newtons of force is required to connect the male terminal assembly 430 to the female terminal assembly 800. Lastly, the system 10 is Push-Click-Tug-Scan (PCTS), which eliminates the need for air-assist guns to connect the male terminal assembly 430 to the female terminal assembly 800. This is beneficial because it decreases installation time, is more secure, does not include additional components that could be misplaced within the environment 1, and a record of the proper installation is recorded and stored for future use.

As depicted in the Figures, the connector system 10 is designed to provide mechanical and electrical coupling of a wire or busbar to a DC-DC converter 7. Such system 10, may be installed within an airplane, motor vehicle, a military vehicle (e.g., tank, personnel carrier, heavy-duty truck, and troop transporter), a bus, a locomotive, a tractor, a boat, a submarine, a battery pack, a computer server, a 24-48 volt system, for a high-power application, for a high-current application, for a high-voltage application. It should be understood that multiple connector systems 10 could be used in a single installation environment, application, product, component, or device. For example, multiple systems 10 may be used with a single DC-DC converter 7 or multiple systems 10 may be used within a single power distribution assembly 2. For example, one system 10 may be used with the DC-DC converter 7, another one may be used with the battery management system 5 and specifically the battery pack 3, and one may be used with the motors 4. While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. Accordingly, the drawings and detailed descriptions are to be regarded as illustrative in nature, not restrictive or limiting.

FIGS. 118-125 are block diagrams showing components of the connector system 10, the male housing assembly 220, the spring member 440c, the male terminal 470, the adaptor housing 610, the busbar 700, the capacitor assembly 750 and the female terminal assembly 800. These block diagrams use a tree and branch hierarchal layout to show the various sub-components of the item at the top of the block diagram.

Figure 2:
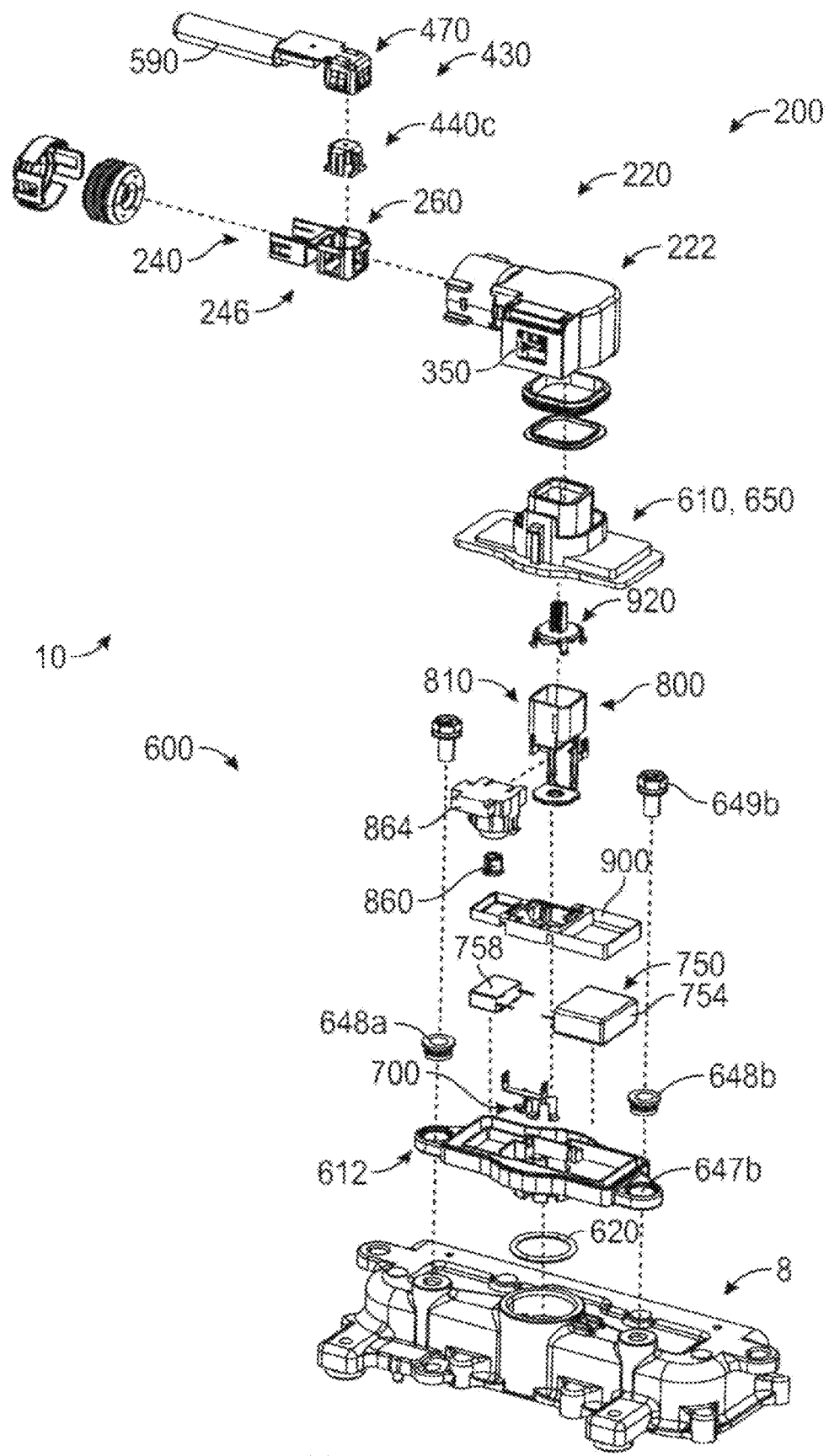
FIG. 2 is an exploded view of the connector system for a DC-DC converter of FIG. 1, where the connector system includes a male connector assembly and an adaptor assembly with a female terminal assembly that are electrically and mechanically connected to the DC-DC converter.
Figure 3:
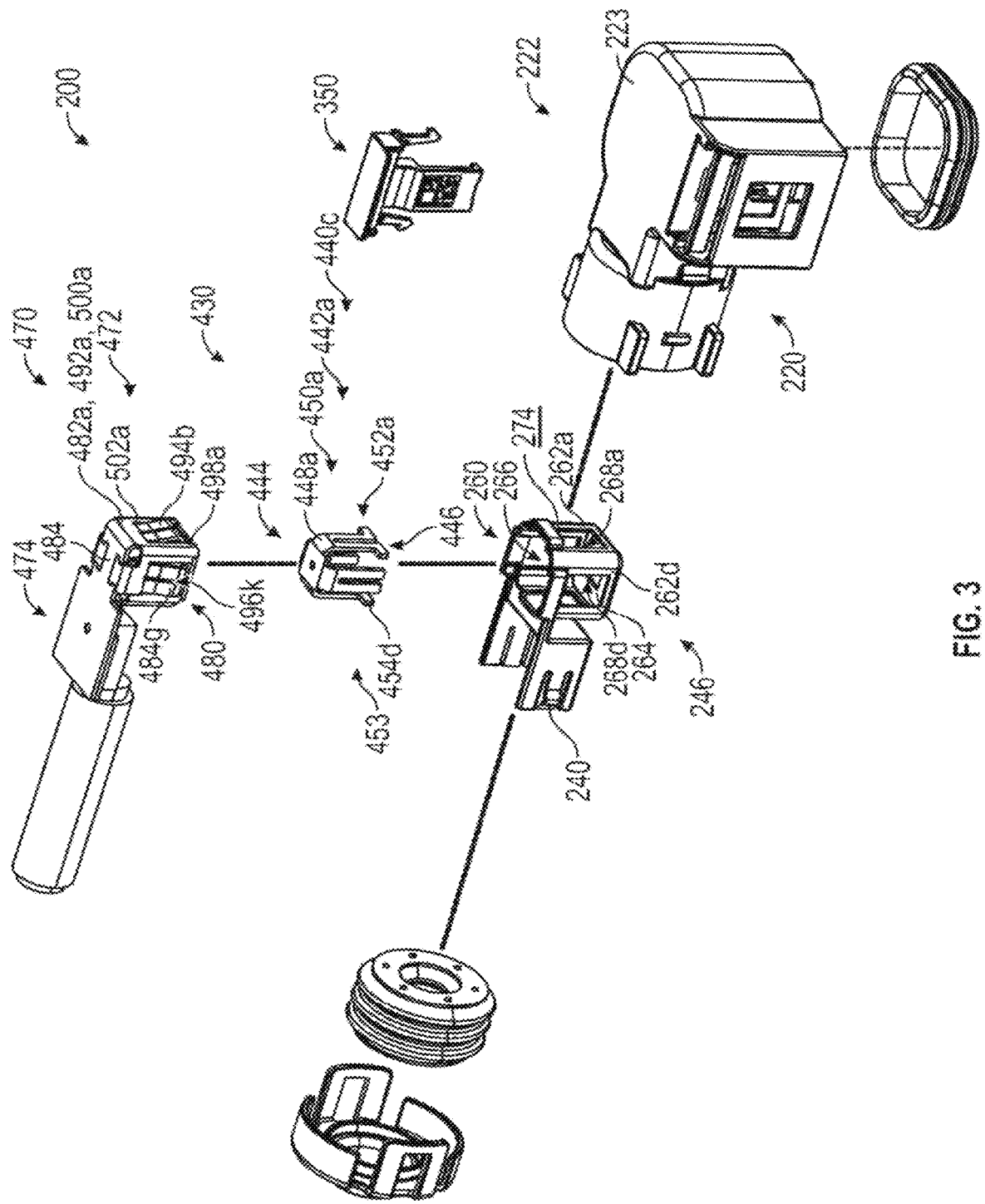
FIG. 3 is an exploded view of the male connector assembly of FIG. 1.
Figure 4:
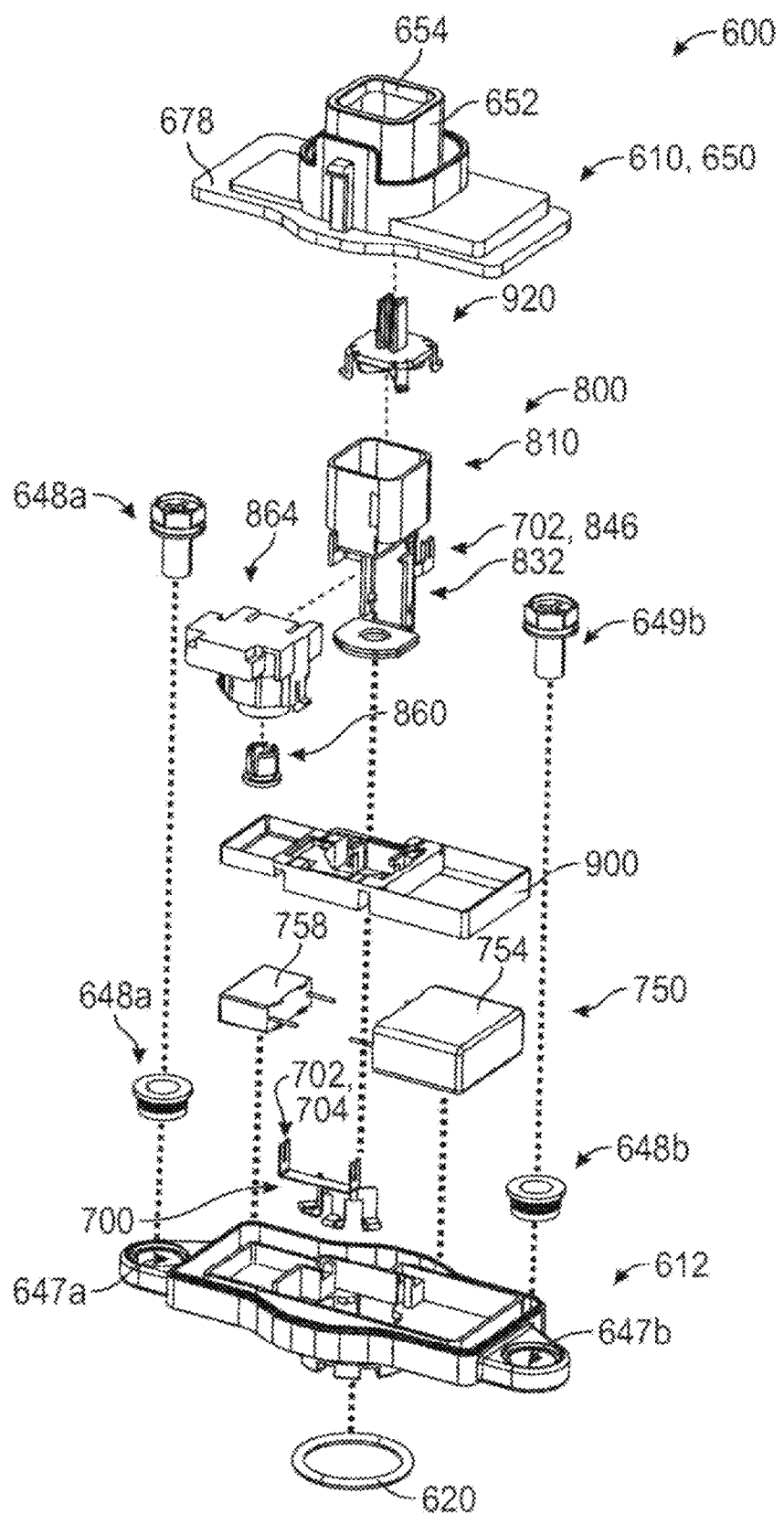
FIG. 4 is an exploded view of the adaptor assembly of FIG. 1, including: (i) a lower adaptor housing, (ii) capacitor assembly, (iii) busbar, (iv) a female terminal assembly, and (v) an upper adaptor housing.
Figure 5:
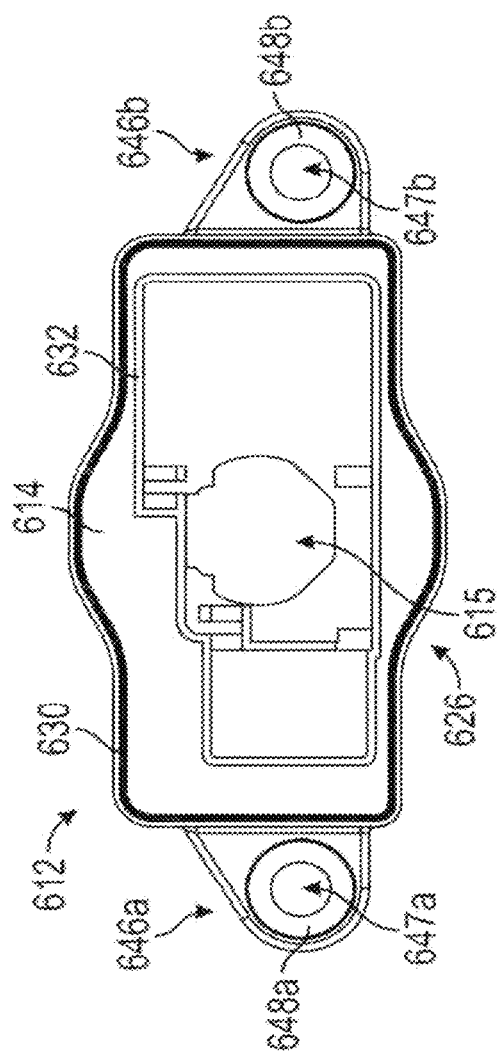
FIG. 5 is a top view of the lower adaptor housing of FIG. 4.
Figure 6:
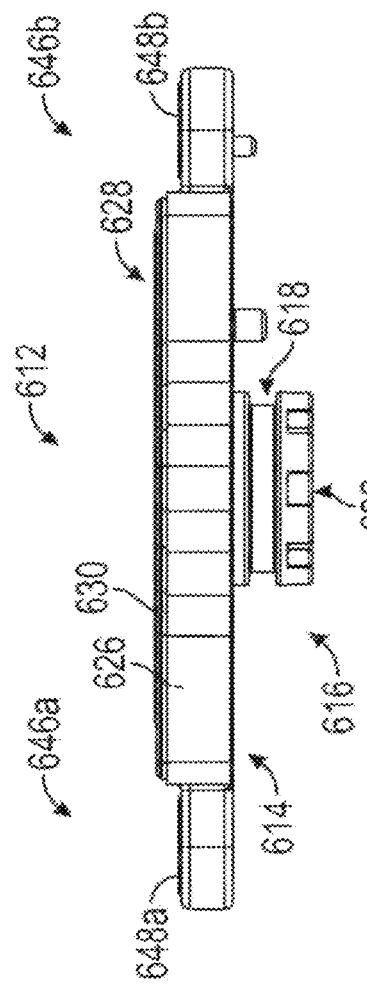
FIG. 6 is a side view of the lower adaptor housing of FIG. 5.
Figure 7:
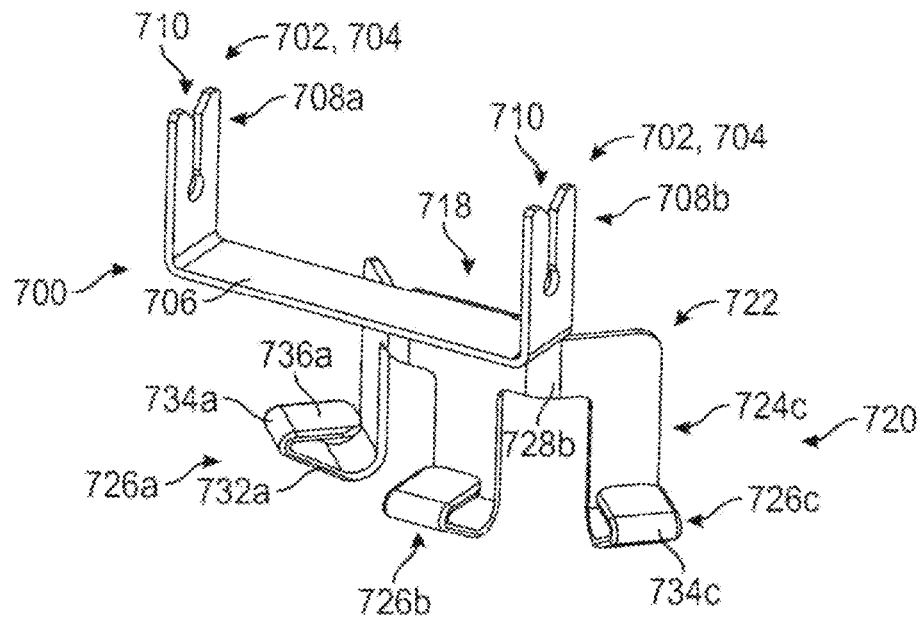
FIG. 7 is a perspective view of the busbar of the adaptor assembly of FIG. 4.
Figure 8:
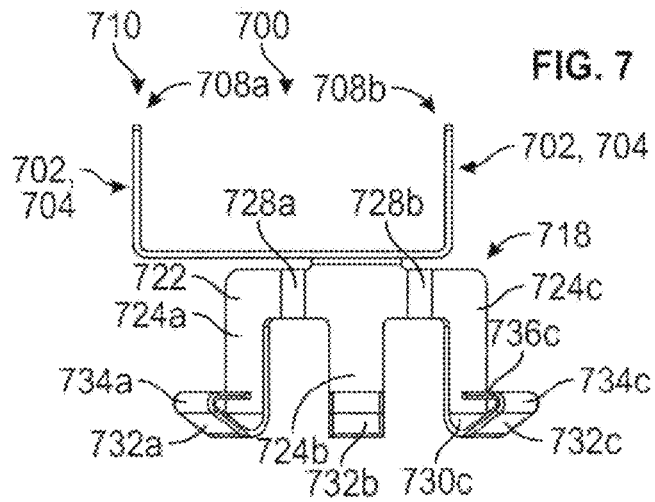
FIG. 8 is a front view of the busbar of FIG. 7.
Figure 9:
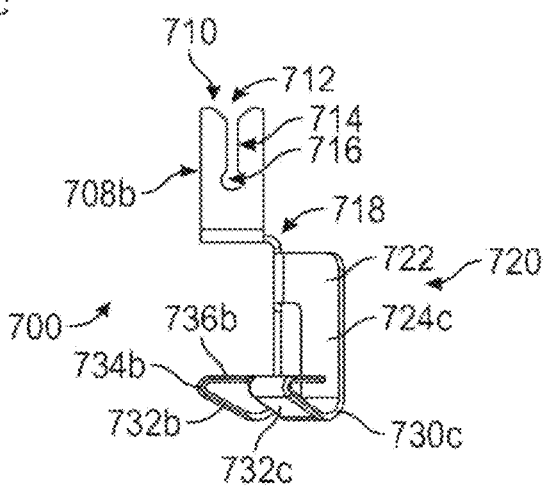
FIG. 9 is a side view of the busbar of FIG. 7.
Figure 13:
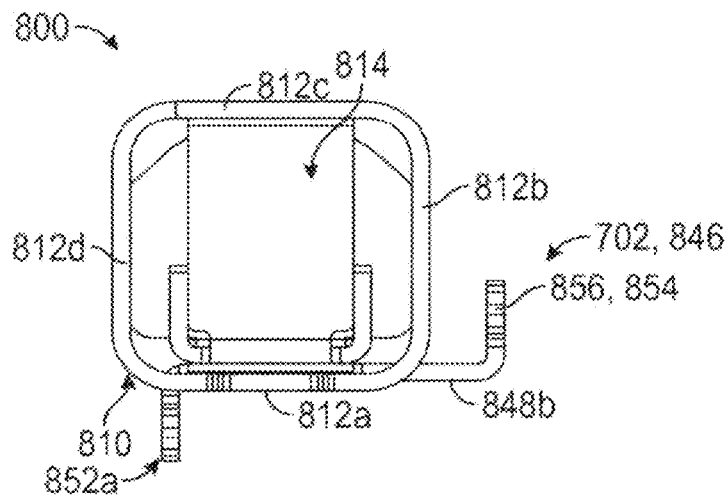
FIG. 13 is a top view of the female terminal body of FIG. 11.
Figure 14:
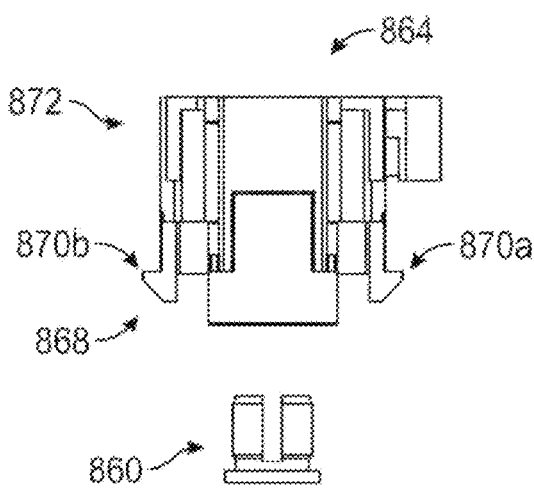
FIG. 14 is a front view of the catch can and the catch can retainer of the female terminal assembly of FIG. 10.
Figure 15:
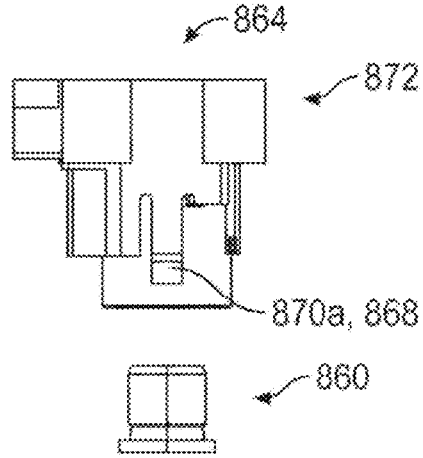
FIG. 15 is a side view of the catch can and the catch can retainer of FIG. 15.
Figure 16:
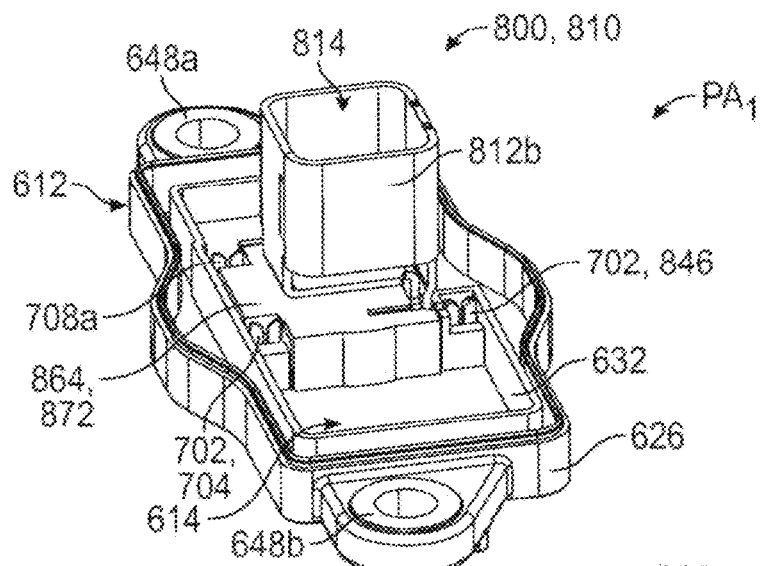
FIG. 16 is a perspective view of a lower extent of the adaptor assembly of FIG. 4, where the busbar and the female terminal assembly are installed in the lower adaptor housing and the adaptor assembly is in a first partially assembled state, $PA_1$.
Figure 17:
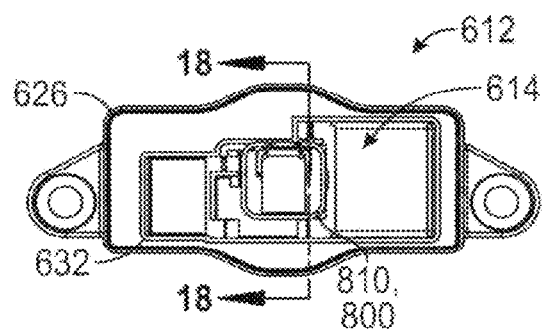
FIG. 17 is a top view of the adaptor assembly of FIG. 16.
Figure 18:
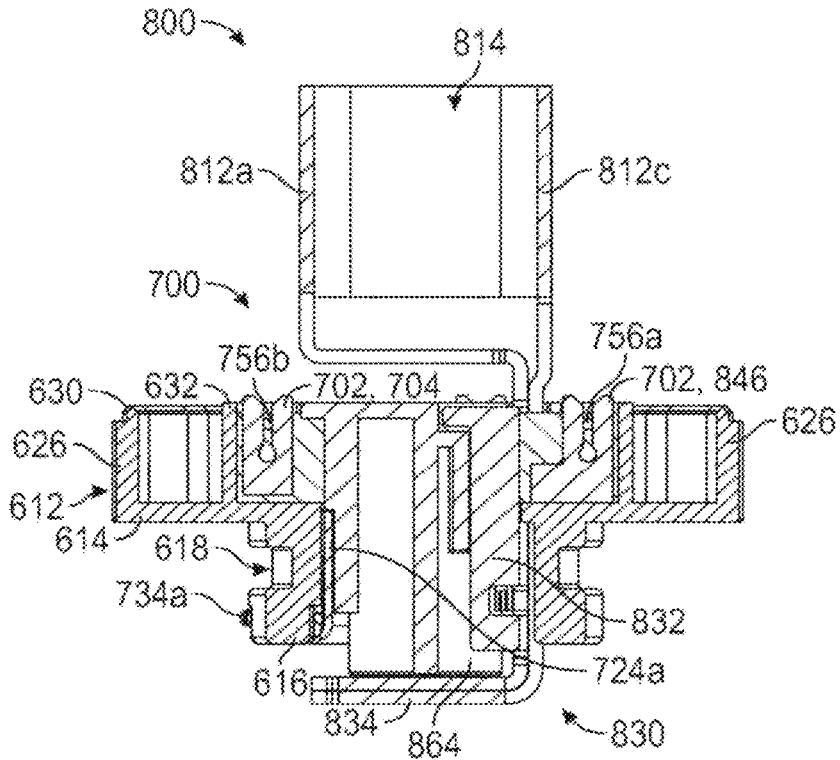
FIG. 18 is a cross-sectional view of the adaptor assembly taken along line 18-18 of FIG. 17.
Figure 20:
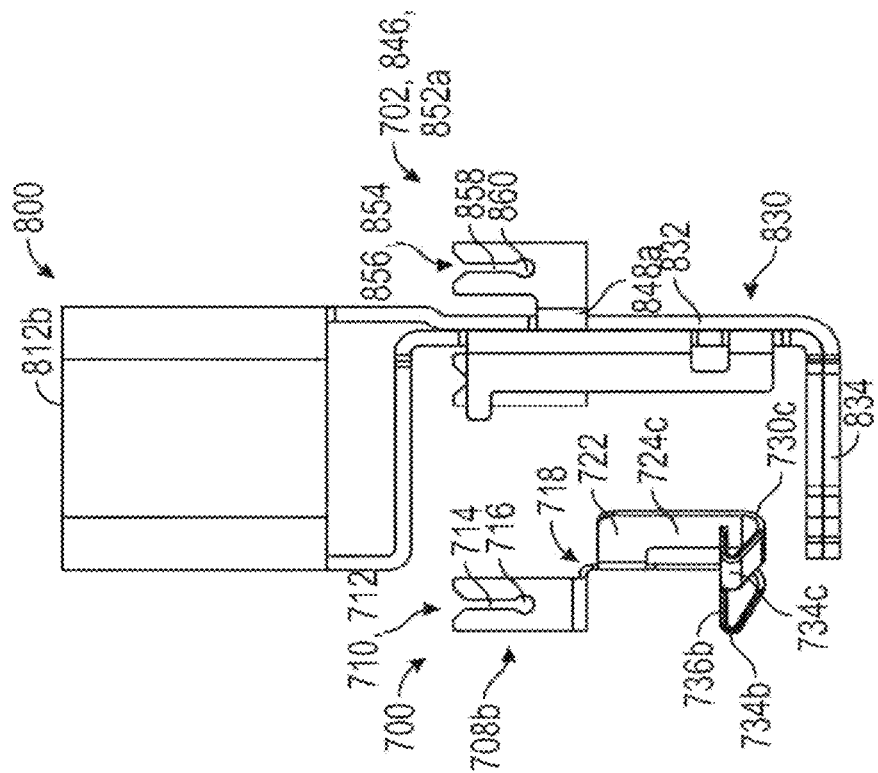
FIG. 20 is a side view of the adaptor assembly of FIG. 19.
Figure 19:
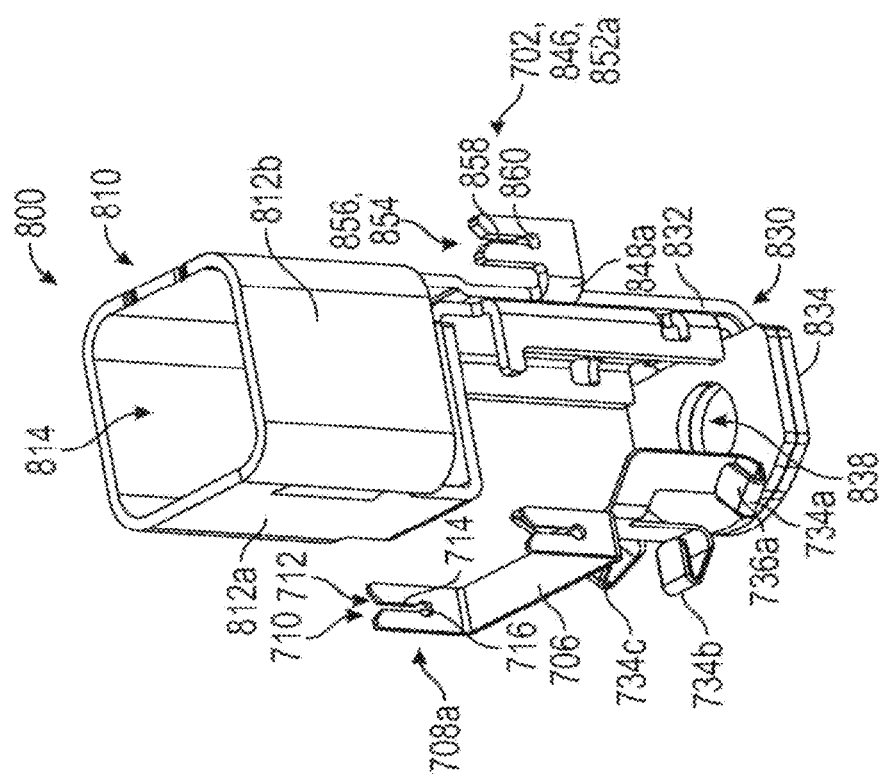
FIG. 19 is a perspective view of the adaptor assembly of FIG. 16, wherein the lower adaptor housing has been removed to show the busbar and female terminal body.
Figure 21:
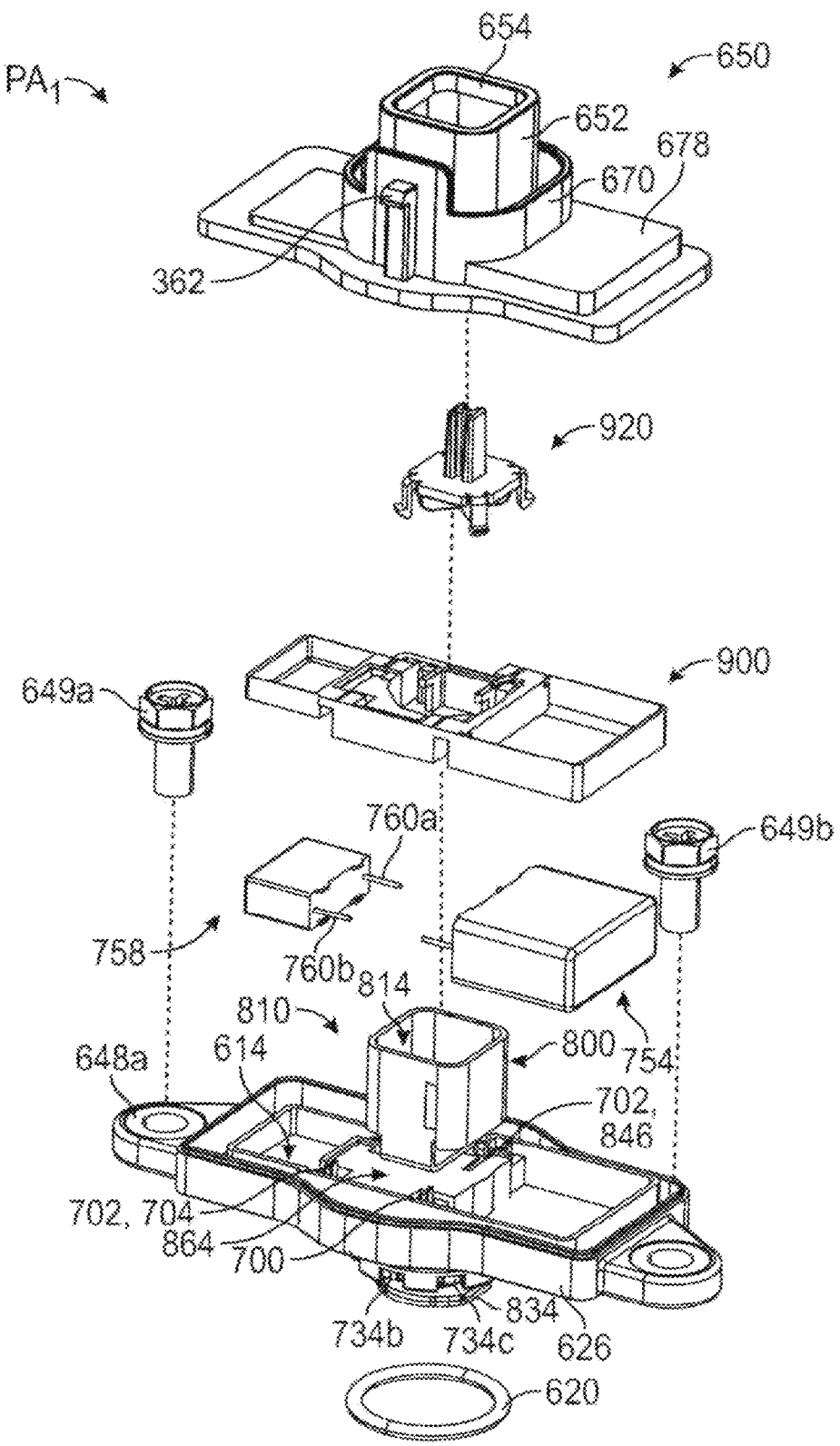
FIG. 21 is an exploded view of the adaptor assembly in the first partially assembled state, $PA_1$.
Figure 24:
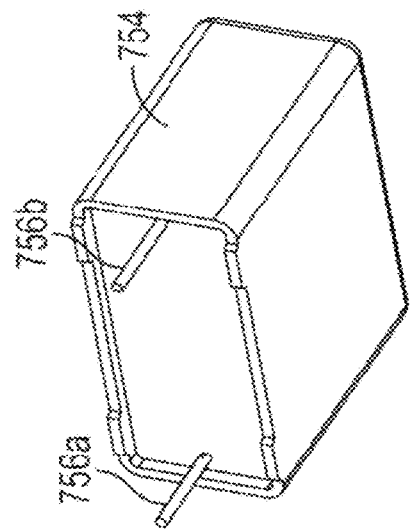
FIG. 24 is a perspective view of a second capacitor of the capacitor assembly of FIG. 4.
Figure 23:
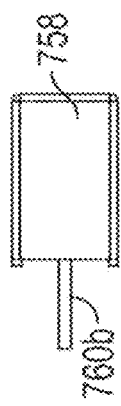
FIG. 23 is a side view of the first capacitor of FIG. 22.
Figure 22:
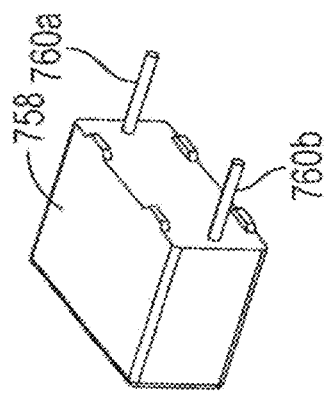
FIG. 22 is a perspective view of a first capacitor of the capacitor assembly of FIG. 4.
Figure 25:
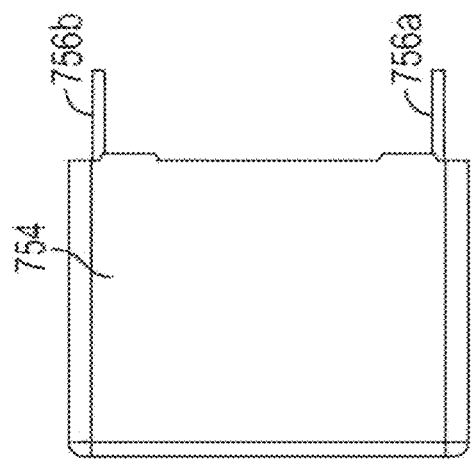
FIG. 25 is a side view of the second capacitor of FIG. 24.
Figure 33:
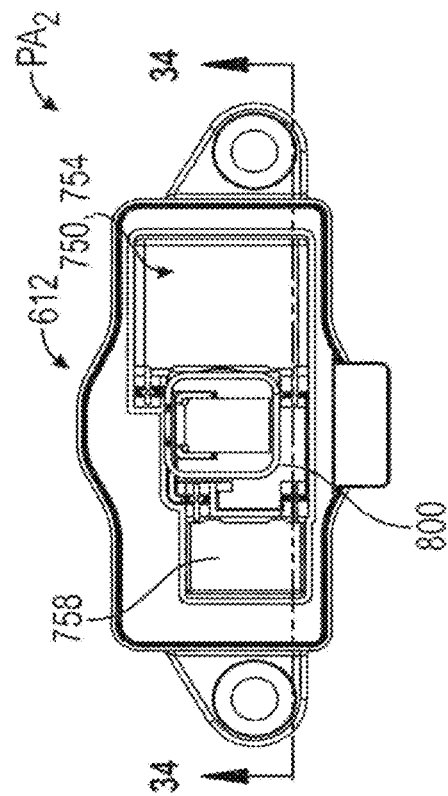
FIG. 33 is a top view of the adaptor assembly of FIG. 26 in the second partially assembled state, $PA_2$.
Figure 34:
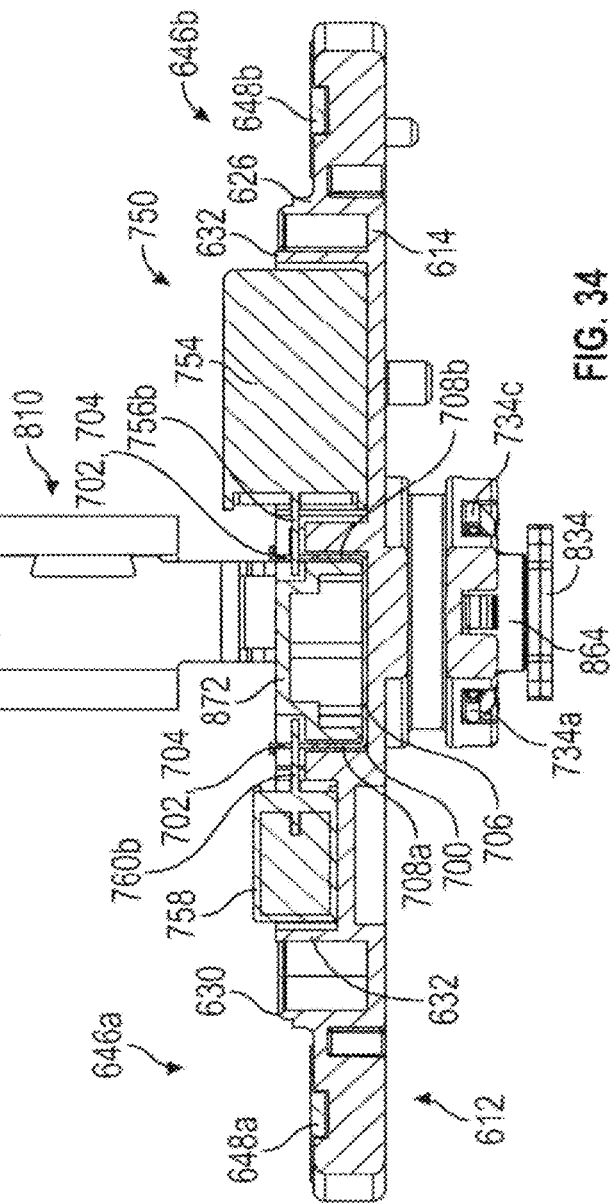
FIG. 34 is a cross-sectional view of the adaptor assembly of FIG. 26 taken along line 34-34 of FIG. 33.
Figure 37:
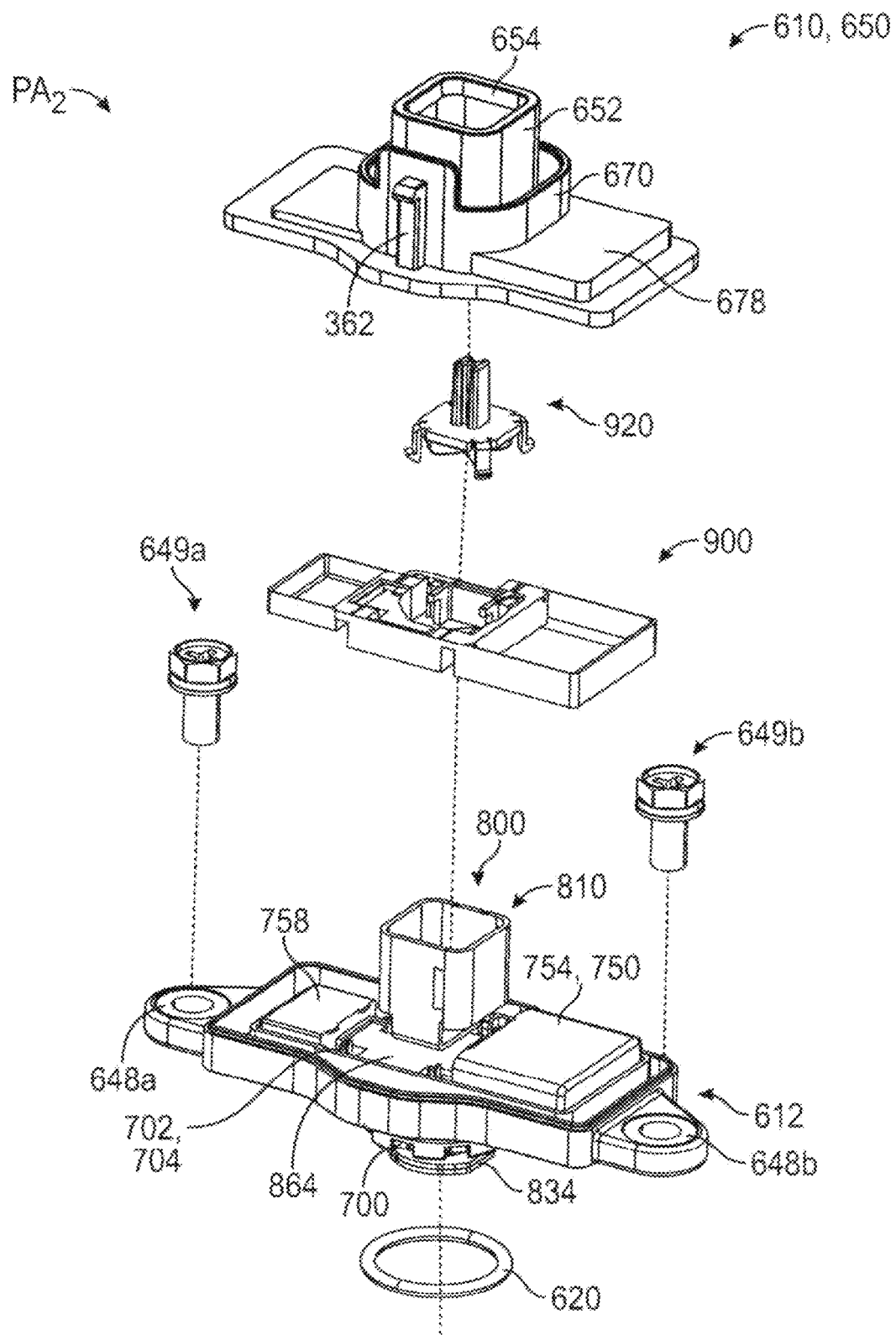
FIG. 37 is an exploded view of the adaptor assembly in the second partially assembled state, $PA_2$.
Figure 38:
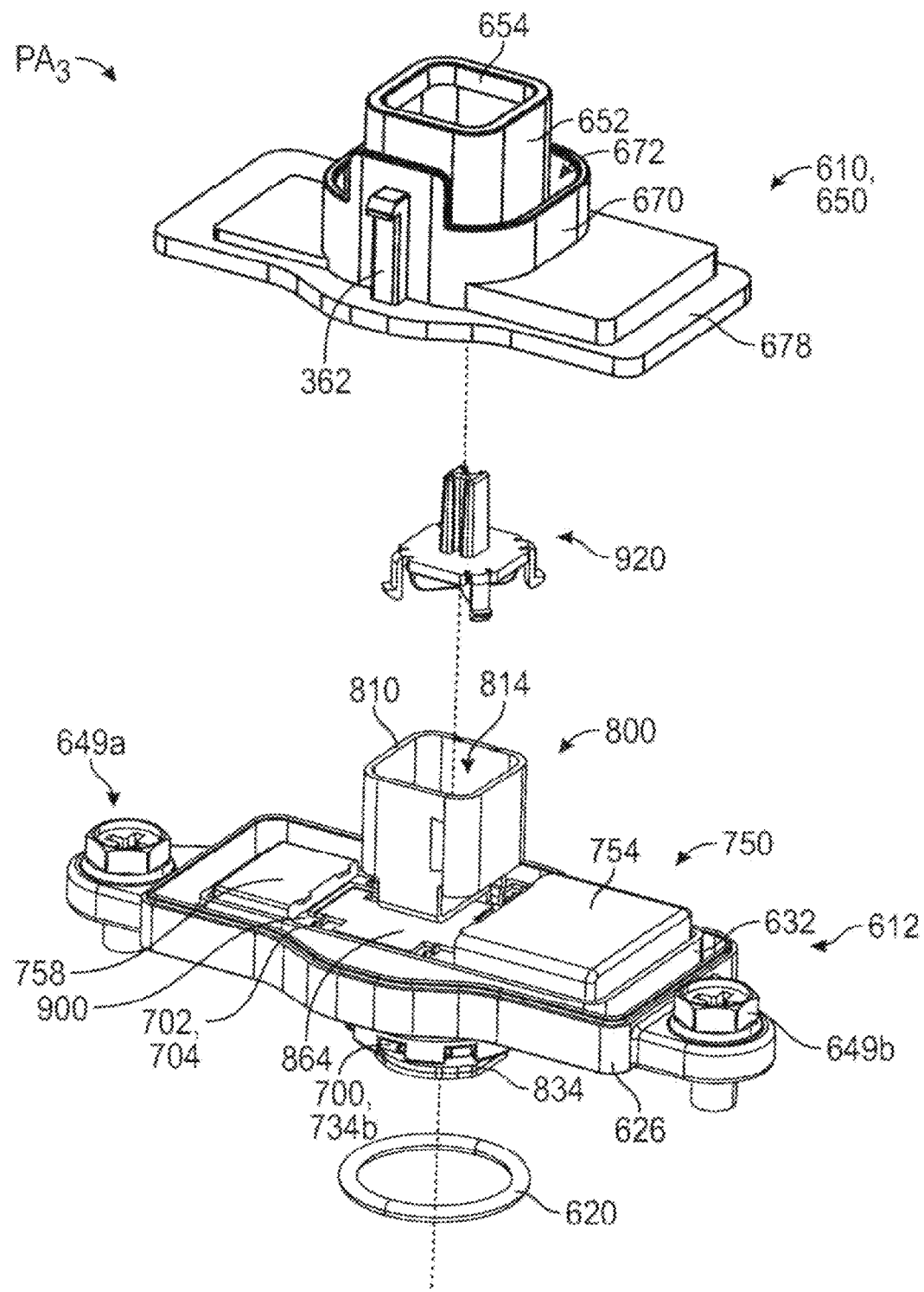
FIG. 38 is an exploded view of the adaptor assembly in a third partially assembled state, $PA_3$, wherein the busbar, the female terminal assembly, the capacitor assembly, and a seal are installed in the lower adaptor housing.
Figure 39:
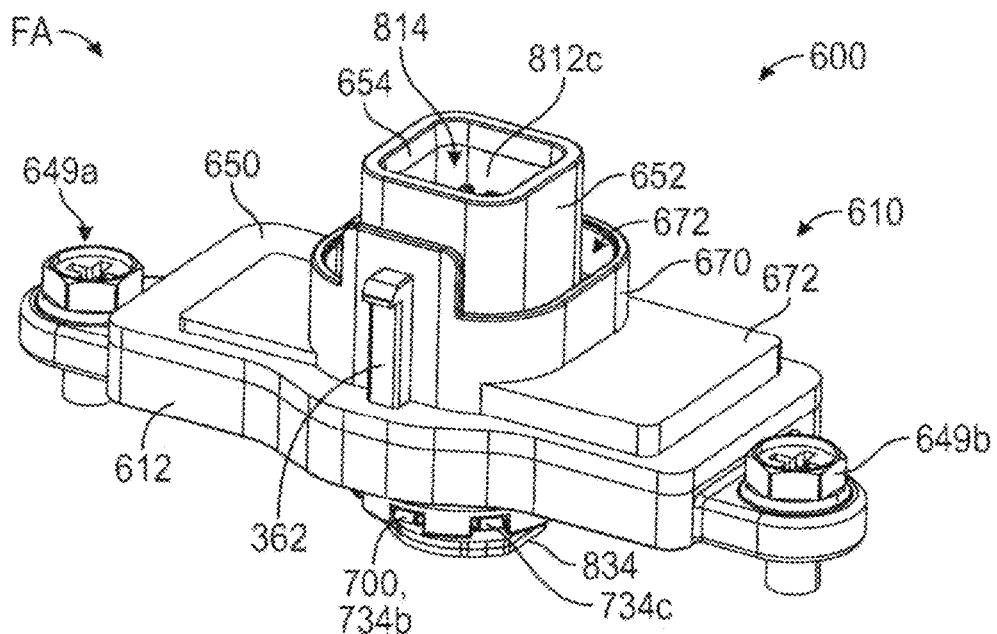
FIG. 39 is a perspective view of the adaptor assembly in a fully assembled state, FA.
Figure 40:
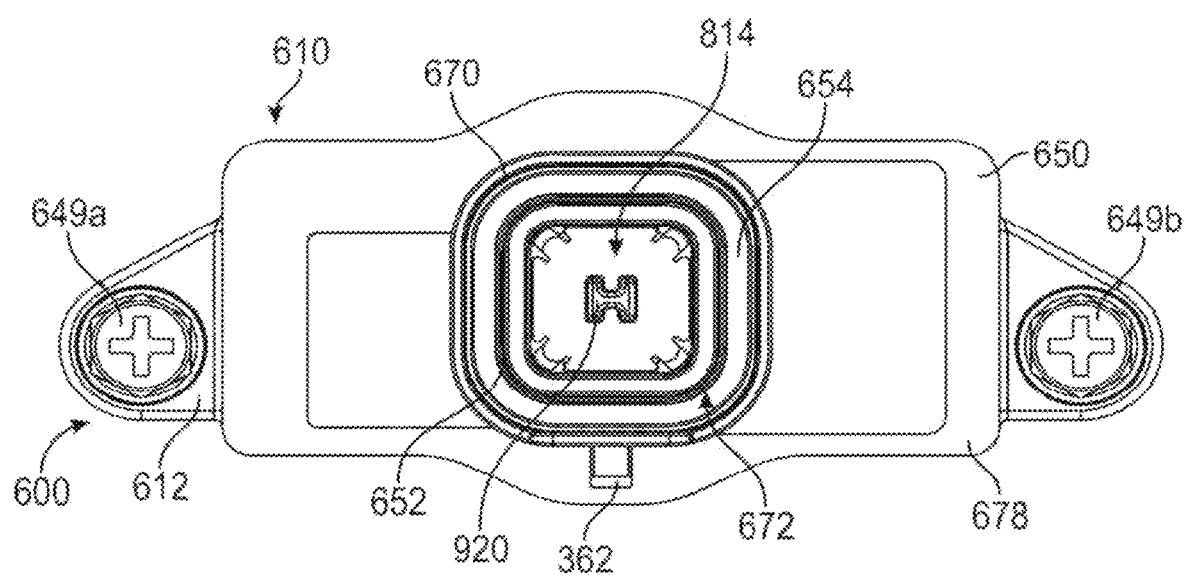
FIG. 40 is a top view of the adaptor assembly of FIG. 39.
Figure 41:
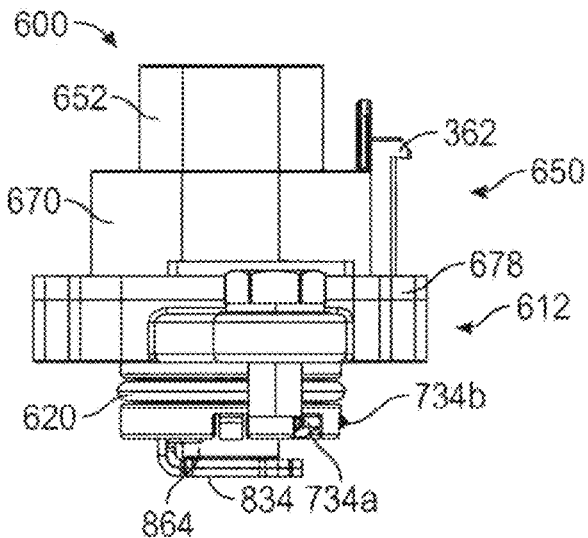
FIG. 41 is an end view of the adaptor assembly of FIG. 39.
Figure 42:
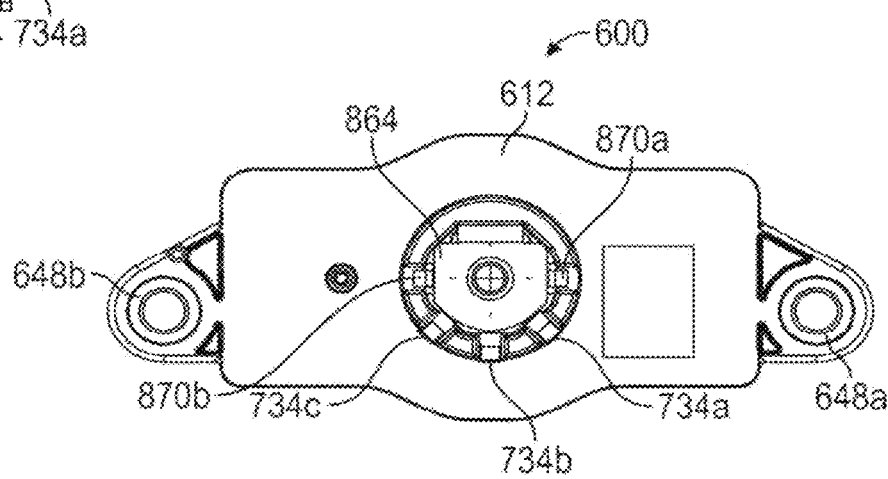
FIG. 42 is a bottom view of the adaptor assembly of FIG. 39.
Figure 43:
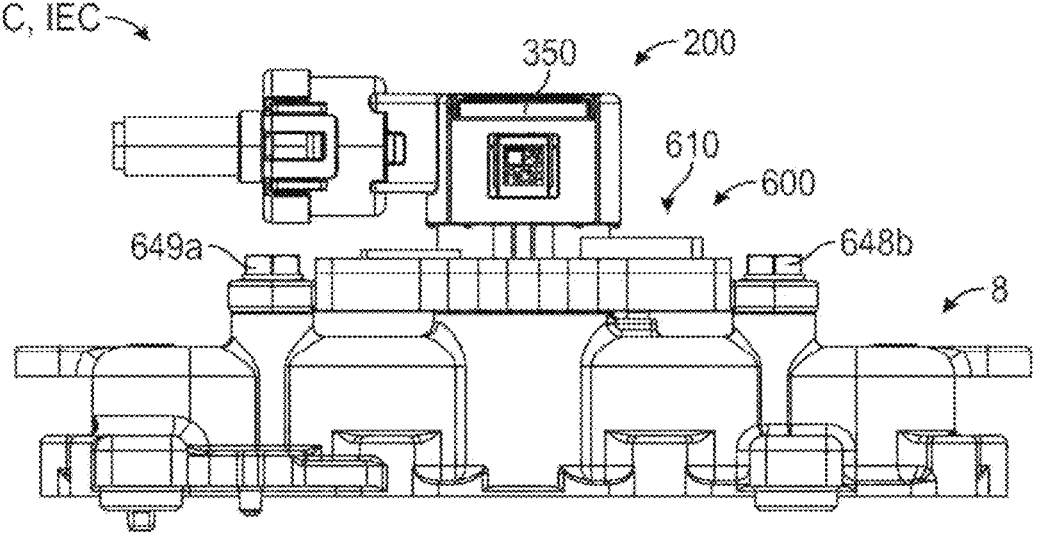
FIG. 43 is a front view of the connector system and the DC-DC converter of FIG. 1 in a connected position $P_C$.
Figure 48:
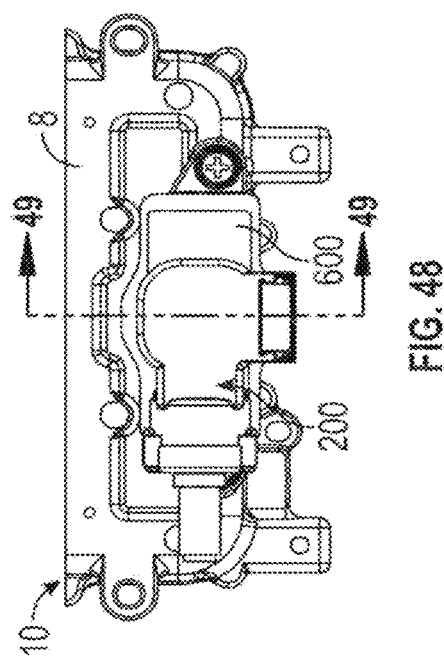
FIG. 48 is a top view of the connector system and the DC-DC converter of FIG. 43 in the connected position $P_C$.
Figure 118:
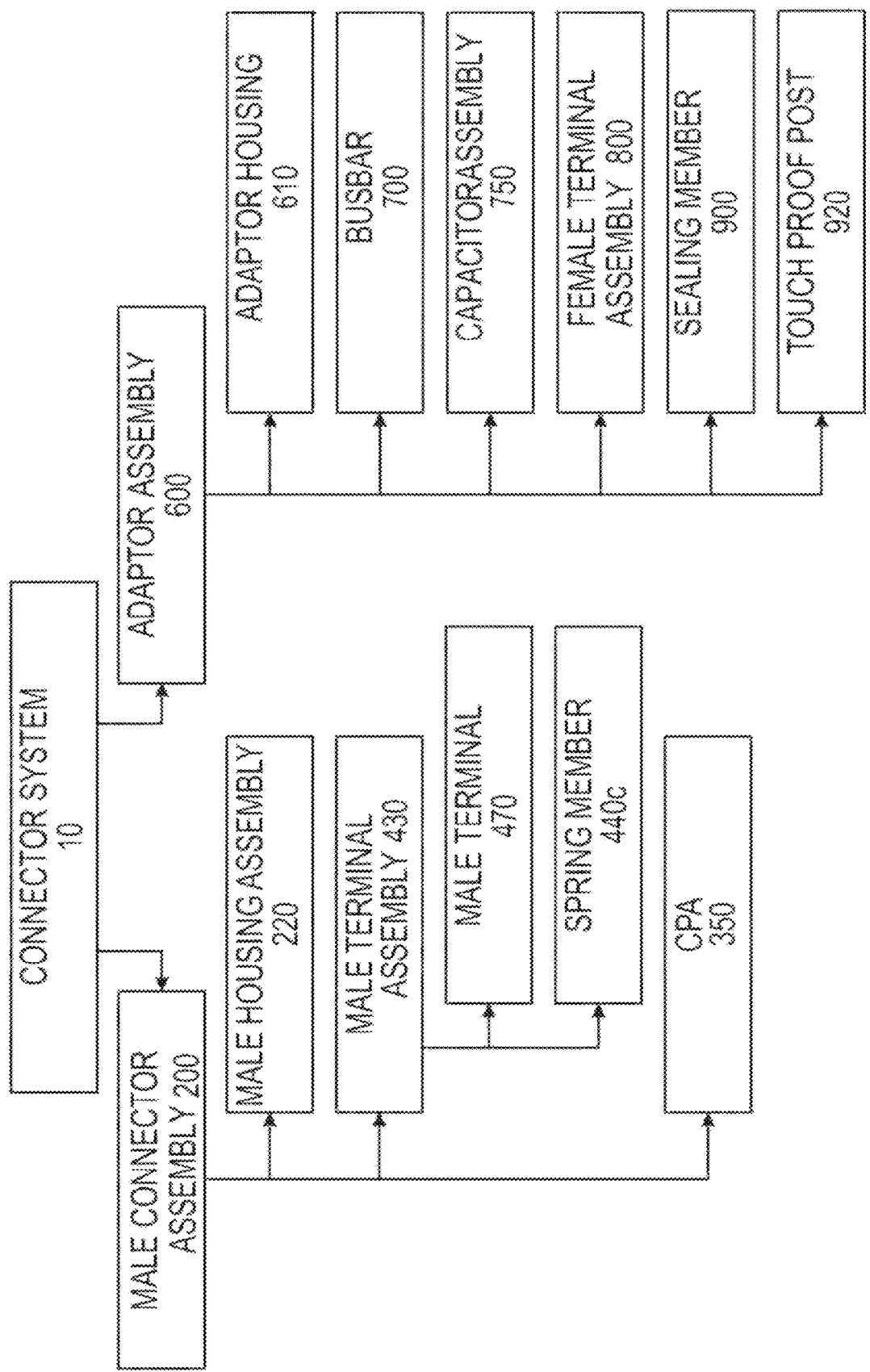
FIG. 118 is a block diagram showing components of the connector system.
Figure 119:
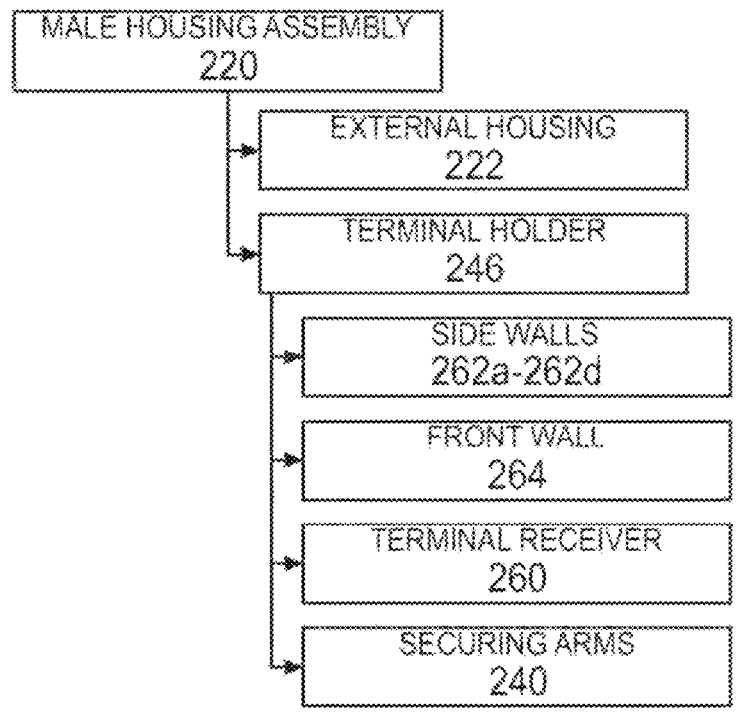
FIG. 119 is a block diagram showing components of the male housing assembly.

As shown in FIGS. 2-3 and 118, the connector system 10 includes male connector assembly 200 that has a male housing assembly 220 and a male terminal assembly 430. The male connector assembly 200 includes the male housing assembly 220 having an external housing 222 and a terminal holder 246 that removably couples the male terminal assembly 430 within the external housing 222. Referring to FIGS. 2-3 and 119, the external housing 222 includes an arrangement of walls 223 that form a receptacle that receives the male terminal holder 246 and the male terminal assembly 430. In addition, the arrangement of walls 223 are designed to function with and provide the system 10 with a connector position assurance (CPA) assembly 350. Additional details about external housing 222 and the CPA assembly 350 are shown and described within PCT/US2020/49870 and thus for sake of brevity will not be repeated herein.

The male terminal holder 246 includes: (i) a terminal receiver 260 and (ii) securing arms 240. As shown in FIG. 2, the terminal receiver 260 includes: (i) an arrangement of side walls 262a-262d and (ii) front wall 264. The combination of the arrangement of side walls 262a-262d and the front wall 264 forms a rectangular bowl 266 that is configured to snugly receive a majority of the male terminal assembly 430. This configuration provides additional rigidity to the male terminal assembly 430 and limits the exposed amount of the male terminal assembly 430. However, the entire male terminal assembly 430 is not encased by the male terminal holder 246. Thus, to facilitate the coupling of the male terminal 430 to the female terminal assembly 800, the side walls 262a-262d each have male terminal openings 268a-268d there through. The male terminal openings 268a-268d are disposed through an intermediate portion of the side walls 262a-262d and are configured to permit an extent of the male terminal assembly 430 to extend through or past the side walls 262a-262d to enable the male terminal assembly 430 to contact the female terminal assembly 800. The male terminal openings 268a-268d may be configured such that they are not large enough to accept the insertion of an assembler's finger, a probe, or another foreign body.

It should be understood that the further the male terminal assembly 430 extends past the outer surface 274, there is a greater chance that male terminal assembly 430 will accidentally come into contact within a foreign body. Thus, the extent of the male terminal assembly 430 that extends past the outer surface 274 needs to balance the ability to form a proper connection with the female terminal assembly 800. The design disclosed herein balances these factors and the extent of the male terminal assembly 430 extends beyond the outer surface 274 by less than 2 mm and preferably less than 0.5 mm. In comparison to the length of the male terminal openings 268a-268d, the extent of the male terminal assembly 430 extends beyond the outer surface 274 is less than 8% of the length and preferably less than 4% of the length.

Also, as shown in FIG. 2, the securing arms 240 are integrally formed with the male terminal holder 246 and are designed to be removably coupled to the external housing 222. To allow for this removable coupling, the securing arms 240 are designed to elastically deform inwardly (i.e., towards the interior of the bowl 266) based on an interactions with projections that are formed on the inner surface of the external housing 222 upon the application of a first insertion force, $F_I$. After applying a significant amount of force, $F_I$, the securing arms 240 will return to a non-deformed state and in doing so may cause an audible sound (e.g., click), which inform the assembler that the male terminal assembly 430 is properly seated within the external housing 222; thus meeting industry standards and/or requirements (e.g., USCAR). From this disclosure, it should be apparent that the configuration of the housing 222 and the male terminal holder 246 provide a way of releasably coupling the male terminal assembly 430 within the external housing 222. It should be understood that the securing arms 240 may include a different arrangement, combination, or number of components. For example, securing arms 240 may include structures that utilize magnetic forces, spring forces, material biasing forces, compression force or a combination of these forces.

The male terminal holder 246 is configured to be placed in contact with the male terminal assembly 430; thus, it is desirable to form the male terminal holder 246 from a non-conductive material. It should be understood that the non-conductive material that is chosen should be able to sufficiently isolate the terminal assembly 430, even when a high current load is flowing through the terminal assembly 430. As discussed above and in other parts of this application, the male terminal holder 246 may be formed using any suitable method, such as injection molding techniques, 3D printing, cast, thermoformed, or any other similar technique.

Figure 116:
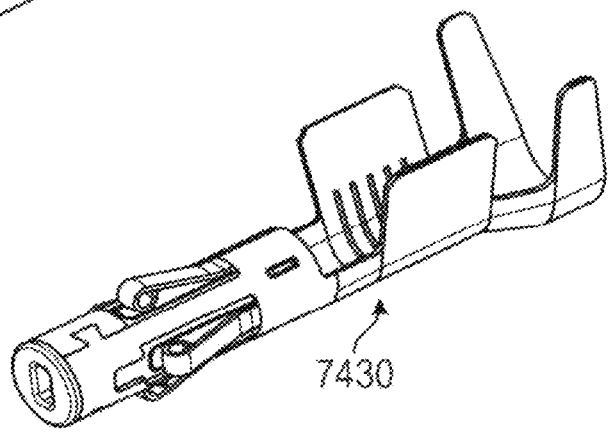
Figure 117:
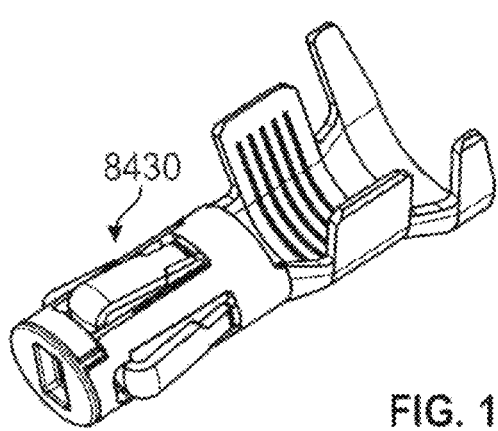

In other embodiments, the configuration of the rectangular bowl 266 and the male terminal openings 268a-268d may have a different configuration to accommodate a different shaped male terminal assembly 430. For example, the rectangular bowl 266 may be modified for the male terminal assembly 4430 shown in FIG. 113, wherein such modification includes an elongated rectangular configuration and may not have openings formed in every side wall 262a-262d because each side of the terminal does not include a contact arm. Alternatively, the rectangular bowl 266 may have a substantially circular configuration to accept the male terminal assemblies shown and described within FIGS. 116 and 117. In further embodiments, the rectangular bowl 266 may be triangular, hexagonal or any other shape.

FIGS. 2-3 show a first embodiment of the male terminal assembly 430, while other embodiments of the male terminal assembly are shown in FIGS. 111-117. Referring specifically to the first embodiment, the male terminal assembly 430 includes a spring member 440c and a male terminal 470.

Figure 109:
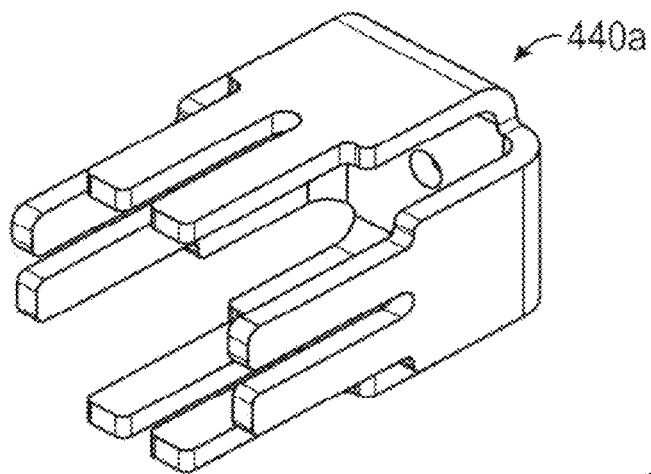
FIGS. 109-110 show alternative embodiments of spring members that may be utilized in the male connector assembly of the connector system of FIGS. 1 and 54.
Figure 110:
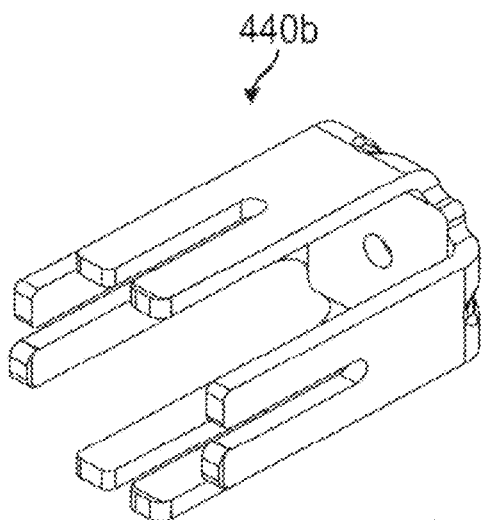
Figure 111:
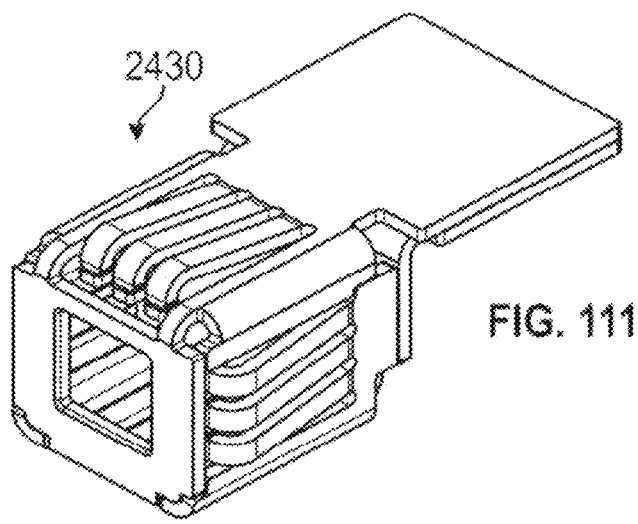
FIGS. 111-117 show alternative embodiments of male terminal bodies that may be utilized in the male connector assembly of the connector system of FIGS. 1 and 54.
Figure 112:
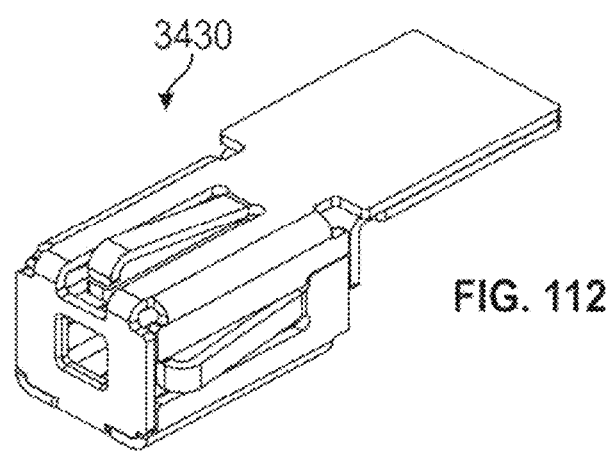
Figure 120:
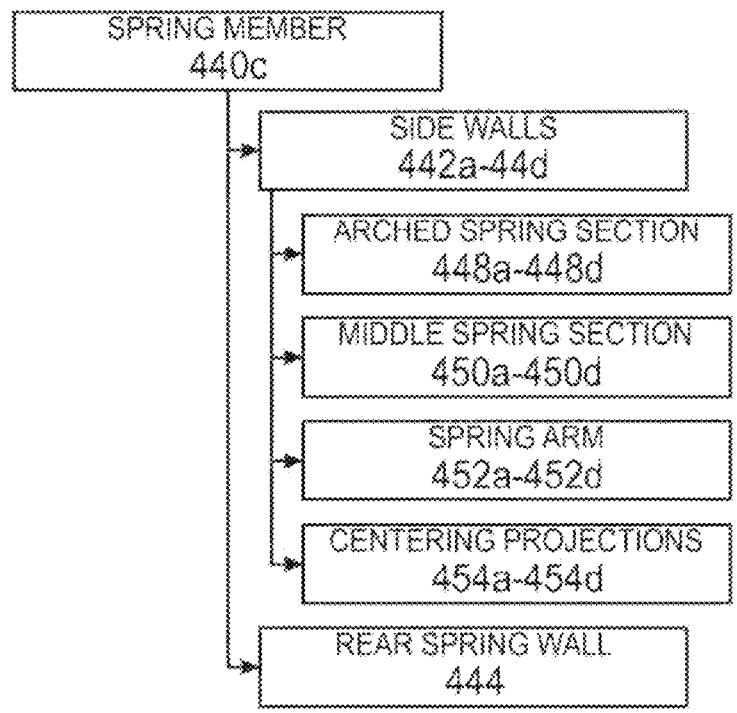
FIG. 120 is a block diagram showing components of the spring member.

A first embodiment of the spring member 440c is shown in FIGS. 2-3, while two other embodiments 440a and 440b are shown in FIGS. 109 and 110. Additional disclosure about these alternative embodiments is contained within PCT/US2019/236976. Returning to the first embodiment of the spring member 440c that is shown in FIGS. 2-3 and 120, said spring member 440c includes an arrangement of spring member side walls 442a-442d and a rear spring wall 444. The arrangement of spring member side walls 442a-442d each is comprised of: (i) a first or arched spring section 448a-448d, (ii) a second spring section, a base spring section, or a middle spring section 450a-450d, and (iii) a third section or spring arm 452a-452d. The arched spring sections 448a-448d extend between the rear spring wall 444 and the base spring sections 450a-450d and position the base spring sections 450a-450d substantially perpendicular to the rear spring wall 444. In other words, the outer surface of the base spring sections 450a-450d is substantially perpendicular to the outer surface of the rear spring wall 444.

The base spring sections 450a-450d are positioned between the arched sections 448a-448d and the spring arms 452a-452d. As shown in FIG. 2-3, the base spring sections 450a-450d are not connected to one another and thus middle section gaps are formed between the base spring sections 450a-450d of the spring member 440c. The gaps aid in omnidirectional expansion of the spring arms 452a-452d, which facilitates the mechanical coupling between the male terminal 470 and the female terminal assembly 800. The spring arms 452a-452d extend from the base spring sections 450a-450d of the spring member 440c, away from the rear spring wall 444, and terminate at the free end 446. The spring arms 452a-452d are generally coplanar with the base spring sections 450a-450d and as such the outer surface of the spring arms 452a-452d are coplanar with the outer surface of the base spring sections 450a-450d. Unlike the spring arm 31 that is disclosed within FIGS. 4-8 of PCT/US2018/019787, the free end 446 of the spring arms 452a-452d does not have a curvilinear component. Instead, the spring arms 452a-452d have a substantially planar outer surface. This configuration is beneficial because it ensures that the forces associated with the spring member 440c are applied substantially perpendicular to the free end 488 of the male terminal body 472. In contrast, the curvilinear components of the spring arm 31 are disclosed within FIGS. 4-8 of PCT/US2018/019787 do not apply a force in this manner.

Like the base spring sections 450a-450d, the spring arms 452a-452d are not connected to one another. In other words, there are spring arm openings that extend between the spring arms 452a-452d. This configuration allows for the omnidirectional movement of the spring arms 452a-452d, which facilitates the mechanical coupling between the male terminal 470 and the female terminal assembly 800. In other embodiments, the spring arms 452a-452d may be coupled to other structures to restrict their omnidirectional expansion. The number and width of individual spring arms 452a-452d and openings may vary. In addition, the width of the individual spring arms 452a-452d is typically equal to one another; however, in other embodiments one of the spring arms 452a-452d may be wider than other spring arms.

In contrast to the two embodiments 440a, 440b that are shown in FIGS. 109 and 110, the first embodiment 440c that is shown in FIGS. 2-3 includes a centering means 453, which is shown as centering projections 454a-454d. Specifically, the centering projections help center the spring member 440c within the male terminal body 472 by limiting the amount the spring member 440c can rotate during the insertion of the spring member 440c within the male terminal body 472. Additional disclosure about said centering means 453 is disclosed within U.S. Provisional Application 63/058,061. The spring member 440c is typically formed from a single piece of material (e.g., metal). Therefore, the spring member 440c is a one-piece spring member 440c or has integrally formed features. In particular, the following features are integrally formed: (i) the rear spring wall 444, (ii) the curvilinear sections 448a-448d, (iii) the base spring sections 450a-450d, and (iii) the spring arms 452a-452d. To integrally form these features, the spring member 440c is typically formed using a die forming process. The die forming process mechanically forces the spring member 440c into shape. As discussed in greater detail below and in PCT/US2019/036010, when the spring member 440c is formed from a flat sheet of metal, installed within the male terminal body 472 and connected to the female terminal assembly 800, and is subjected to elevated temperatures, the spring member 440c applies an outwardly directed spring thermal force $S_{TF}$ on the contact arms 494a-494d due in part to the fact that the spring member 440c attempts to return to a flat sheet. However, it should be understood that other types of forming the spring member 440c may be utilized, such as casting or using an additive manufacturing process (e.g., 3D printing). In other embodiments, the features of the spring member 440c may not be formed from a one-piece or be integrally formed, but instead formed from separate pieces that are welded together.

Figure 121:
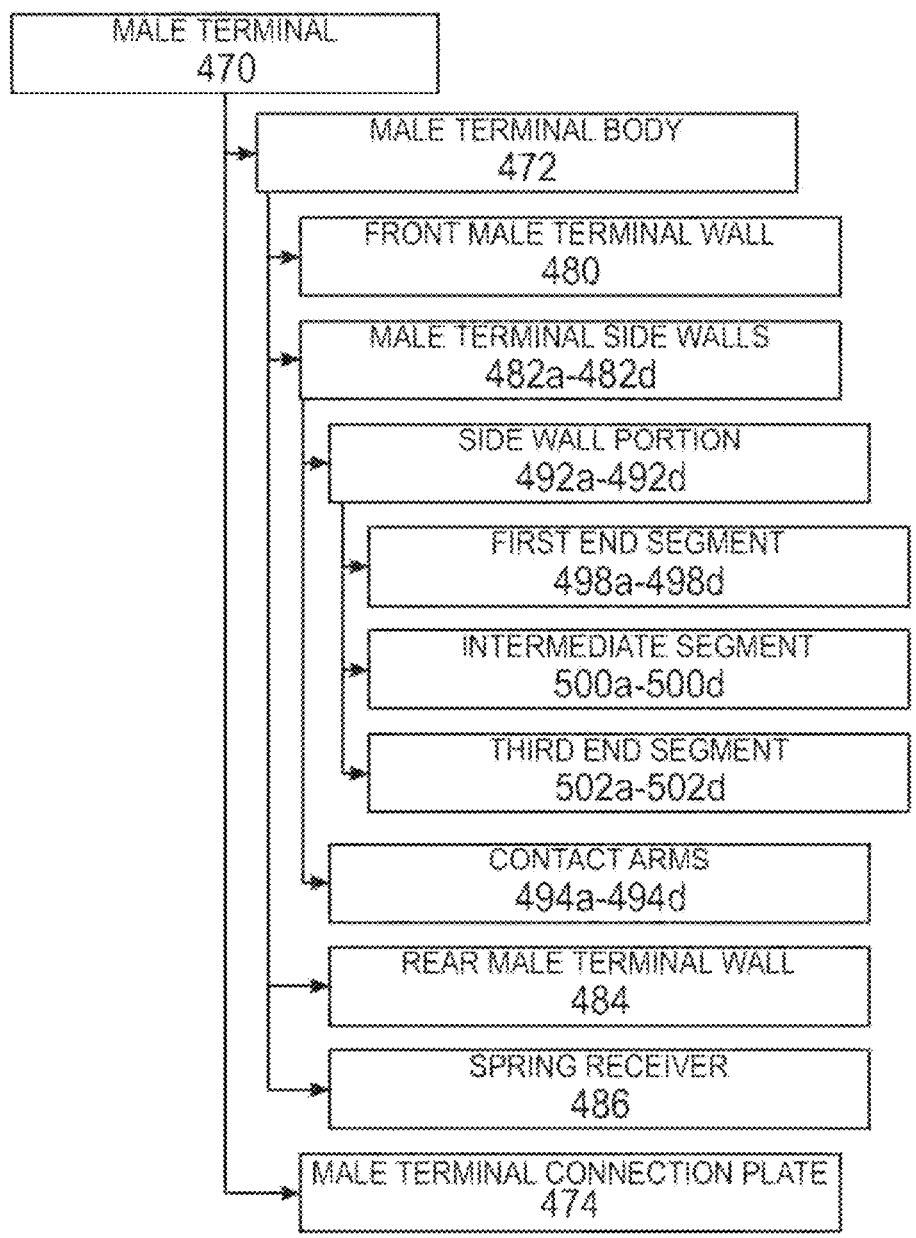
FIG. 121 is a block diagram showing components of the male terminal.
Figure 122:
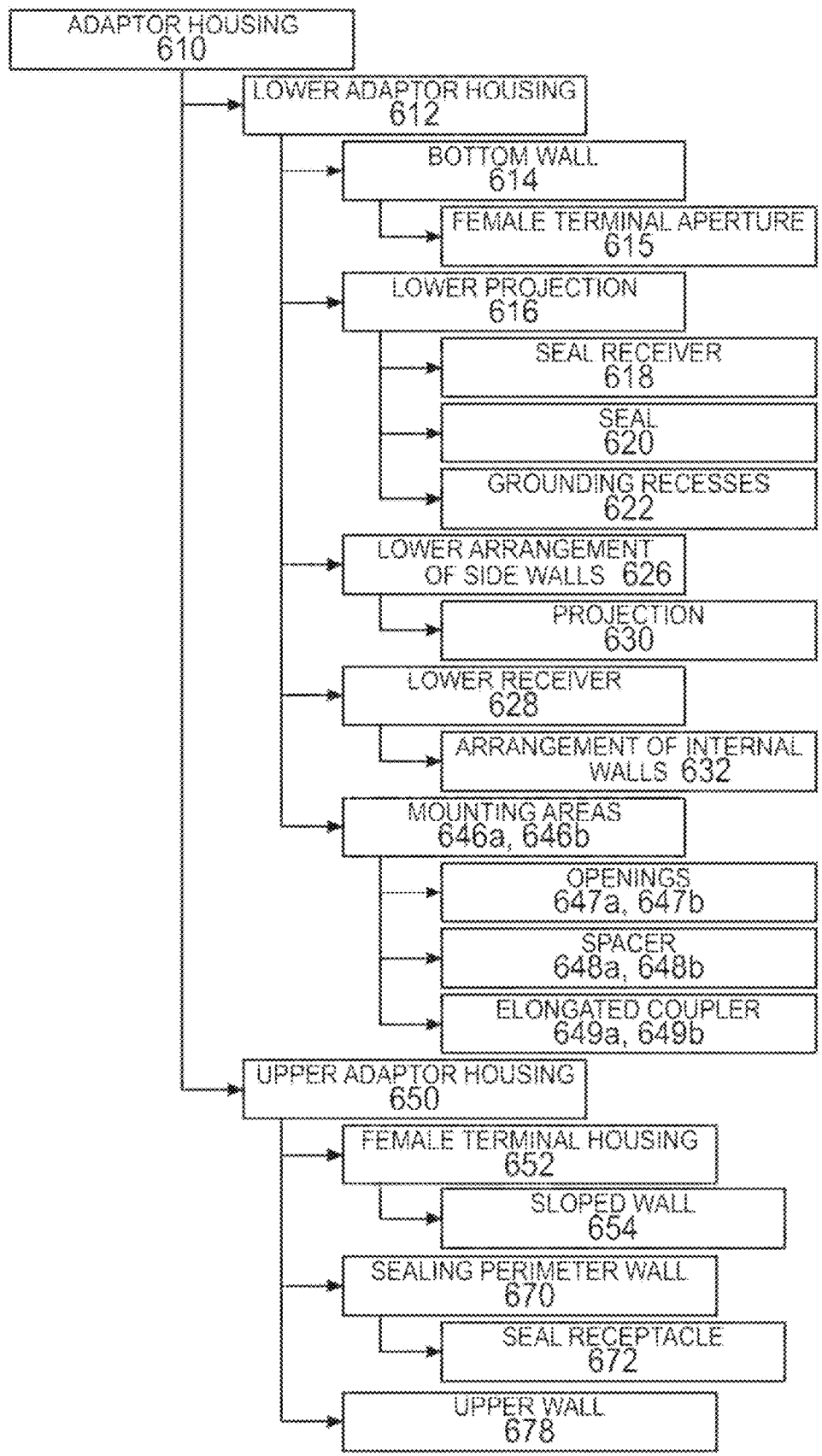
FIG. 122 is a block diagram showing components of the adaptor housing.
Figure 123:
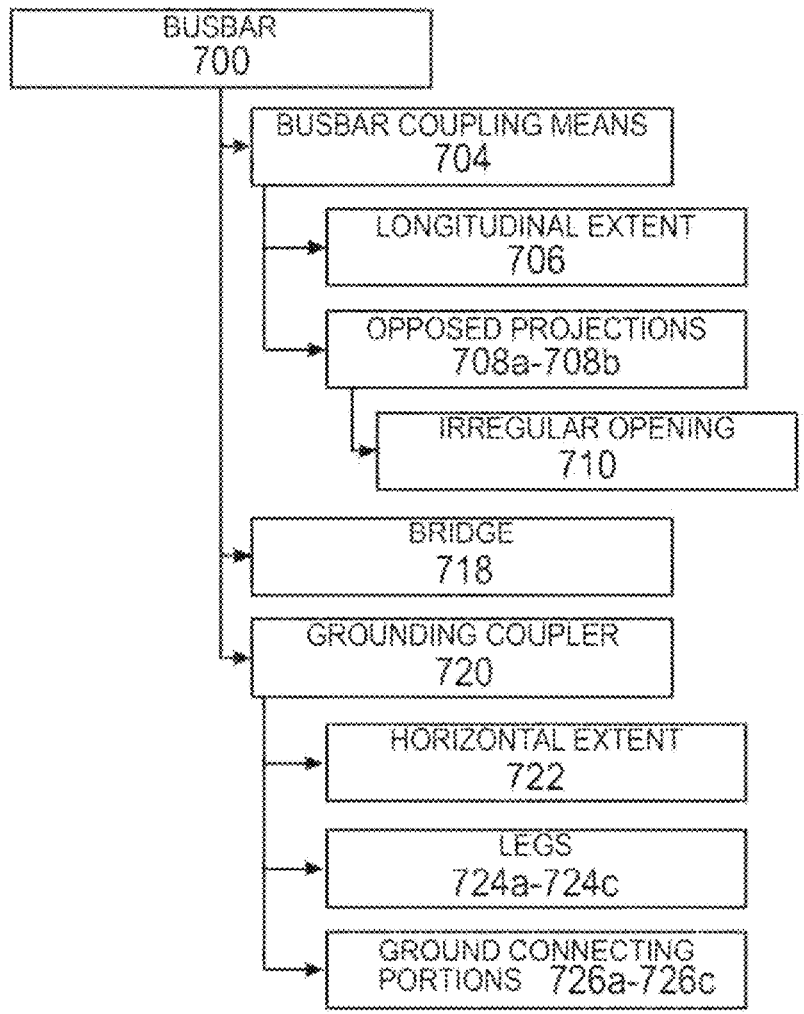
FIG. 123 is a block diagram showing components of the busbar.
Figure 124:
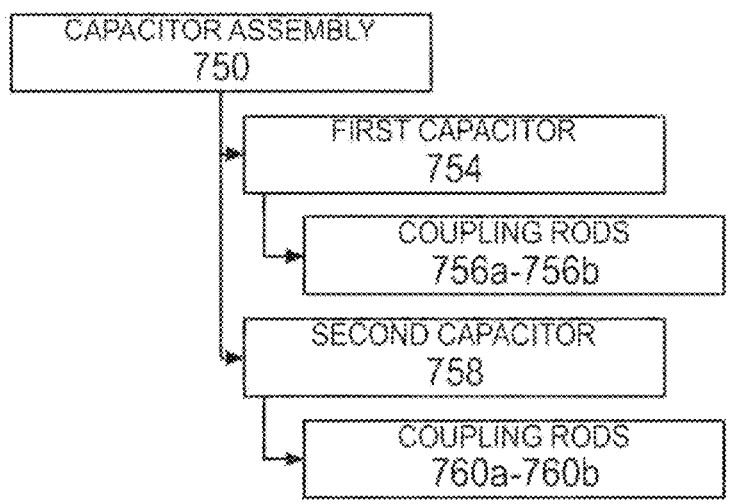
FIG. 124 is a block diagram showing components of the capacitor assembly.
Figure 125:
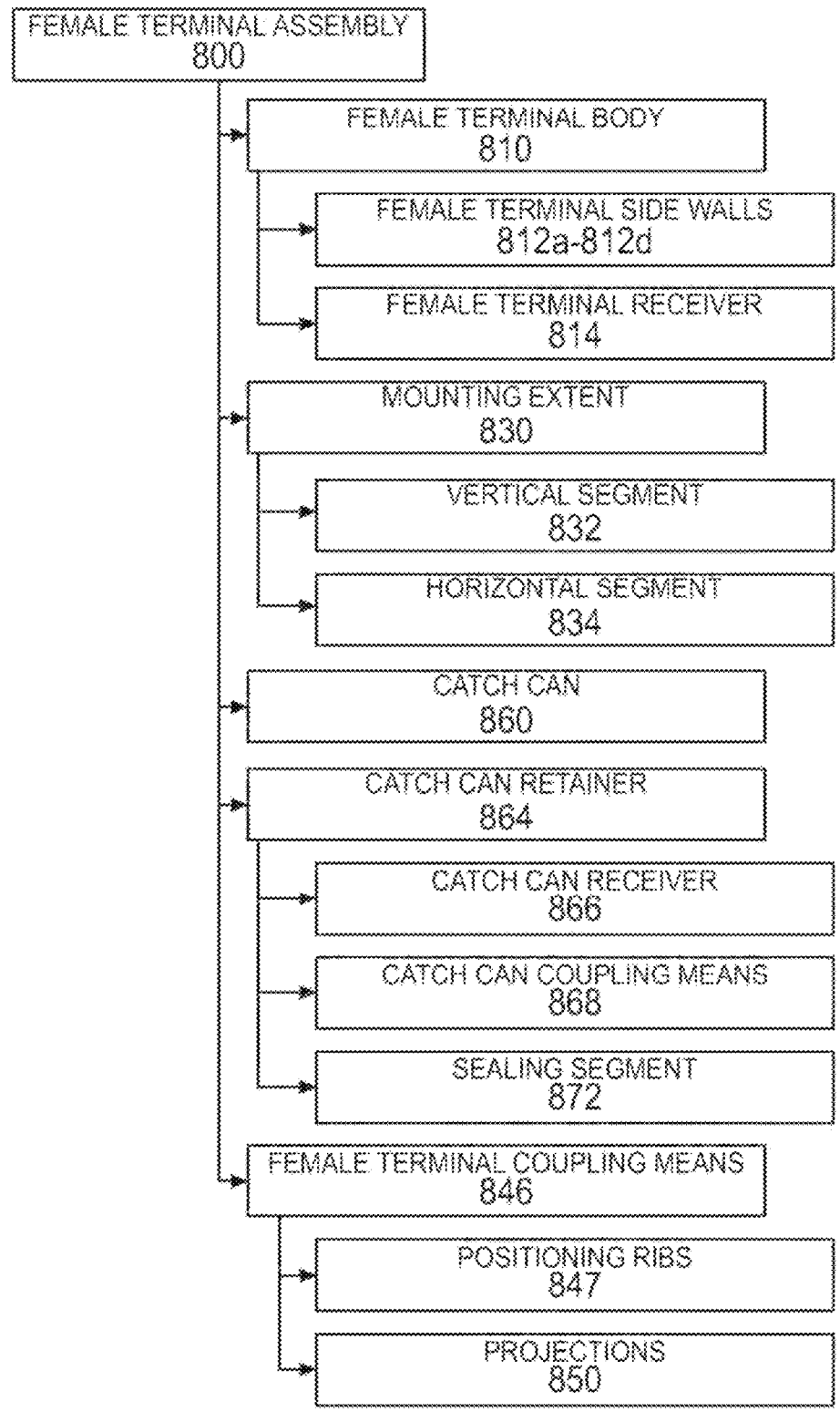
FIG. 125 is a block diagram showing components of the female terminal assembly.

Referring to FIGS. 2-3 and 121, the first embodiment of the male terminal 470 includes: (i) a male terminal body 472 and (ii) a male terminal connection plate 474. The male terminal connection plate 474 is configured to receive an extent of a wire 590, a busbar, or any other type of an electrical connector. The wire 590 is typically welded to the connection plate 474; however, other methods of connecting the wire 590 to the connection plate 474 are contemplated by this disclosure. Referring now to the male terminal body 472, said male terminal body 472 has: (i) a first or front male terminal wall 480, (ii) an arrangement of male terminal side walls 482a-482d, and (iii) a second or rear male terminal wall 484. The combination of these walls 480, 482a-482d forms a spring receiver 486. The arrangement of male terminal side walls 482a-482d are coupled to one another and generally form a rectangular prism. The arrangement of male terminal side walls 482a-482d includes: (i) a side wall portion 492a-492d, which generally has a "U-shaped" configuration, (ii) contact arms 494a-494h, and (iii) a plurality of contact arm openings. As best shown in FIG. 3, the side wall portions 492a-492d are substantially planar and have a U-shaped configuration. The U-shaped configuration is formed from three substantially linear segments, wherein a second or intermediate segment 500a-500d is coupled on one end to a first or end segment 498a-498d and on the other end to a third or opposing end segment 502a-502d. The contact arms 494a-494d extent: (i) from an extent of the intermediate segment 500a-500d of the side wall portion 492a-492d, (ii) away from the rear male terminal wall 484, (iii) across an extent of the contact arm openings 496a-496h, and (iv) terminate just short of the front male terminal wall 480. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 470 can be installed in narrower, restrictive spaces, (ii) has a higher current carrying capacity, (iii) is easier to assemble, (iv) improved structural rigidity because the contact arms 494a-494d are positioned inside of the first male terminal side wall portion 492a-492d, (iv) benefits that are disclosed in connection with PCT/US2019/036010, and (v) other beneficial features that are disclosed herein or can be inferred by one of ordinary skill in the art from this disclosure.

The contact arms 494a-494d extend away from the second or intermediate segment 500a-500d and rear male terminal wall 484 at an outward angle. The contact arms 494a-494d are separated from one another by openings that allow for omnidirectional expansion. In particular, the outward angle may be between 0.1 degree and 16 degrees between the outer surface of the extent of the male terminal side wall 492a-492d and the outer surface of the first extent of the contact arms 494a-494d, preferably between 5 degrees and 12 degrees and most preferably between 7 degrees and 8 degrees. This configuration allows the contact arms 494a-494d to be deflected or displaced inward and towards the center of the male terminal 470 by the female terminal assembly 800, when the male terminal assembly 430 is inserted into the female terminal assembly 800. This inward deflection is best shown in FIGS. 16-17 and 27-28 of PCT/US2019/036010. This inward deflection helps ensure that a proper mechanical and electrical connection is created by ensuring that the contact arms 494a-494d are placed in contact with the female terminal assembly 800.

The terminal ends of the contact arms 494a-494d are positioned: (i) within an aperture formed by the U-shaped side wall portions 492a-492d, (ii) within the spring receiver 486, (iii) substantially parallel to the male terminal side wall 492a-492d, and (iv) in contact the planar outer surface of the spring arms 452a-452d, when the spring member 440c is inserted into the spring receiver 486. This configuration is beneficial over the configuration shown in FIGS. 3-8 in PCT/US2018/019787 because the assembler of the male terminal assembly 430 does not have to apply a significant force in order to deform a majority of the contact arms 494a-494d outward to accept the spring member 440c. This required deformation can best be shown in FIG. 6 of PCT/US2018/019787 due to the slope of the contact arm 11 and the fact the outer surface of the spring arm 31 and the inner surface of the contact arm 11 are adjacent to one another without a gap formed there between. In contrast to FIGS. 3-8 in PCT/US2018/019787, FIGS. 13, 16-17, and 27-28 of the present application show a gap that is formed between the outer surfaces of the spring member 440c and the inner surface of the contact arms 494a-494d. Accordingly, very little force is required to insert the spring member 440c into the spring receiver 486 due to the fact the assembler does not have to force the contact arms 494a-494d to significantly deform during the insertion of the spring 440c.

The male terminal 470 is typically formed from a single piece of material (e.g., metal). Therefore, the male terminal 470 is a one-piece male terminal 470 and has integrally formed features. To integrally form these features, the male terminal 470 is typically formed using a die-cutting process. However, it should be understood that other types of forming the male terminal 470 may be utilized, such as casting or using an additive manufacturing process (e.g., 3D printing). In other embodiments, the features of the male terminal 470 may not be formed from a one-piece or be integrally formed, but instead formed from separate pieces that are welded together. In forming the male terminal 470, it should be understood that any number (e.g., between 1 and 100) of contact arms 494a-494d may be formed within the male terminal 470.

FIGS. 2-3 depict the first embodiment of the male terminal assembly 430, while FIGS. 111-117 depict alternative embodiments of the male terminal assemblies 2430, 3430, 4340, 5430, 6430, 7430, 8430. Due to the similarities between the first embodiment 430 and the other embodiments 1430, 2430, 3430, 4340, 5430, 6430, 7430, 8430 the above disclosure will not be repeated for each of these additional embodiment for sake of brevity. However, it should be understood that like numbers represent like structures. Additionally, because of the similarities between these terminals, the below disclosure that relates to the properties of the terminals applies in equal force to all embodiments of the male terminal assemblies 430 shown and/or disclosed within this application.

As disclosed within PCT/US2019/036010, the combination of outer surfaces of the contact arms 494a-494d form a rectangle that has a width/height that is slightly larger (e.g., between 0.1% and 15%) than the width/height of the rectangle that is associated with the female terminal assembly 800. When the slightly larger male terminal assembly 430 is inserted into the slightly smaller female terminal receiver 814, the outer surface of the contact arms 494a-494d are forced towards the center of the male terminal assembly 430. Because the outer surface of the contact arms 494a-494d is forced towards the center of the male terminal assembly 430, the free end 446 of the spring member 440c are also forced towards the center of the male terminal assembly 430. The spring 440c resists this inward displacement by providing a spring biasing force $S_{BF}$ (as depicted by the arrows labeled "$S_{BF}$" in FIG. 30 of PCT/US2019/036010). This spring biasing force $S_{BF}$ is generally directed outward against the free ends 488 of the male terminal 470. In other words, this spring biasing force $S_{BF}$ provides a wedging or shimmering effect against the contact arms 494a-494d thereby holding the outer surfaces of the contact arms 494a-494d in engagement with the female terminal assembly 800.

Figure 113:
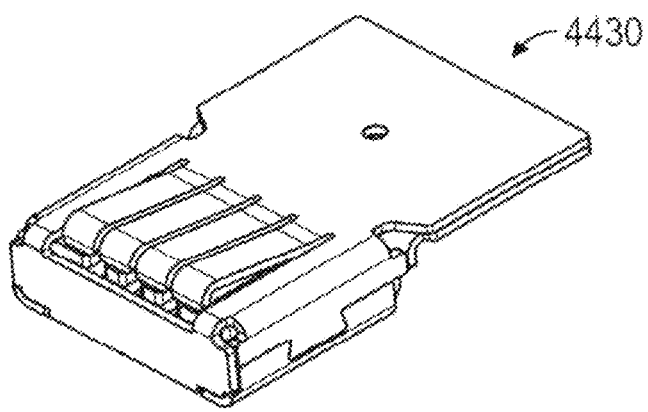
Figure 114:
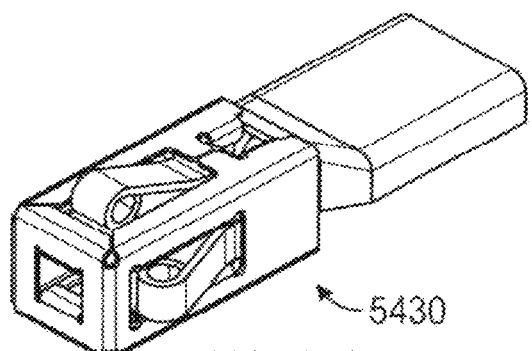
Figure 115:
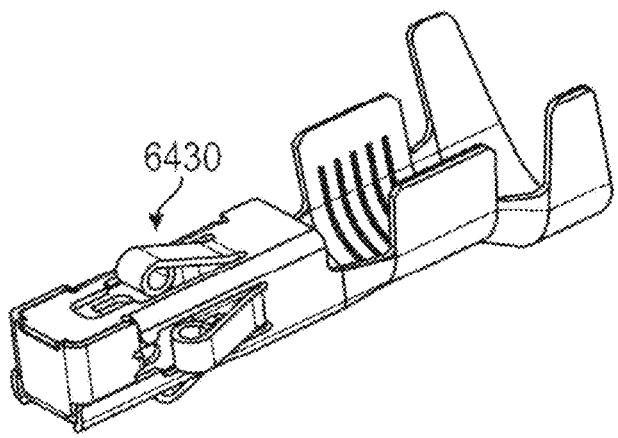

The first embodiment of the male terminal assembly 430 shows a male terminal 470 that is 360° compliant, which meets a certain car or automotive specifications. The male terminal 470 is 360° compliant because the outer surface of the contact arms 494a-494d are designed to make contact with each side wall of the female terminal assembly 800 and the spring biasing force $S_{BF}$ applies out a force that is generally directed outward from the center in all four primary directions (e.g., up, down, left, and right). The 360° compliance attribute aids in maintaining mechanical and electrical connections under strenuous mechanical conditions, e.g., vibration. In a conventional blade or fork-shaped connectors, i.e., connection on only two opposing sides, vibration may develop a harmonic resonance that causes the connector to oscillate with greater amplitude at specific frequencies. For example, subjecting a fork-shaped connector to harmonic resonance may cause the fork-shaped connector to open. The opening of the fork-shaped connector during electrical conduction is undesirable because the momentary mechanical separation of the fork-shaped connector from an associated terminal may result in electrical arcing. Arcing may have significant negative effects on the terminal as well as the entire electrical system of which the terminal is a component. However, the 360° compliance feature of the present disclosure may prevent catastrophic failures caused by strong vibration and electrical arcing. It should be understood that some of the embodiments of the male terminal assemblies 430, 1430, 2430, 3430, 4340, 5430, 6430, 7430, 8430 may not be 360 degree compliant. For example, the male terminal assembly 4430 that is shown in FIG. 113 is not 360 degree compliant because it does not have contact arms that are formed within each of the side walls of this terminal.

The male terminal 470, including the contact arms 494a-494d, may be formed from a first material such as copper, a highly-conductive copper alloy (e.g., C151 or C110), aluminum, and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS Likewise, C110 has a conductivity of 101% IACS. In certain operating environments or technical applications, it may be preferable to select C151 because it has anti-corrosive properties desirable for high-stress and/or harsh weather applications. The first material for the male terminal 470 is C151 and is reported, per ASTM B747 standard, to have a modulus of elasticity (Young's modulus) of approximately 115-125 gigaPascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius). The spring member 440a, 440b, 440c may be formed from a second material such as spring steel, stainless steel (e.g., 301SS, ¼ hard), and/or another suitable material having greater stiffness (e.g., as measured by Young's modulus) and resilience than the first material of the male terminal 470. The second material preferably has an electrical conductivity that is less than the electrical conductivity of the first material. The second material also has a Young's modulus that may be approximately 193 GPa at room temperature and a coefficient of terminal expansion (CTE) of approximately 17.8 ppm/degree Celsius (from 0-315 degrees Celsius) and 16.9 ppm/degree Celsius (from 0-100 degrees Celsius).

Based on the above exemplary embodiment, the Young's modulus and the CTE of the spring member 440a, 440b, 440c is greater than the Young's modulus and the CTE of the male terminal 470. Thus, when the male terminal 470 is used in a high power application that subjects the system 10 to repeated thermal cycling with elevated temperatures (e.g., approximately 150° Celsius) then: (i) the male terminal 470 become malleable and loses some mechanical resilience, i.e., the copper material in the male terminal 470 softens and (ii) the spring member 440a, 440b, 440c does not become as malleable or lose as much mechanical stiffness in comparison to the male terminal 470. Thus, when utilizing a spring member 440a, 440b, 440c that is mechanically cold forced into shape (e.g., utilizing a die forming process) and the spring member 440a, 440b, 440c is subjected to elevated temperatures, the spring member 440a, 440b, 440c will attempt to at least return to its uncompressed state, which occurs prior to insertion of the male terminals assembly 430 within the female terminal assembly 800, and preferably to its original flat state, which occurs prior to the formation of the spring member 440a, 440b, 440c. In doing so, the spring member 440a, 440b, 440c will apply a generally outward directed thermal spring force $S_{TF}$ (as depicted by the arrows labeled "$S_{TF}$" in FIG. 30 of PCT/US2019/36010) on the free end 1488 of the male terminal 470. This thermal spring force $S_{TF}$ is dependent upon local temperature conditions, including high and/or low temperatures, in the environment where the system 10 is installed. Accordingly, the combination of the spring biasing force $S_{BF}$ and the thermal spring force $S_{TF}$ provides a resultant biasing force S RBF that ensures that the outer surface of the contact arms 494a-494d are forced into contact with the inner surface of the female terminal assembly 800 when the male terminal 470 is inserted into the female terminal assembly 800 and during operation of the system 10 to ensure an electrical and mechanical connection. Additionally, with repeated thermal cycling events, the male terminal assembly 430 will develop an increase in the outwardly directed resultant spring forces S RBF that are applied to the female terminal assembly 800 during repeated operation of the system 10. It should be understood that additional details about the male terminal 470 and the spring 440a, 440b, 440c are discussed within PCT/US2020/13757, PCT/US2019/36127, PCT/US2019/36070, and PCT/US2019/36010.

FIGS. 1-2 and 4-53 show a first embodiment of an adaptor assembly 600 with a female terminal assembly 800. The adaptor assembly 600 includes: (i) adaptor housing 610, (ii) busbar 700, (iii) capacitor assembly 750, and (iv) a female terminal assembly 800. The adaptor housing 610 is designed to at least: (i) protect the female terminal assembly 800 from external objects by encapsulating a majority of the female terminal assembly 800, (ii) aid in the coupling of the male terminal assembly 430 to the female terminal assembly 800, (iii) provide a sealed environment to house the capacitor assembly 750, (iv) support the coupling of the capacitor assembly 750 with the female terminal assembly 800, and (v) provide a sealed between the male connector assembly 200 and the DC-DC housing 8 through a pair of capacitors 754, 758. To achieve these design objectives, the adaptor housing 610 is comprised of a lower adaptor housing 612 and an upper adaptor housing 650. To note, for space and other considerations only an extent of the DC-DC housing 8 of the DC-DC converter 7 is shown within the FIGS. 1-105. Meanwhile generalized versions of the DC-DC converter 7 and its housing 8 are shown in FIGS. 106 and 107.

Referring to FIGS. 5, 6, 16, 18, 45, 47, 49, 53 and 122, the lower adaptor housing 612 includes: (i) a bottom wall 614 that has a female terminal aperture 615 formed therein to receive an extent of the female terminal assembly 800, (ii) a lower projection 616 that extends downward from the bottom surface of the bottom wall 614, (iii) a lower arrangement of side walls 626 that form a lower receiver 628, and (iv) two mounting areas 646a, 646b that extend from an opposite sides of the lower adaptor housing 612. The lower projection 616 is substantially cylindrical and is designed to fit within an extent of the housing 8 of the DC-DC converter 7. To help ensure that a proper seal (e.g., water resistant/high-pressure spray) is formed between the lower projection 616 and the DC-DC housing 7, a seal receiver 618 is formed within the lower projection 616 that is designed to receive an extent of a seal 620. The seal 620 may be made from any suitable material, such as rubber, silicon, or etc. The lower projection 616 also includes a plurality of grounding recesses 622 that are configured to receive an extent of the busbar 700. It should be understood that the lower projection 616 may have other shapes (e.g., triangular prism, a pentagonal prism, a hexagonal prism, octagonal prism, sphere, a cone, a tetrahedron, or a cuboid), as the components in a power management system (e.g., DC-DC housing 8) may have different openings or configurations that the lower projection should match in order to help ensure that a proper seal is created between the lower projection 616 and the components in a power management system (e.g., DC-DC housing 8). It should also be understood that more than one (e.g., two or three) seal receiver 618 and seal 620 may be utilized. Further, a seal 620 may be used without a seal receiver 618.

The lower arrangement of side walls 626 are configured to mate with an upper wall 678 of the upper adaptor housing 650 to form a proper seal (e.g., water resistant/high-pressure spray). In the embodiments shown in the Figures, this mating of the lower side walls 626 and the upper wall 678 is achieved by a projection 630 that extends upward from the lower arrangement of side walls 626 and is received by an extent of the upper wall 678. The receiver 628 is designed to receive, house, secure, and position an extent of the capacitor assembly 750, the busbar 700, and the female terminal assembly 800. To achieve these objectives, positioned within the receiver 628 is an arrangement of internal walls 632 that extend upward from an inner surface of the bottom wall 614. In particular, this arrangement of internal walls 632 is designed to: (i) extend around the perimeter of the combination of the capacitor assembly 750 and the female terminal assembly 800, (ii) support a capacitor coupling means 702, which will be discussed in greater detail below, and (iii) minimize the amount of sealing material 900 that must be included within the system 10. It should be understood that in alternative embodiments, the arrangement of internal walls 632 may be omitted or its shape may change (e.g., to accommodate capacitors with different shapes, more or less capacitors, or may not extend around the entire perimeter of the combination of the capacitor assembly 750 and the female terminal assembly 800).

Figure 106:
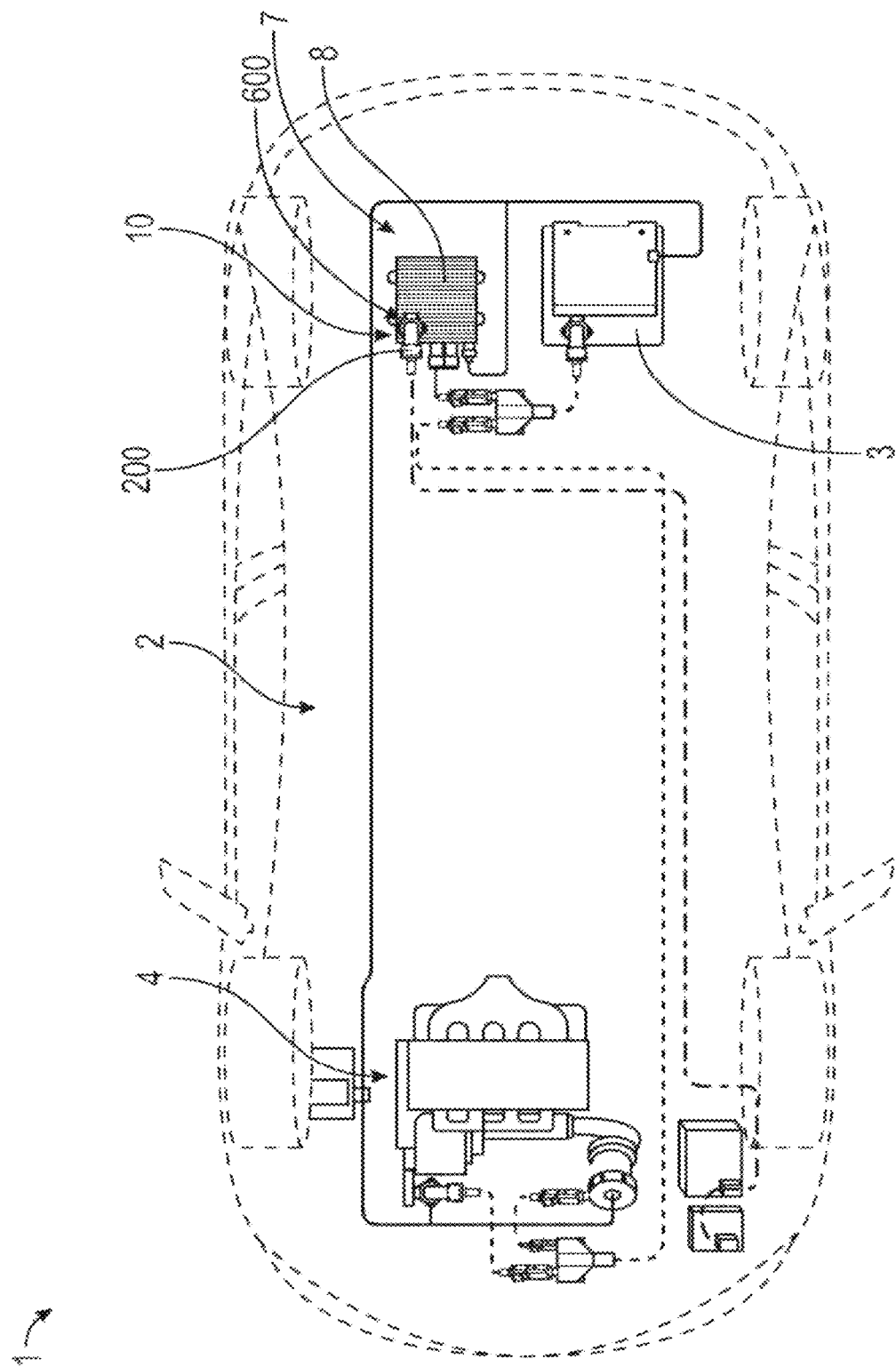
FIG. 106 is a simplified electrical wiring diagram of a motor vehicle that includes the connector system and at least one DC-DC converter of FIGS. 1 and 54.
Figure 107:
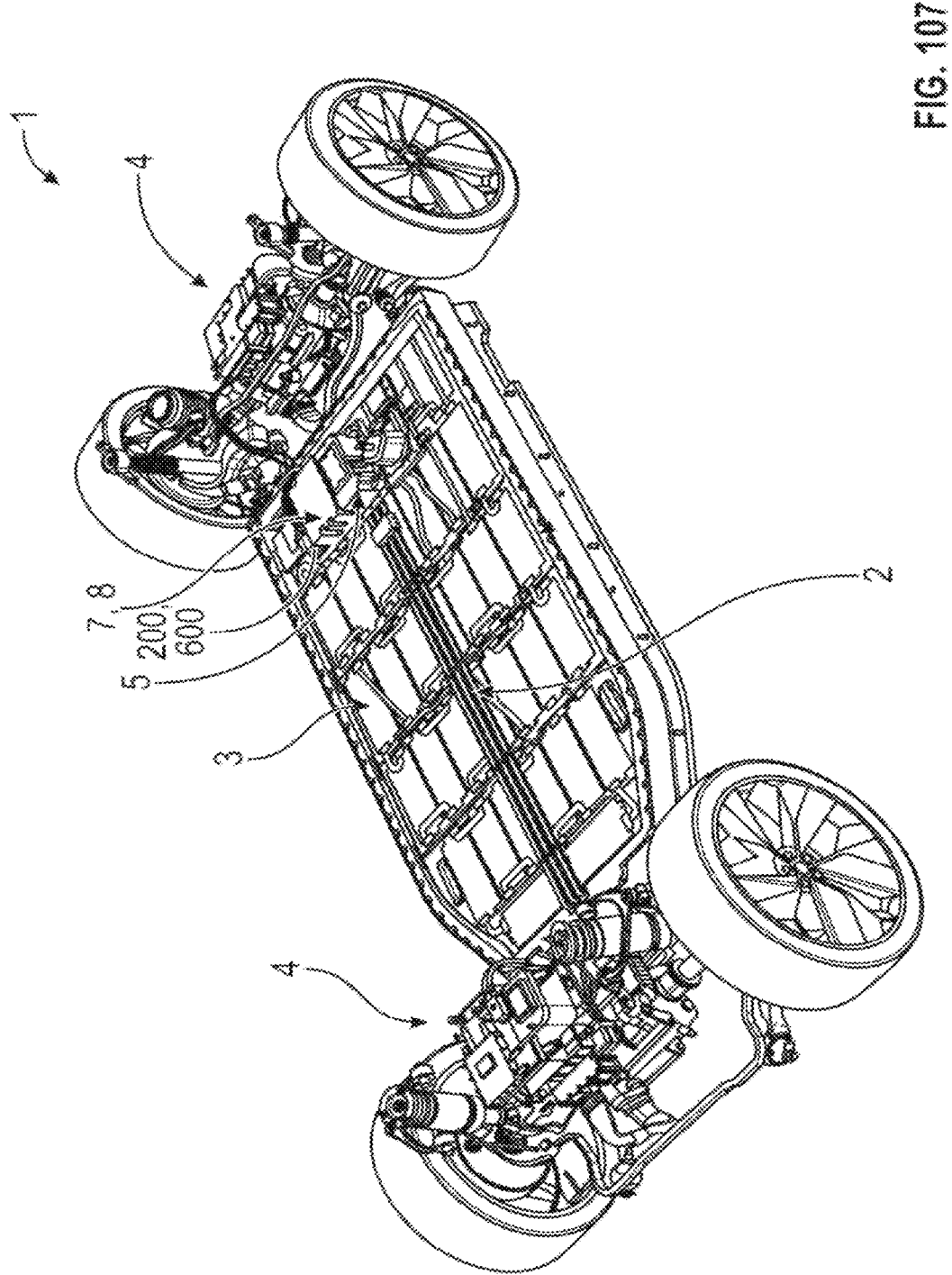
FIG. 107 is a perspective view of a skateboard chassis and battery assembly of a vehicle that includes the connector system and at least one DC-DC converter of FIGS. 1 and 54.
Figure 108:
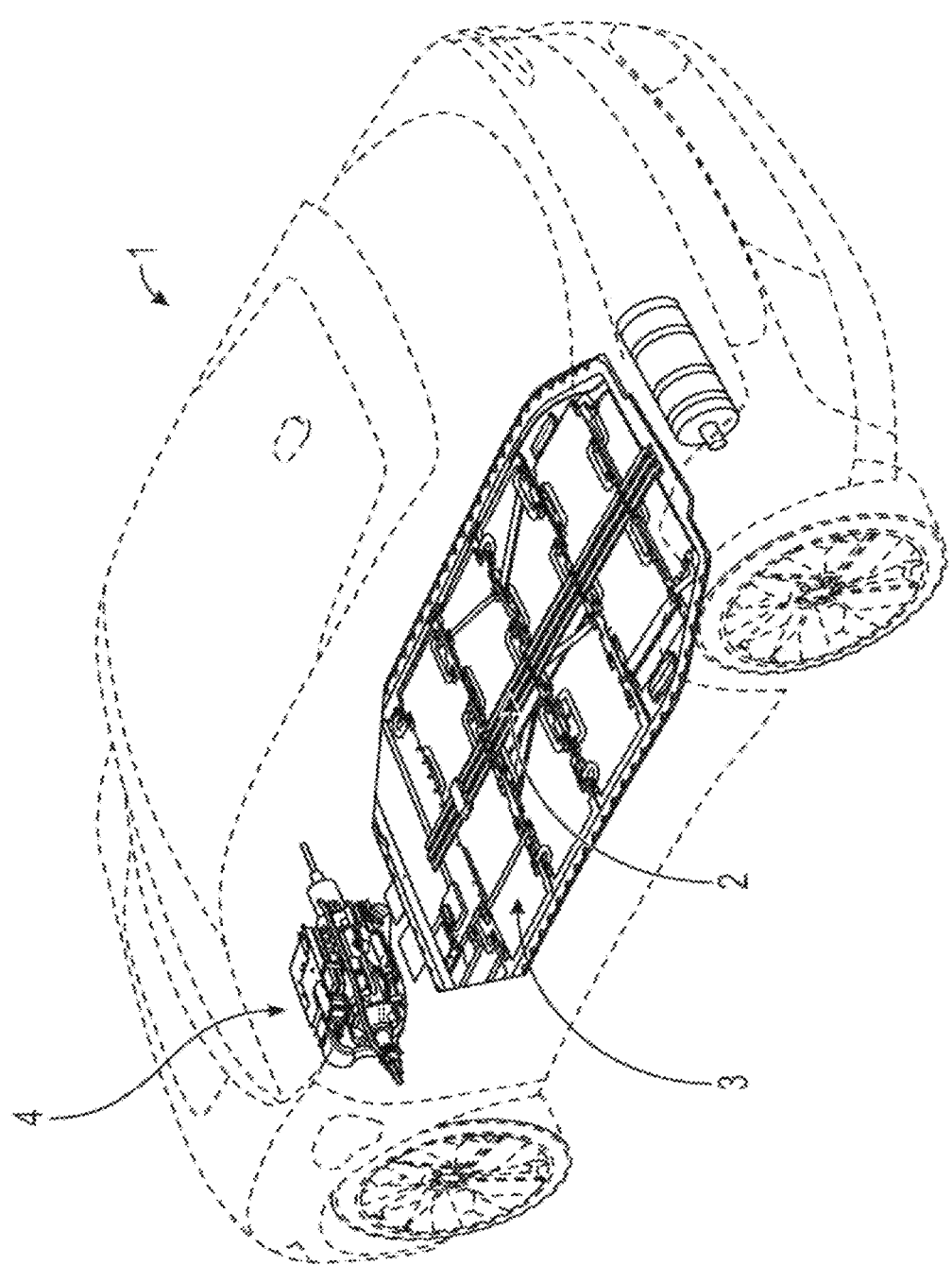
FIG. 108 is a perspective view of a vehicle that includes the connector system and at least one DC-DC converter of FIGS. 1 and 54.

Still referring to FIGS. 5-6, 16, 18, 45, 47, 49, and 53, the two mounting areas 646a, 646b are designed to removably couple the adaptor assembly 600 to the housing 8 of the DC-DC converter 7 (in FIGS. 106 and 107). The removable coupling of these adaptor assembly 600 and the converter 7 enables these components to be manufactured in different locations, at different times, and allows for more efficient maintenance and repair. To facilitate this removable coupling, the two mounting areas 646a, 646b have openings 647a, 647b formed there through and are designed to receive: (i) a spacer 648a, 648b and (ii) an extent of an elongated coupler 649a, 649b. This should be understood that other structure or methods of coupling the adaptor assembly 600 to the DC-DC housing 8 are contemplated by this disclosure, such as ¼ turn connectors or other similar types of connecting means.

Referring to FIGS. 4, 7-9, 16, 18-20, 29, 31, 34-36, 49, 53 and 123, the busbar 700 is designed to couple the capacitor assembly 750 to the housing 8 of the DC-DC converter 7. To achieve this, the busbar 700 is primarily comprised of: (i) a first portion of the coupling means 702 or busbar coupling means 704, (ii) a bridge 718, and (iii) a grounding coupler 720. The busbar coupling means 704 includes: (i) a longitudinal extent 706, and (ii) a pair of opposed projections 708a, 708b that extend upward from the longitudinal extent 706. The projections 708a, 708b have an irregular opening 710 that is cut or formed therein. Said irregular opening 710 is designed to receive an extent of the capacitor assembly 750 and specifically the coupling rods 756a-756b, 760a-760b of the capacitors 754, 758. In particular, the irregular opening 710 has three segments: (i) a v-shaped upper extent 712, (ii) a straight extent 714, and (iii) a circular lower extent 716. The v-shaped upper extent 712 is designed to have a wider opening to facilitate receiving an extent of the coupling rods 756a-756b, 760a-760b, while the straight extent 714 is designed to have a narrower opening to keep the coupling rods 756a-756b, 760a-760b coupled to the busbar 700. It should be understood that other structures and designs are contemplated by this disclosure to efficiently and effectively couple the capacitor assembly 750 to the busbar 700.

The busbar coupling means 704 is coupled to the grounding coupler 720 by the bridge 718 and more particular the longitudinal extent 706 of the busbar coupling means 704 is coupled to the horizontal extent 722 of the grounding coupler 720 by the bridge 718. The bridge 718 positons the longitudinal extent 706 substantially perpendicular to the horizontal extent 722. The grounding coupler 720 of the busbar 700 is formed from: (i) linear extent that has a horizontal positional relationship 722, (ii) a plurality of legs that have vertical positional relationships 724a-724c, and (iii) a plurality of ground connecting portions 726a-726c. The upper horizontal extent 722 extends along a majority of the longitudinal extent 706 of the busbar coupling means 704 and is slightly offset to one side. The longitudinal extent 706 is not straight, but instead has two angular bends 728a, 728b. These angular bends 728a, 728b helps ensure that the grounding coupler 720 make sufficient contact with the housing 8 of the DC-DC converter 7.

The plurality of vertical legs 724a-724c extend between the upper horizontal extent 722 and the plurality of ground connecting portions 726a-726c. As such, the plurality of vertical legs 724a-724c are substantially linear and can be deformed when a force is applied thereto during the coupling of the adaptor assembly 600 to the housing 8 of the DC-DC converter 7. Finally, the ground connecting portions 726a-726c are formed from two linear extents 732a-732c, 736a-736c and two angular bends 730a-730c, 734a-734c. In particular, the first bend 730a-730c is formed at approximately 65 degree, which extends between then inner surface of the leg 724a-724c and the inner surface of the first linear extent 732a-732c. The second bend 734a-734c is formed at approximately 25 degree, which extends between then inner surface of the first linear extent 732a-732c and inner surface of the second linear extent 736a-736c. In other words, the second linear extent 736a-736c is substantially perpendicular to the vertical legs 724a-724c. To note, there are gaps 738a-738c that are formed between second linear extent 736a-736c and the vertical legs 724a-724c to permit the deformation of the second linear extent 736a-736c towards the vertical legs 724a-724c, when the lower projection 616 of the lower adaptor housings 612 is inserted into the housing 8 of the DC-DC converter 7.

The busbar 700 is formed from a conductive material, such as spring steel. This allows the busbar 700 to make a proper electrical connection (e.g., being able to be deformed inward towards the center of the opening in the housing 8, while remaining in connect with the housing 8) between the female terminal assembly 800 and the housing 8 of the DC-DC converter 7. It should be understood that the busbar 700 may be altered or changed without altering the scope of this disclosure. For example, the busbar 700 may include multiple busbars or the busbar 700 may have different shapes or designs.

The capacitor assembly 750 is designed reduce electromagnetic noise that may be introduced into the system 2 by the DC-DC converter 7. To efficiently achieve this noise reduction, two separate capacitor are utilized within the capacitor assembly 750, as shown in at least FIGS. 4, 7-9, 16, 18-20, 29, 31, 34-36, 49, 53 and 124. The first capacitor 754 within the assembly 750 has a value of approximately 22 microfarads, while the second capacitor 758 within the assembly 750 has a value of approximately 4.7 microfarads. It is desirable to utilize two different sized capacitors because each capacitor is better or more efficient than the other capacitor at filtering out certain frequencies of noise. It should be understood in an alternative embodiment, the capacitors 754, 758 may be the same size. Additionally, the system 10 may only use a single capacitor 754 within the assembly 750. Further, the system may use more than two capacitors, wherein the capacitors are the same size or different sizes. Lastly, the size of the capacitors within the assembly 750 may be any suitable value, such as values that are between a single picoFarads to multiple farads.

The capacitors 754, 758 include coupling rods 756a-756b, 760a-760b that facilitate the coupling of the capacitors 754, 758 to other structures (e.g., busbar 700 and female terminal assembly 800). The coupling rods 756a-756b, 760a-760b are two electrical conductive projections that are formed within the capacitors 754, 758. As shown in at least FIGS. 26-31, 34-36, these coupling rods 756a-756b, 760a-760b are designed to be received by the coupling means 702. To facilitate the coupling of these components 754, 758, 700, 800, a downwardly directed force is applied to the body of the capacitors 754, 758 in order to seat the coupling rods 756a-756b, 760a-760b within the irregular openings 710, 854. It should be understood that this disclosure contemplates other: (i) capacitor designs, and (ii) configuration of their coupling rods 756a-756b, 760a-760b.

The female terminal assembly 800 to designed to be electrically and mechanically coupled to the male terminal assembly 430. By connecting the male terminal assembly 430 to the female terminal assembly 800, the installer is creating a connection between the DC-DC converter 7 and the power distribution assembly 2. Referring to at least FIGS. 4, 7-9, 16, 18-20, 29, 31, 34-36, 49, 53 and 125, the female terminal assembly 800 includes: (i) a female terminal body 810, (ii) a mounting extent 830, (iii) a catch can 860, (iv) a catch can retainer 864, and (v) a second portion of the coupling means 702 or female terminal coupling means 846. The mounting extent 830 is directly connected to the female terminal body 810 and is configured to receive an extent of the DC-DC converter 7, such as an internal threaded post. To facilitate this coupling, the mounting extent 830 includes a vertical segment 832 that is substantially parallel with the walls of the female terminal body 810 and a horizontal segment 834 that is substantially perpendicular to the vertical segment 832 and walls of the female terminal body 810. The horizontal segment 834 has an opening 838 formed therein that is designed to receive an elongated fastener that is contained within the DC-DC converter 7. It should be understood other configurations of the mounting extent 830 that are necessary to couple the female terminal body 810 to the electrical components contained within the DC-DC converter 7 are contemplated by this disclosure.

The female terminal body 810 has a tubular configuration and is comprised of an arrangement of female terminal side walls 812a-812d that are coupled to one another to form a substantially rectangular shape. Specifically, one female terminal side wall 812a of the arrangement of female terminal side walls 812a-812d is: (i) substantially parallel with another one female terminal side wall 812c of the arrangement of female terminal side walls 812a-812d and (ii) substantially perpendicular to two female terminal side wall 812b, 812d of the arrangement of female terminal side walls 812a-812d. The female terminal body 810 defines a female terminal receiver 814. The female terminal receiver 814 is designed and configured to be coupled, both electrically and mechanically, to an extent of the male terminal 470, when the male terminal 470 is inserted into the female terminal receiver 814. It should be understood that female terminal body 810 and its associated receiver 814 may have other configurations. For example, the female terminal body 810 may be any shape that is necessary or desired in order to allow for proper mating between the female terminal body 810 and the male terminal body 470. Specifically, these shapes at least include: (i) the shapes necessary to couple the female terminal body 810 to any male terminal assembly 2430, 3430, 4430, 5430, 6430, 7430, 8430 that are shown within FIGS. 111-117 and (ii) any other shapes of the male terminal body 470 that is disclosed herein.

The second portion of the coupling means 702 or female terminal coupling means 846 includes: (i) a pair of positioning ribs 847, and (ii) a pair of projections 850, wherein each projection 852a, 852b extends from it associated positioning rib 848a, 848b. The projections 852a, 852b have an irregular opening 854 that is cut or formed therein that is designed to receive an extent of the capacitor assembly 750. In particular, the irregular opening 854 has three segments: (i) a v-shaped upper extent 856, (ii) a straight extent 858, and (iii) a circular lower extent 860. The v-shaped upper extent 856 is designed to have a wider opening to facilitate the coupling of the capacitor assembly 750 to the female terminal body 810, while the straight extent 858 is designed to have a narrower opening to keep the capacitor assembly 750 coupled to the female terminal body 810. It should be understood that other structures and designs are contemplated by this disclosure to efficiently and effectively couple the capacitor assembly 750 to the female terminal body 810.

The female terminal assembly 800 is typically formed for a single piece of material (e.g., metal). Therefore, the female terminal assembly 800 is a one-piece and has integrally formed features. In particular, the vertical segment 832 and a horizontal segment 834 are integrally formed with female terminal body 810 and specifically is integrally formed with the one female terminal side wall 812c. To integrally form these features, the female terminal assembly 800 is typically formed using a die cutting process. However, it should be understood that other types of forming the female terminal assembly 800 may be utilized, such as casting or using an additive manufacturing process (e.g., 3D printing). In other embodiments, the features of the female terminal assembly 800 may not be formed from one-piece or be integrally formed, but instead formed from separate pieces that are welded together.

Figure 49:
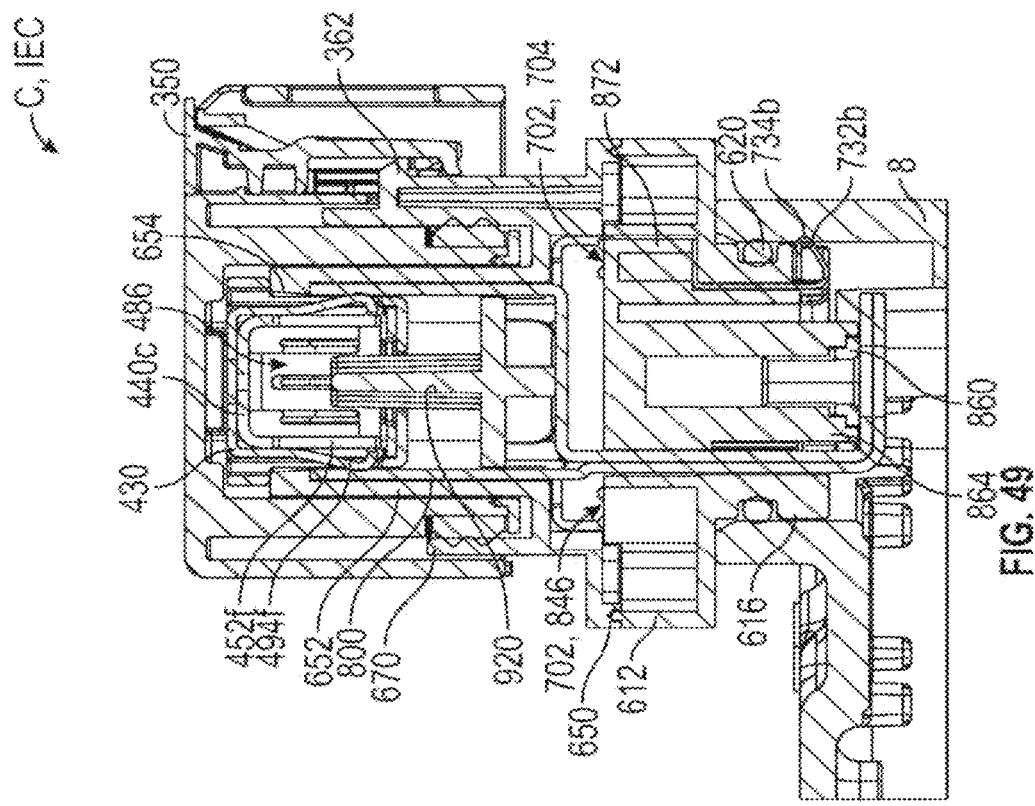
FIG. 49 is a cross-sectional view of the connector system and the DC-DC converter system taken along line 49-49 of FIG. 48.

As best shown in FIGS. 2, 4, 10, 14-15, 49, and 53, the catch can 860 and the catch can retainer 864 have a complex configuration that is configured to capture and retain any shavings or other particles that are shaved off of the mounting post that is contained within the DC-DC converter 7 when the adaptor 600 is coupled to the DC-DC converter 7. This is beneficial because these shavings or other particles may cause an internal short within the DC-DC converter 7; thereby leading to premature failure of the converter 7. As best shown in FIGS. 49 and 53, the catch can 860 is positioned within the catch can retainer 864 and maintained in its location by a combination of the catch can retainer 864 and the horizontal segment 834 of the mounting extent 830 of the female terminal assembly 800. In particular, the catch can retainer 864 includes: (i) a catch can receiver 866, (ii) a coupling means 868 that is formed from two opposed deformable projections 870a, 870b in this embodiment, and (iii) a sealing segment 872. The catch can receiver 866 is designed to accept the catch can 860 and the mounting post that is contained within the DC-DC converter 7. In the embodiment shown in the FIGS., the catch can receiver 866 includes a plurality of concentric bores, wherein the size of the bore becomes larger closer to the bottom of the receiver 866. This design allows for the proper seating and retaining of the catch can 860. It should be understood that other structures for accepting and retaining the catch can 860 are contemplated by this disclosure.

Still referring to FIGS. 49 and 53, the two opposed deformable projections 870*a*, 870*b* of the catch can retainer 864 are designed to temporarily deform inward and then return to their original position, when the catch can retainer 864 is positioned within the female terminal assembly 800 and the female terminal assembly 800 is inserted within the female terminal aperture 615 of the lower adaptor housing 612. This allows the lower extent of the two opposed deformable projections 870*a*, 870*b* to be positioned under the bottom wall 614 of the lower adaptor housing 612, which in turn helps: (i) couple the female terminal assembly 800 to the lower adaptor housing 612, (ii) maintain the catch can 860 in its designed location, and (iii) seal the bottom extent of the lower adaptor housing 612. To remove the female terminal assembly 800, a user can simply deform the two opposed deformable projections 870*a*, 870*b* of the catch can retainer 864 inward and then apply an upward directed force on the female terminal assembly 800. In other words, the catch can retainer 864 and the female terminal assembly 800 is removably coupled to the lower adaptor housing 612.

Referring to FIGS. 2, 4, 37, 38, 40, 45, 47, 49, 51, and 53, the adaptor assembly 600 includes a sealing member 900 and a touch proof post 920. It should be understood that both the sealing member 900 and the touch proof post 920 are optional components that may be omitted in certain installations/configurations. The sealing member 900 is a member that substantially encapsulates the connections that are formed between the capacitor assembly 750 and the busbar 700. This is beneficial because it increases durability of the system 10 and reduces chances that the capacitors 754, 758 could become disconnected from the busbar 700. In one embodiment, the sealing member 900 is made from a material that: (i) can first be poured (e.g., a liquid) into the lower housing assembly 612 once the busbar 700, capacitor assembly 750, and female terminal assembly 800 has been instead therein and (ii) then be solidified. This solidification process may require: (i) time, (ii) heat, (iii) exposure to light (e.g., UV curing), (iv) pressure, or (v) a combination of the above. In other embodiments, the sealing member 900 may be a silicon member or another type of insertable member that protects and seals the electrical contacts.

The touch proof post 920 is designed to be positioned within the female terminal receiver 814 and protect the female terminal 810 from the insertion of foreign objects. As such, the touch proof post 920 is made from a non-conductive material and is positioned and sized in a manner that would prevent the insertion of a human finger or other a similarly shaped object. As best shown in FIG. 49, the touch proof post 920 is designed to be receive by the male terminal assembly 430. As such, the touch proof post 920 also helps improve the durability of the system 10 because it stabilizes the male terminal assembly 430 within the female terminal assembly 800. It should be understood that the touch proof post 920 may have other shapes or configurations without departing from the scope of this application.

Referring to FIGS. 5-6, 16, 18, 45, 47, 49, and 53, the upper adaptor housing 650 includes: (i) a female terminal housing 652, (ii) a sealing perimeter wall 670 that forms a seal receptacle 672, (iii) a female coupling member 362, and (iv) upper wall 678. The female terminal housing 652 is designed to substantially surround the female terminal 810 and aid in the coupling of the male terminal 470 with the female terminal 810. This is accomplished using a sloped wall 654 that extends between the front edge of the female terminal housing 652 and the front edge of the female terminal 810. Specifically, the sloped wall 654 helps compress the contact arms 494*a*-494*h* of the male terminal 470 during the insertion of the male terminal 470. Additional information about this sloped wall, its features, dimensions, and other information is disclosed within PCT application US/2019/036070. While the sealing perimeter wall 670 sounds the female terminal housing 652, it is spaced away from the female terminal housing 652 in order to form a seal receptacle 672. This seal receptacle 672 is beneficial because it is configured to receive a seal associated with the male terminal assembly 200 in order to properly seal the electrical connectors contained within the system 10. As discussed above, the lower arrangement of side walls 626 are configured to mate with the upper wall 678 of the upper adaptor housing 650 to form a proper seal (e.g., water resistant/high-pressure spray). In the embodiments shown in the Figures, this mating of the lower side wall 626 and upper wall 678 is achieved by a projection 630 that extends upward from the lower arrangement of side walls 626 and is received by an extent of the upper wall 678. It should be understood that other configuration and interactions between the lower adaptor housing 650 and the upper adaptor housing 612 are contemplated by this disclosure.

The assembly of the adaptor assembly 600 occurs over multiple stages. The first stage in this assembly is assembling the female terminal assembly 800. This is accomplished by: (i) inserting the catch can 860 within the catch can retainer 864 and (ii) placing that combination 860, 864 within the female terminal 810. The next stage in this assembly is inserting and seating the busbar 700 and female terminal assembly 800 the within the lower adaptor housing 612 to form the first partially assembled state, $PA_1$. The next stage in this assembly is installing the capacitor assembly 750 within the lower adaptor housing 612 to form the second partially assembled state, $PA_2$. This installation is achieved by applying a downwardly directed force on each of the capacitors 754, 758 in order to position the coupling rods 756*a*-756*b*, 760*a*-760*b* in the proper extents of the coupling means 702. To note, the installation of the capacitor assembly 750 within the lower adaptor housing 612 effectively couples the capacitor assembly 750 to the busbar 700 and female terminal assembly 800. Next, the sealing member 900 is poured into the lower adaptor housing 612 and the material is cured to form a proper seal around the electronic components and create the third partially assembled state, $PA_3$. Finally, the upper adaptor housing 650 is coupled to the lower adaptor housing 612 via ultrasonic welding to form a fully assembled state, FA. Once the adaptor assembly 600 is in the fully assembled state, FA, it can be coupled to the DC-DC converter 7 to form an internal electrical connection state, IEC. In particular, this internal electrical connection state, IEC is formed when the second bend 734*a*-734*c* of the ground connecting portions 726*a*-726*c* of the busbar 700 is placed in contact with the inner wall of the DC-DC converter 7.

Once the system 10 is in this internal electrical connection state, IEC: (i) the female terminal body 810 is electrically connected to the capacitor assembly 750 and specifically to at least one the first or second capacitors 754, 758, (ii) the capacitor assembly 750 is electrically connected to the busbar 700, and (iii) the busbar 700 is electrically connected to the extent of the component of the power management system 2, which may be a DC-DC converter 7. In this IEC state, each of the three above described electrical connections are sealed from the external environment. In other words, the connection between the female terminal body 810 and the ground/external case of the DC-DC converter 7 through a pair of capacitors 754, 758 is sealed from the sealed from the external environment. While the system 10 is in the IEC state and prior to coupling the male terminal connector 200 to the adaptor assembly 600 to form a connected position, P$_C$, female terminal assembly 800 is not completely sealed from the external environment.

The above disclosure describes a system 10 that effectively and efficiently connects the male terminal assembly 430 to an extent of a DC-DC converter 7. Specifically, the system 10 couples (i.e., both mechanically and electrically) the male terminal assembly 430 via the contact arms 494a-494h to a female terminal assembly 800. The female terminal assembly 800 is coupled between the male terminal assembly 430 and the pair of capacitors 754, 758 that are contained within the capacitor assembly 750. The capacitor assembly 750 is coupled between the female terminal assembly 800 and the busbar 700. And finally, the busbar 700 is coupled between the capacitor assembly 750 and the ground/external case of the DC-DC converter 7. In other words, the system 10 couples the male terminal assembly 430 to the ground/external case of the DC-DC converter 7 through a pair of capacitors 754, 758. Stated another way, when the system 10 is in the connected position, P$_C$: (i) male terminal assembly 430 is electrically connected to the female terminal body 810, (ii) the female terminal body 810 is electrically connected to the capacitor assembly 750 and specifically to at least one the first or second capacitors 754, 758, (iii) the capacitor assembly 750 is electrically connected to the busbar 700, and (iv) the busbar 700 is electrically connected to the extent of the component of the power management system 2, which may be a DC-DC converter 7. In this connected position, P$_C$, each of the four above described electrical connections are sealed from the external environment.

The system 10 provides many benefits that are disclosed within this application and other benefits that will be will be recognized by one of ordinary skill in the art based on this description and the associated figures. Some of these benefits include: (i) reducing electromagnetic noise that may otherwise be introduced into the system 10 or the environment/application 2 that the system 10 is installed therein by passing electrical current through the pair of capacitors 754, 758, (ii) increases the durability and longevity of the system 10 by positioning the electrical connection between the female terminal body 810 and the DC-DC converter 7 within a sealed environment, (iii) simplifies installation because it eliminates the need for air-assist guns, (iv) is substantially lighter weight (i.e., nearly 70 grams lighter) over conventional systems. These and other benefits provide substantial improvements over conventional systems.

Figure 54:
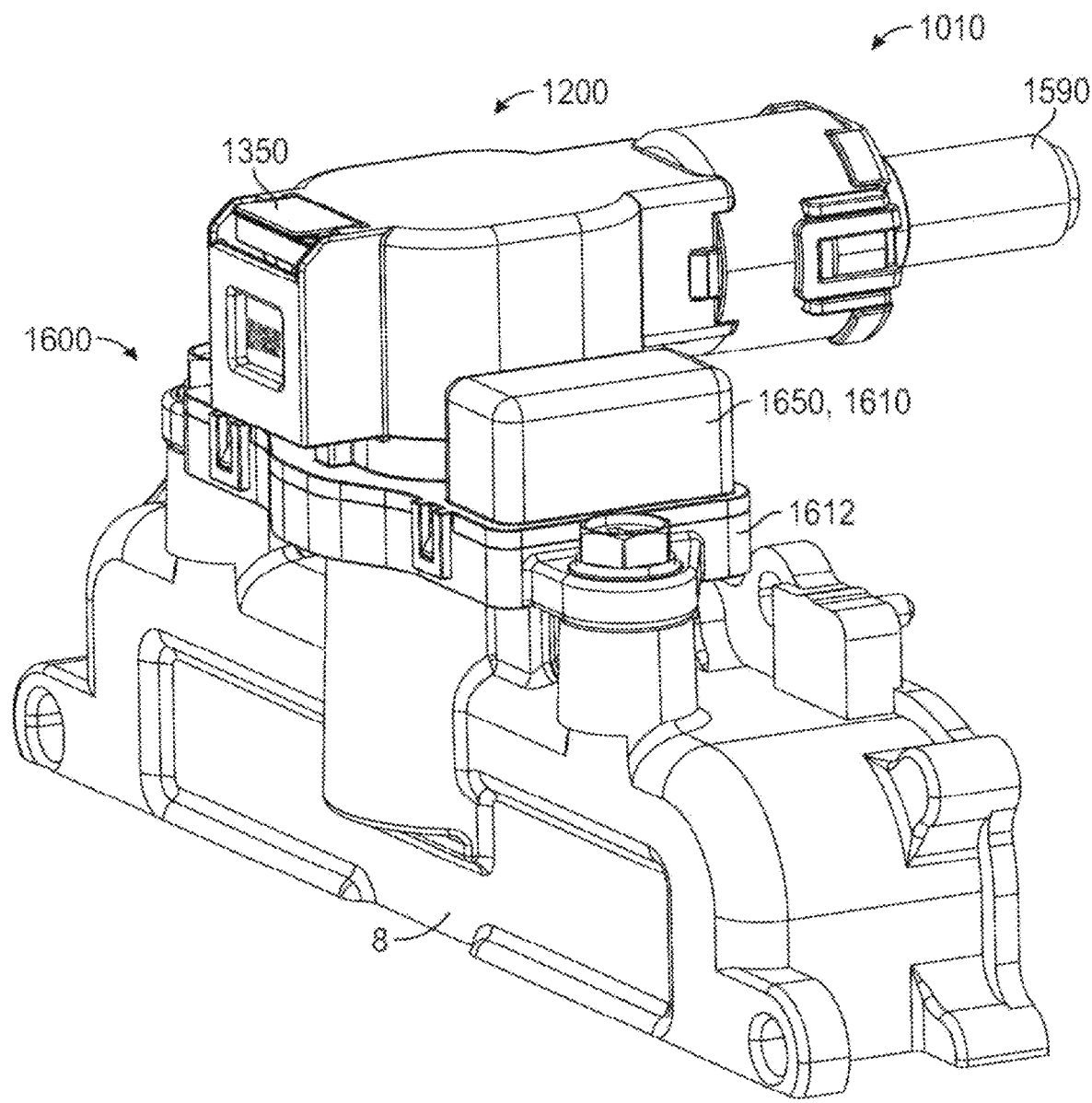
FIG. 54 is a perspective view of a second embodiment of a connector system for a DC-DC converter of a power management system like those found in a battery-powered motor vehicle.
Figure 55:
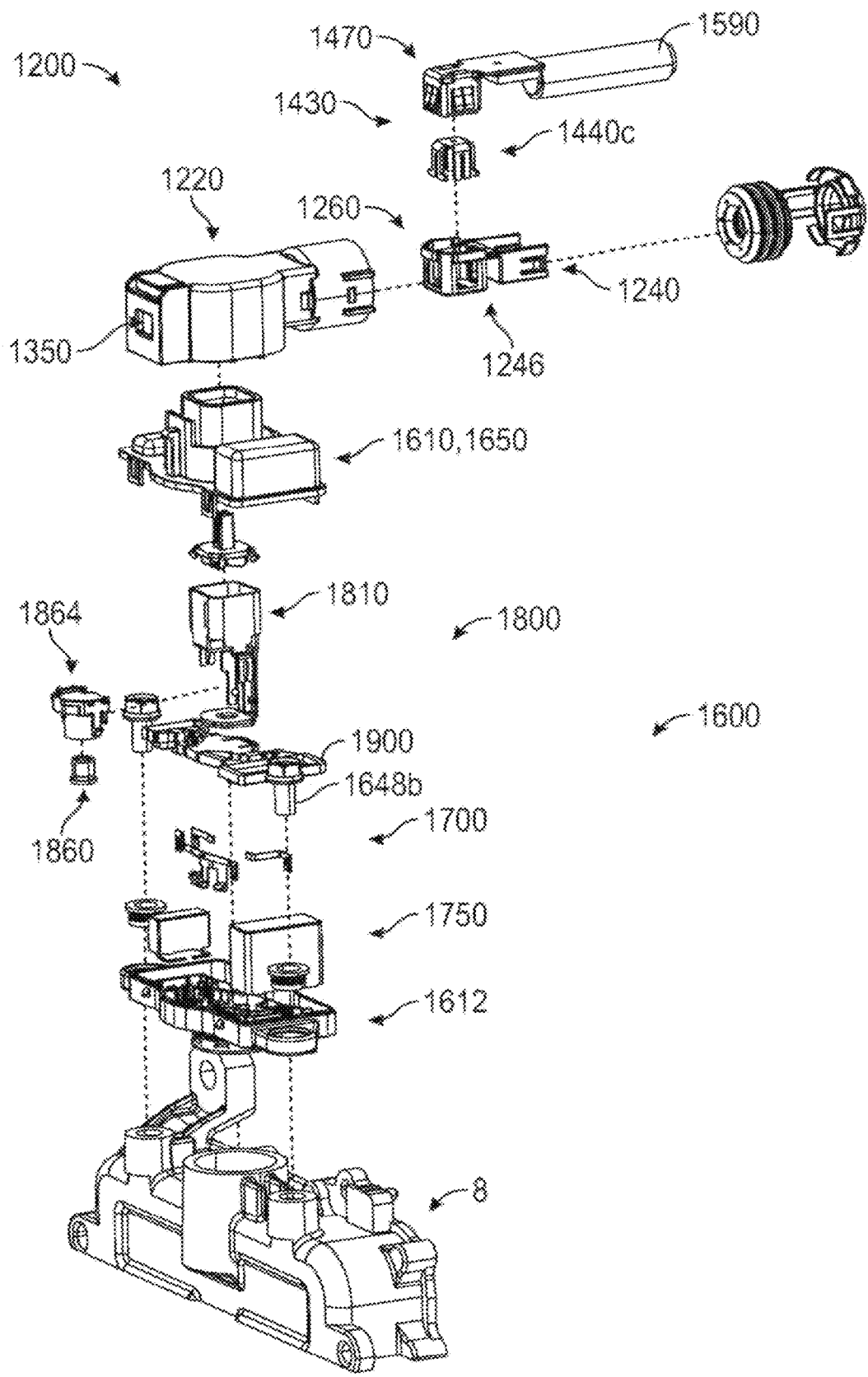
FIG. 55 is an exploded view of the connector system for a DC-DC converter of FIG. 54, where the connector system includes a male connector assembly and an adaptor assembly with a female terminal assembly that are electrically and mechanically connected to the DC-DC converter.
Figure 56:
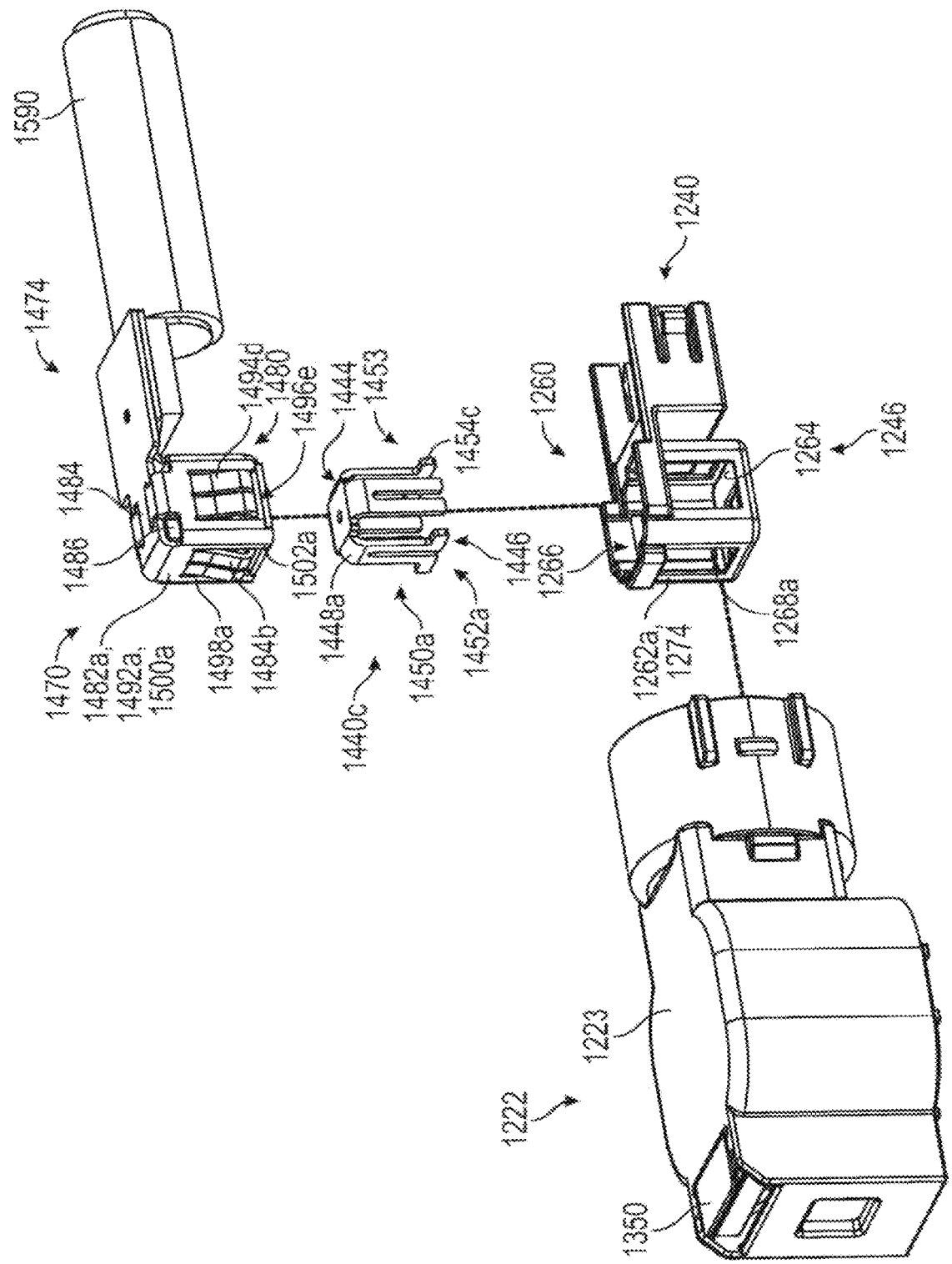
FIG. 56 is an exploded view of the male connector assembly of FIG. 54.
Figure 57:
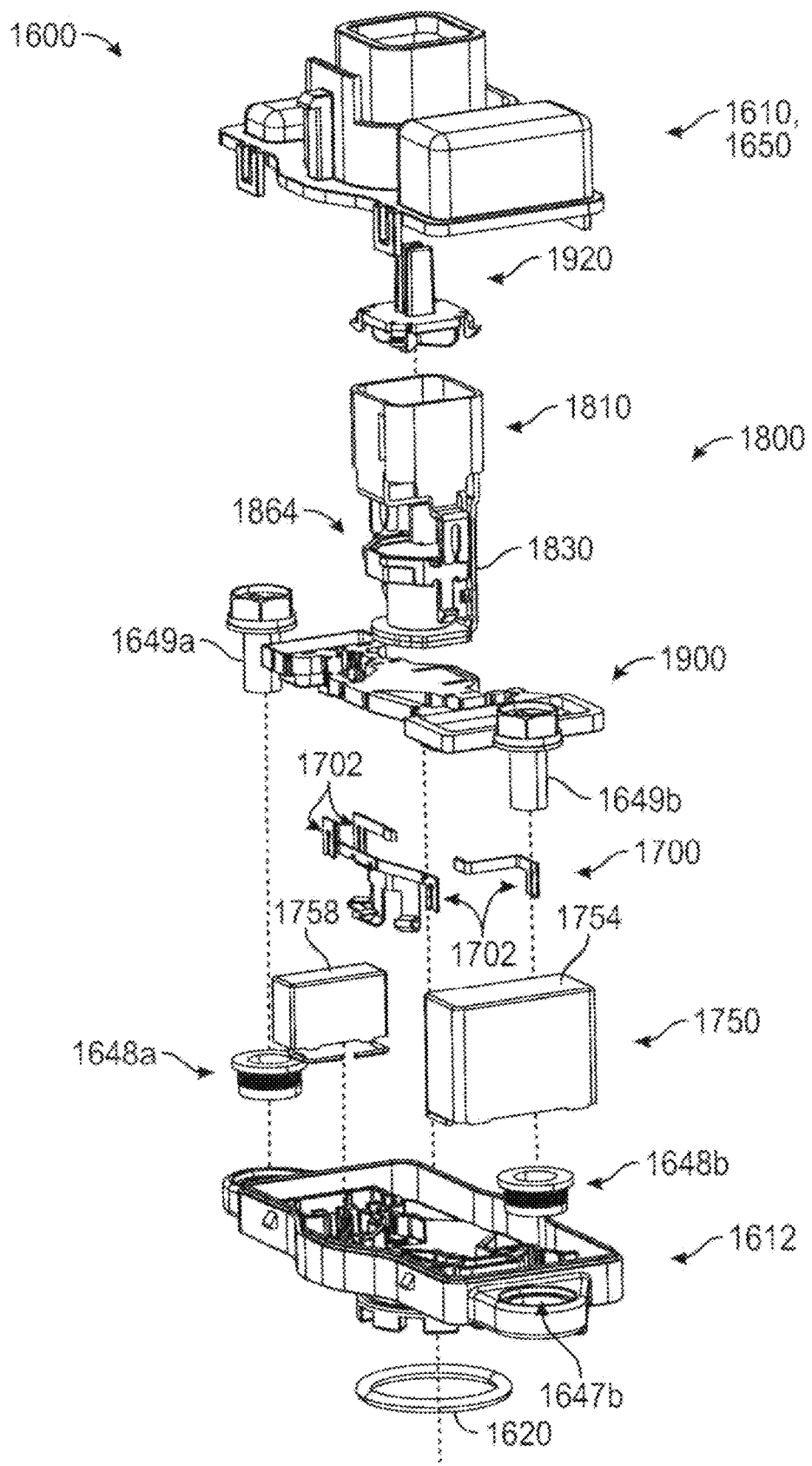
FIG. 57 is an exploded view of the adaptor assembly of FIG. 54, including: (i) a lower adaptor housing, (ii) capacitor assembly, (iii) busbar assembly, (iv) a female terminal assembly, and (v) an upper adaptor housing.
Figure 60:
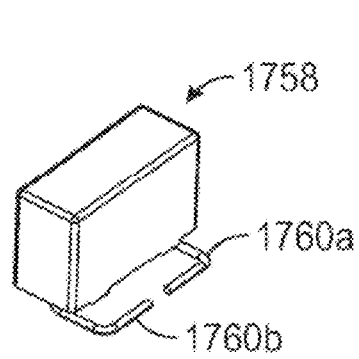
FIG. 60 is a perspective view of a first capacitor of the capacitor assembly of FIG. 57.
Figure 61:
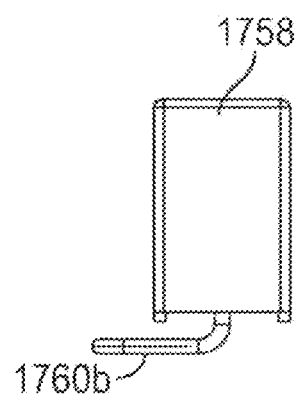
FIG. 61 is a side view of the first capacitor of FIG. 60.
Figure 62:
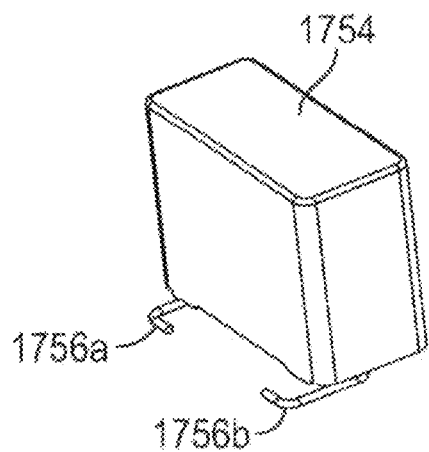
FIG. 62 is a perspective view of a second capacitor of the capacitor assembly of FIG. 57.
Figure 63:
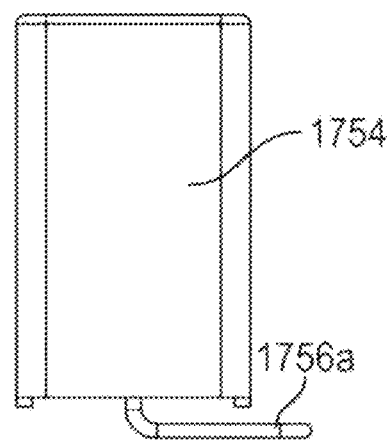
FIG. 63 is a side view of the second capacitor of FIG. 62.
Figure 66:
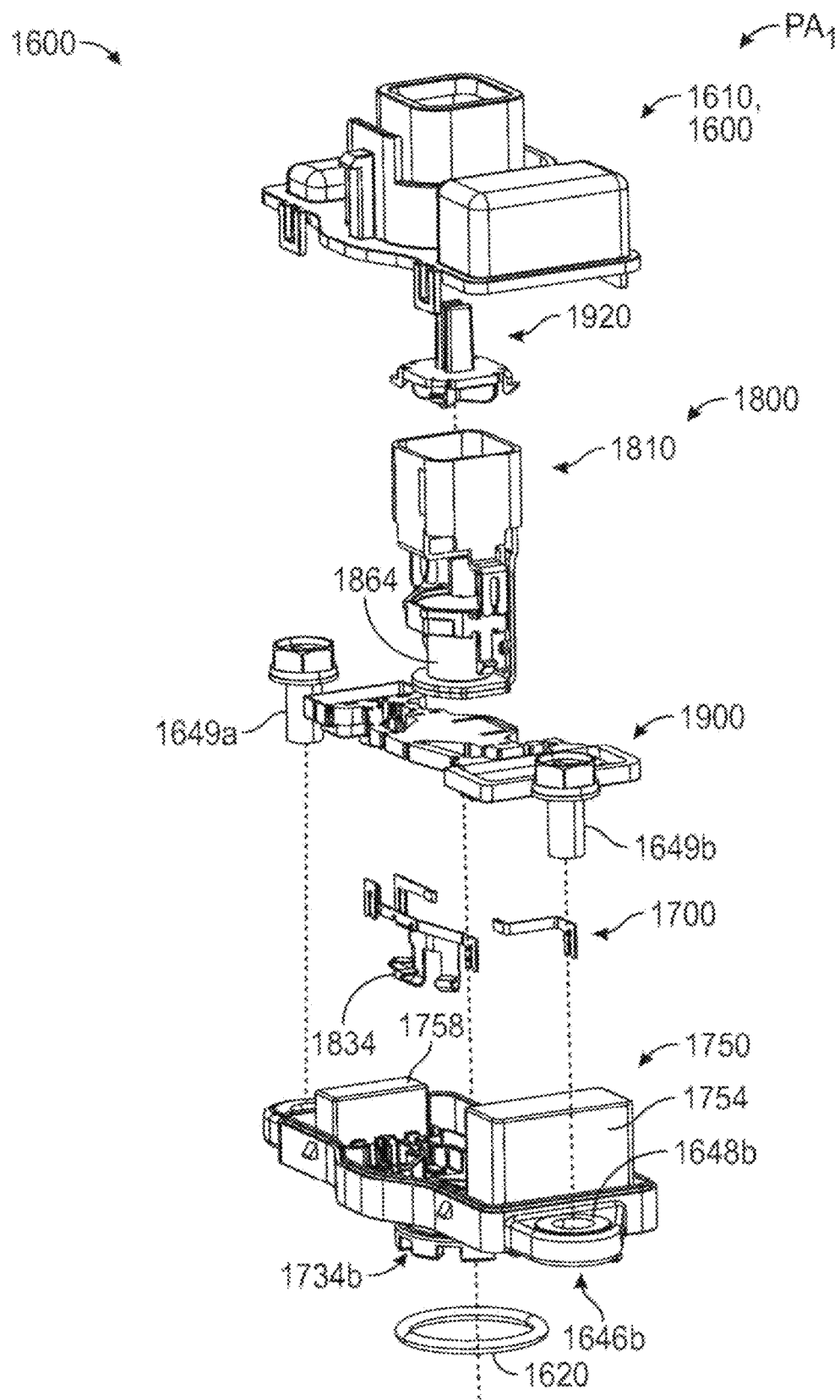
FIG. 66 is a perspective view of the adaptor assembly of FIG. 1 in the first partially assembled state, $PA_1$.
Figure 67:
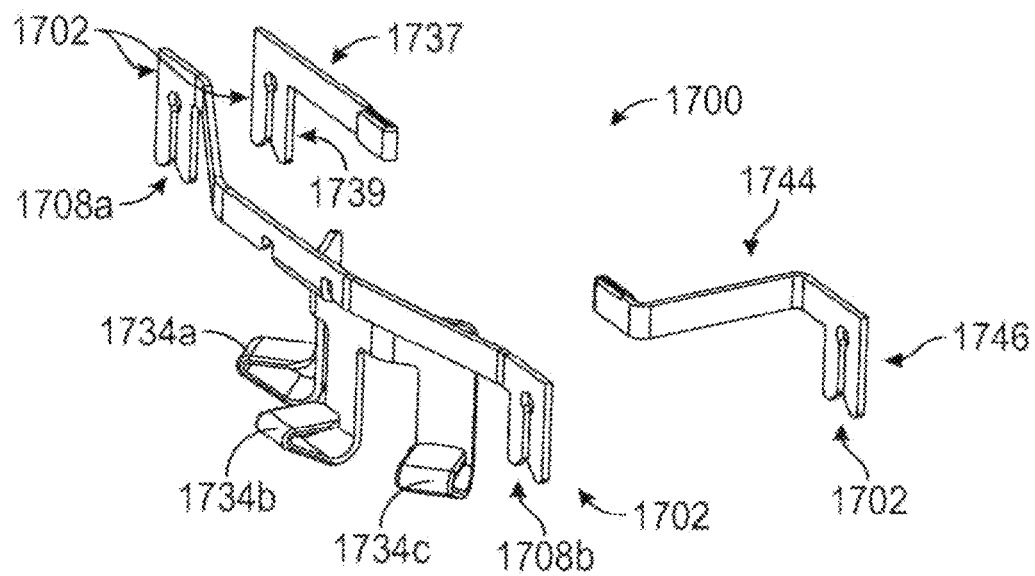
FIG. 67 is a perspective view of the busbar assembly of the adaptor assembly of FIG. 57, including a (i) center busbar, (ii) a left busbar, and (iii) a right busbar.
Figure 68:
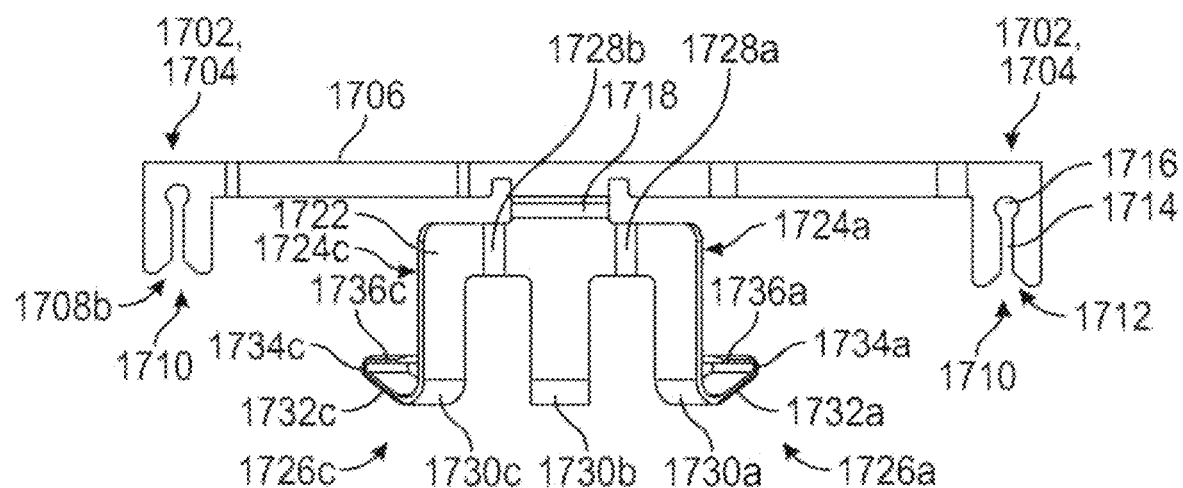
FIG. 68 is a rear view of the center busbar of FIG. 67.
Figure 69:
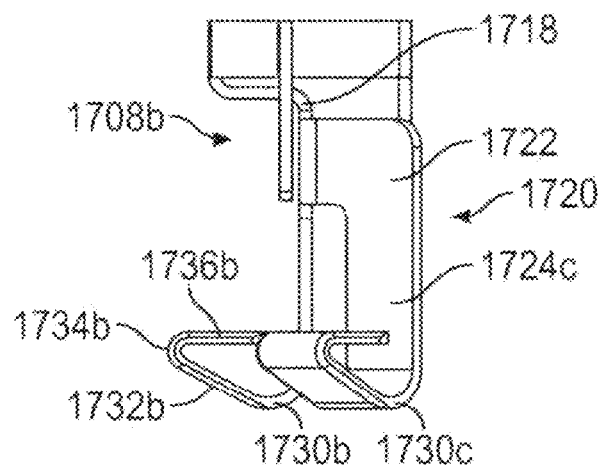
FIG. 69 is a side view of the center busbar of FIG. 67.
Figure 70:
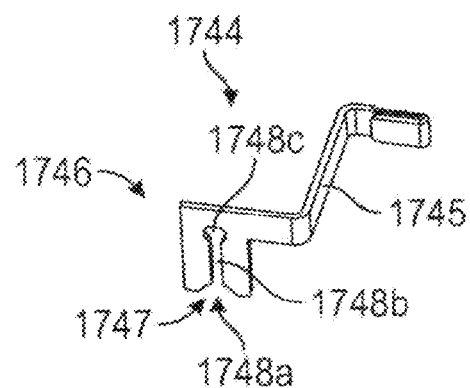
FIG. 70 is a perspective view of the right busbar of FIG. 67.
Figure 71:
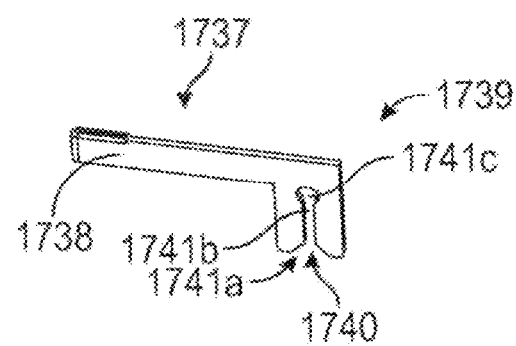
FIG. 71 is a perspective view of the left busbar of FIG. 67.
Figure 72:
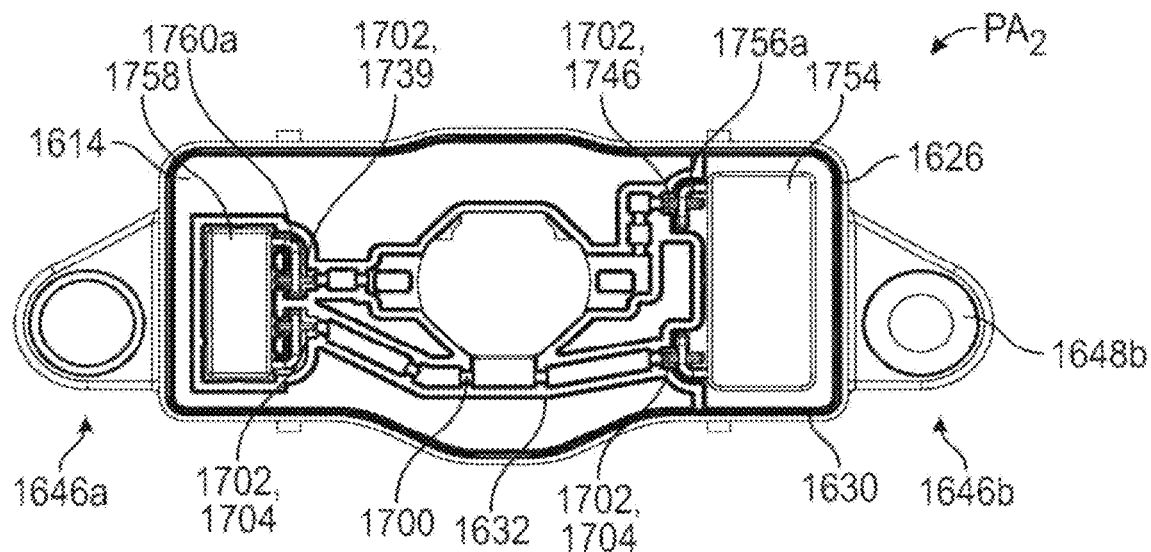
FIG. 72 is a top view of the lower adaptor housing with the capacitor assembly and the busbar assembly installed therein, wherein the adaptor assembly is in a second partially assembled state, $PA_2$.
Figure 73:
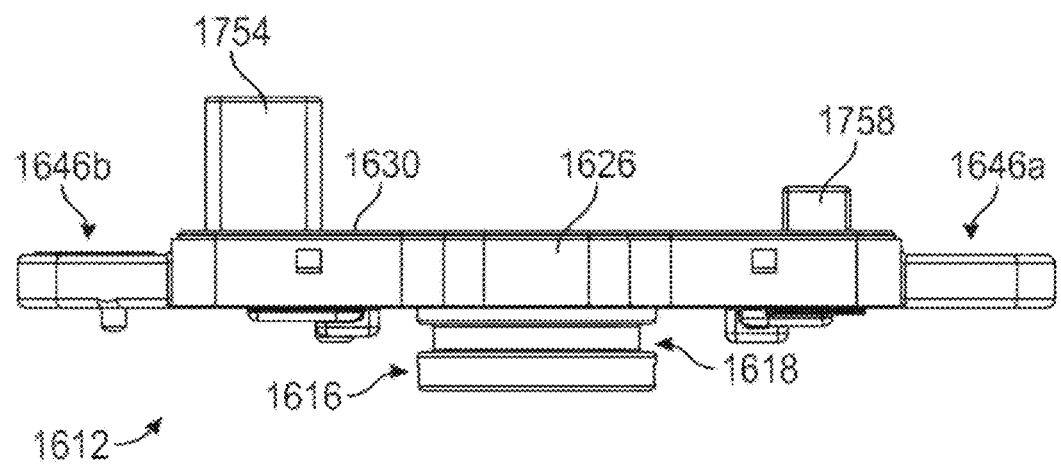
FIG. 73 is a side view of a portion of the adaptor assembly of FIG. 72.
Figure 74:
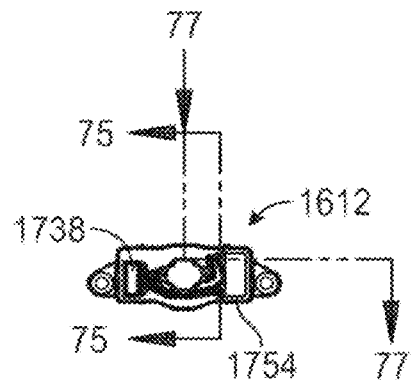
FIG. 74 is a top view of the adaptor assembly of FIG. 72.
Figure 75:
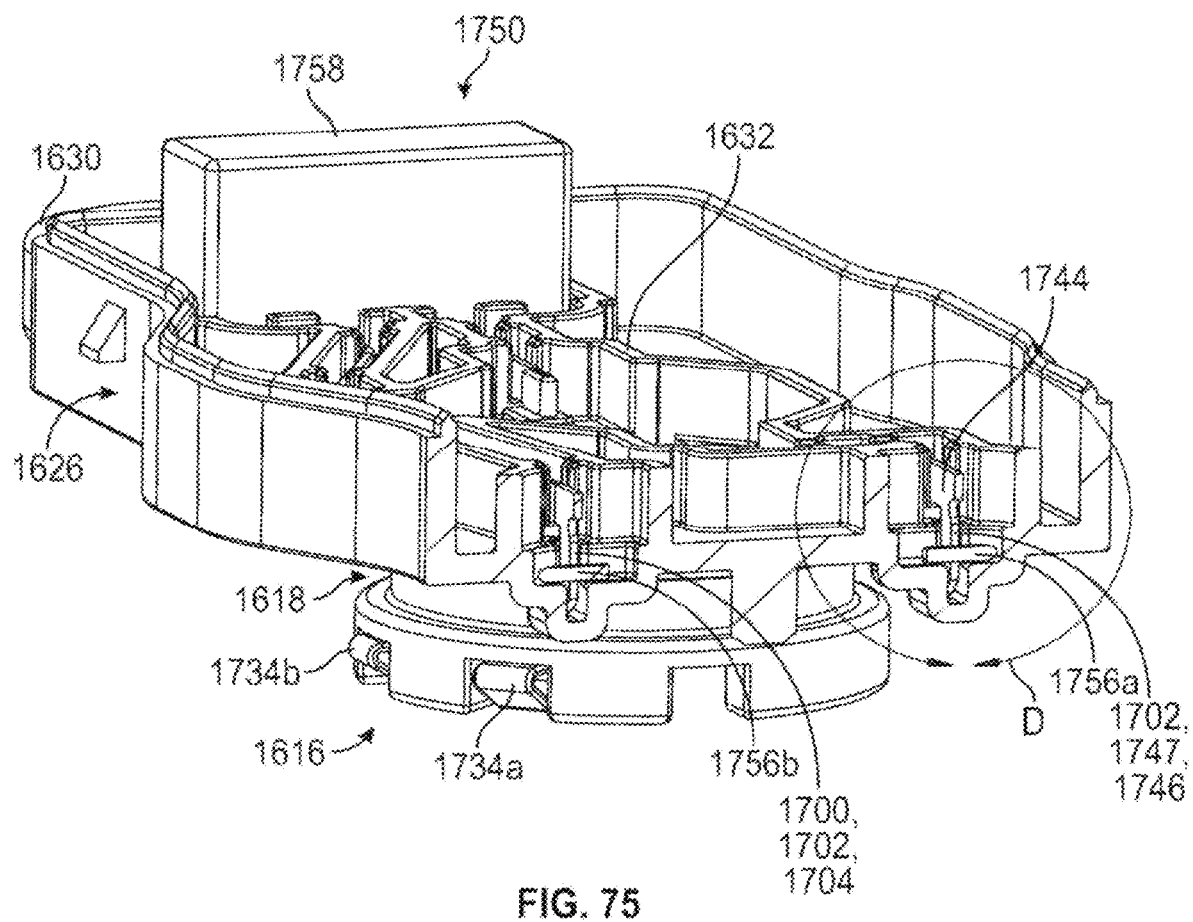
FIG. 75 is a first cross-sectional view of the adaptor assembly of FIG. 72 taken along line 75-75 of FIG. 74.
Figure 76:
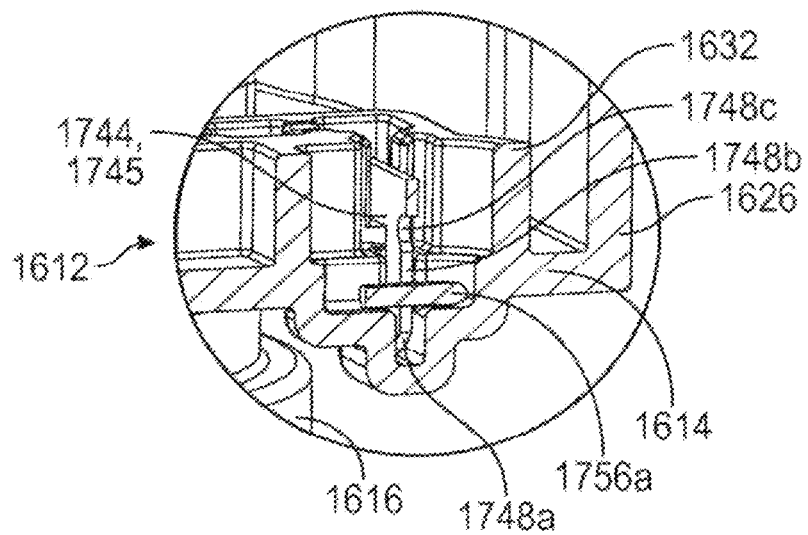
FIG. 76 is a zoomed-in view of area D of the adaptor assembly of FIG. 75.
Figure 77:
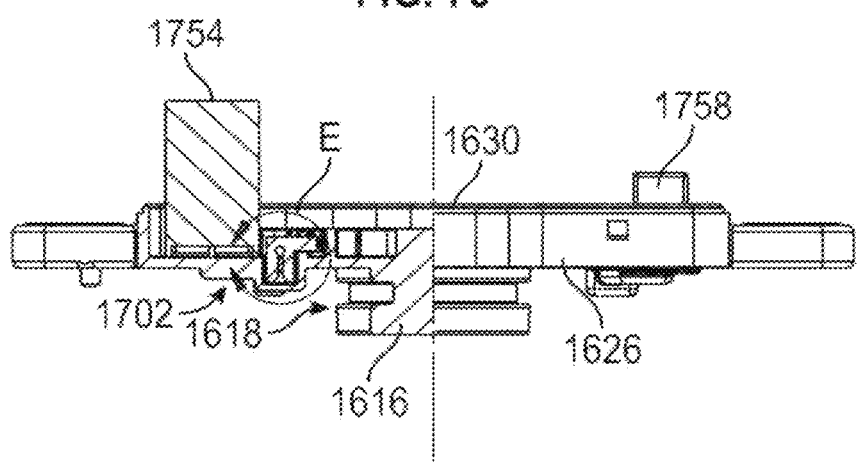
FIG. 77 is a second cross-sectional view of the adaptor assembly of FIG. 72 taken along line 77-77 of FIG. 76.
Figure 78:
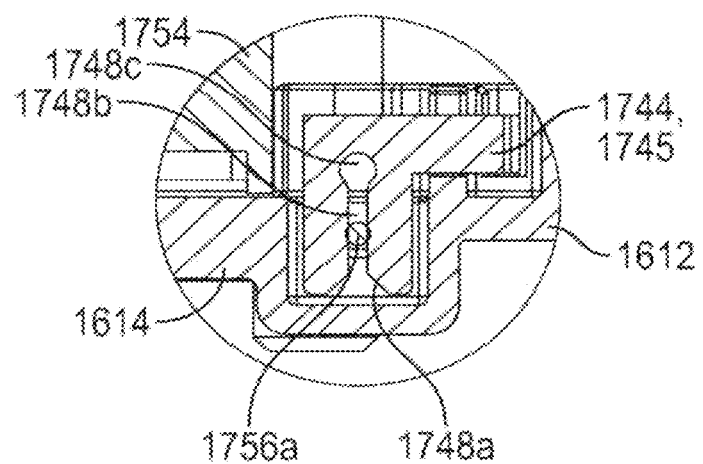
FIG. 78 is a zoomed-in view of area E of the adaptor assembly of FIG. 77.
Figure 79:
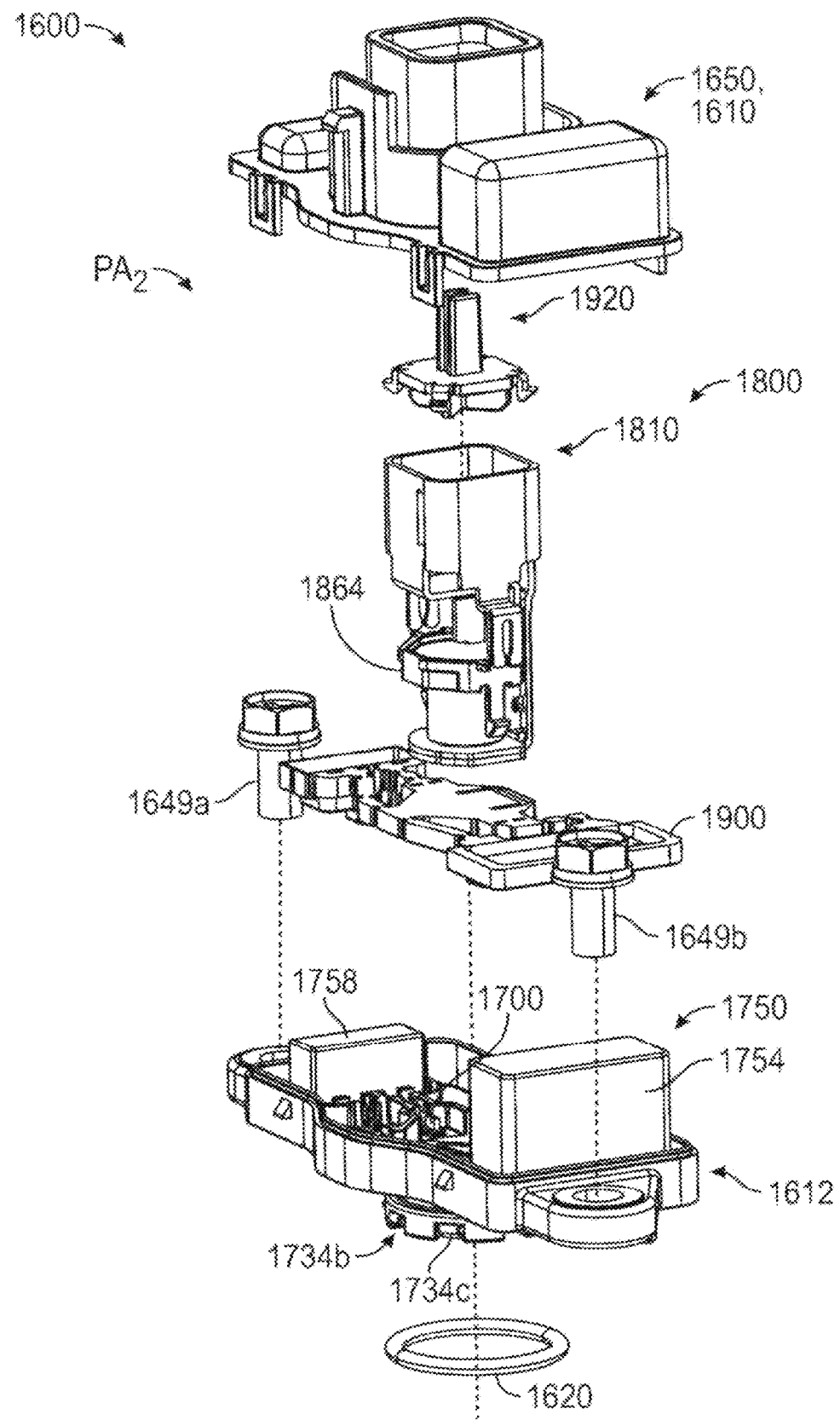
FIG. 79 is a perspective view of the adaptor assembly of FIG. 1 in the second partially assembled state, $PA_2$.
Figure 80:
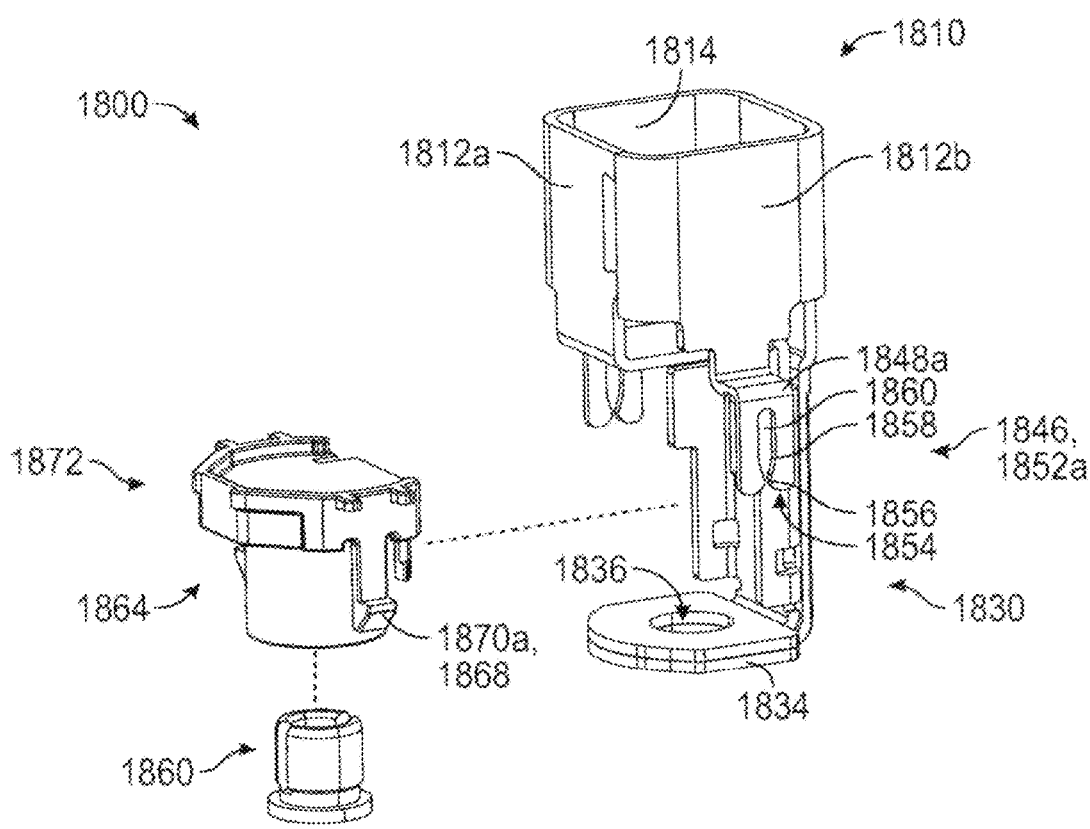
FIG. 80 is a perspective view of the female terminal assembly of FIG. 57, including: (i) a female terminal body, (ii) a catch can, and (iii) a catch can retainer.
Figure 81:
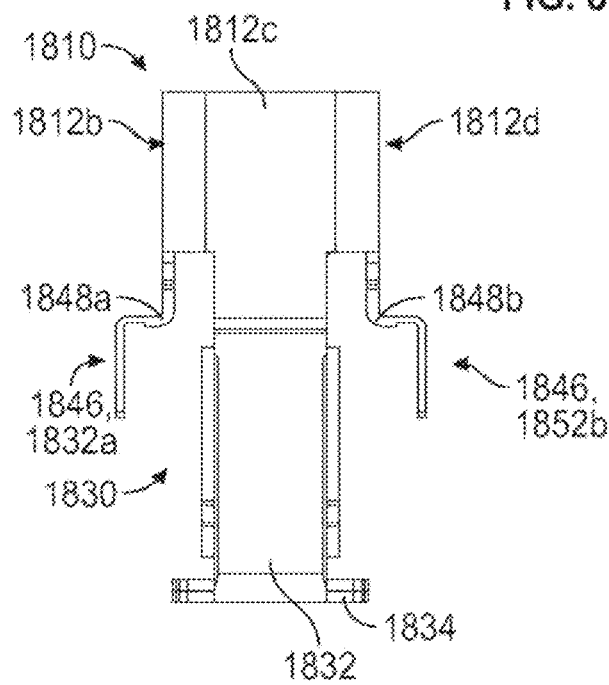
FIG. 81 is a front view of the female terminal body of FIG. 79.
Figure 82:
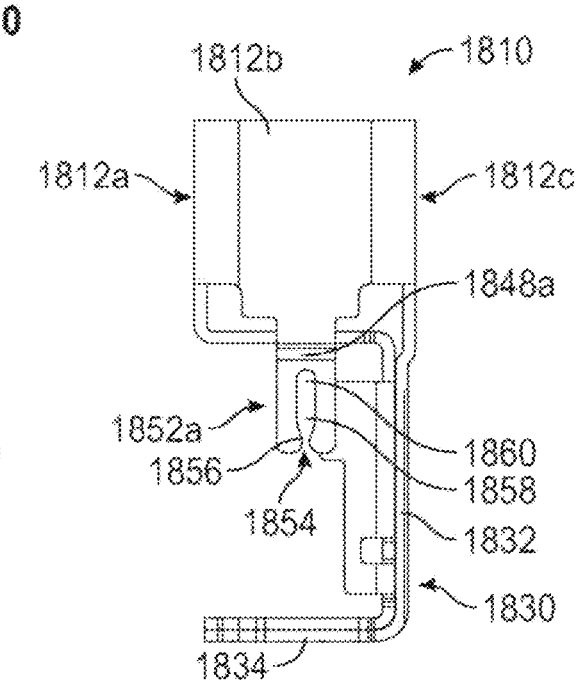
FIG. 82 is a side view of the female terminal body of FIG. 79.
Figure 91:
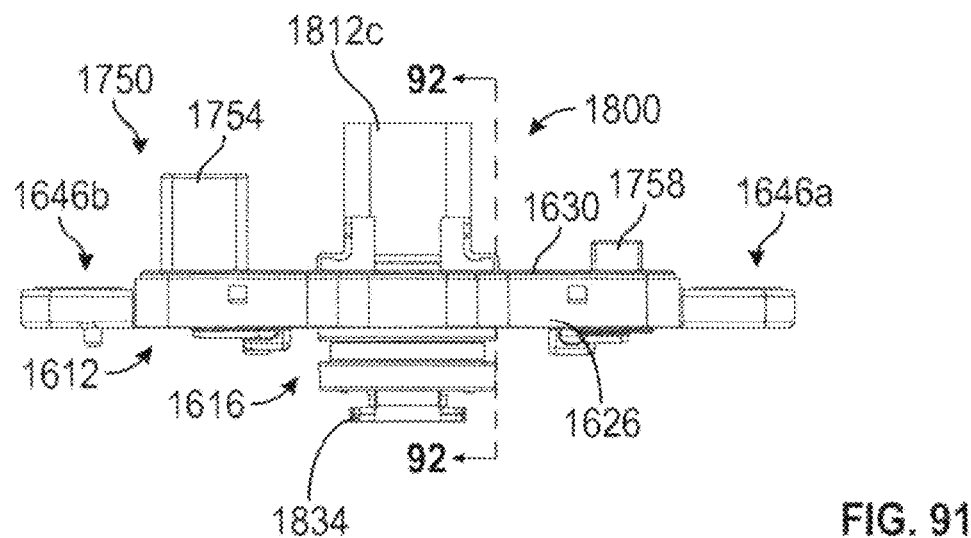
FIG. 91 is a rear view of a portion of the adaptor assembly of FIG. 86.
Figure 92:
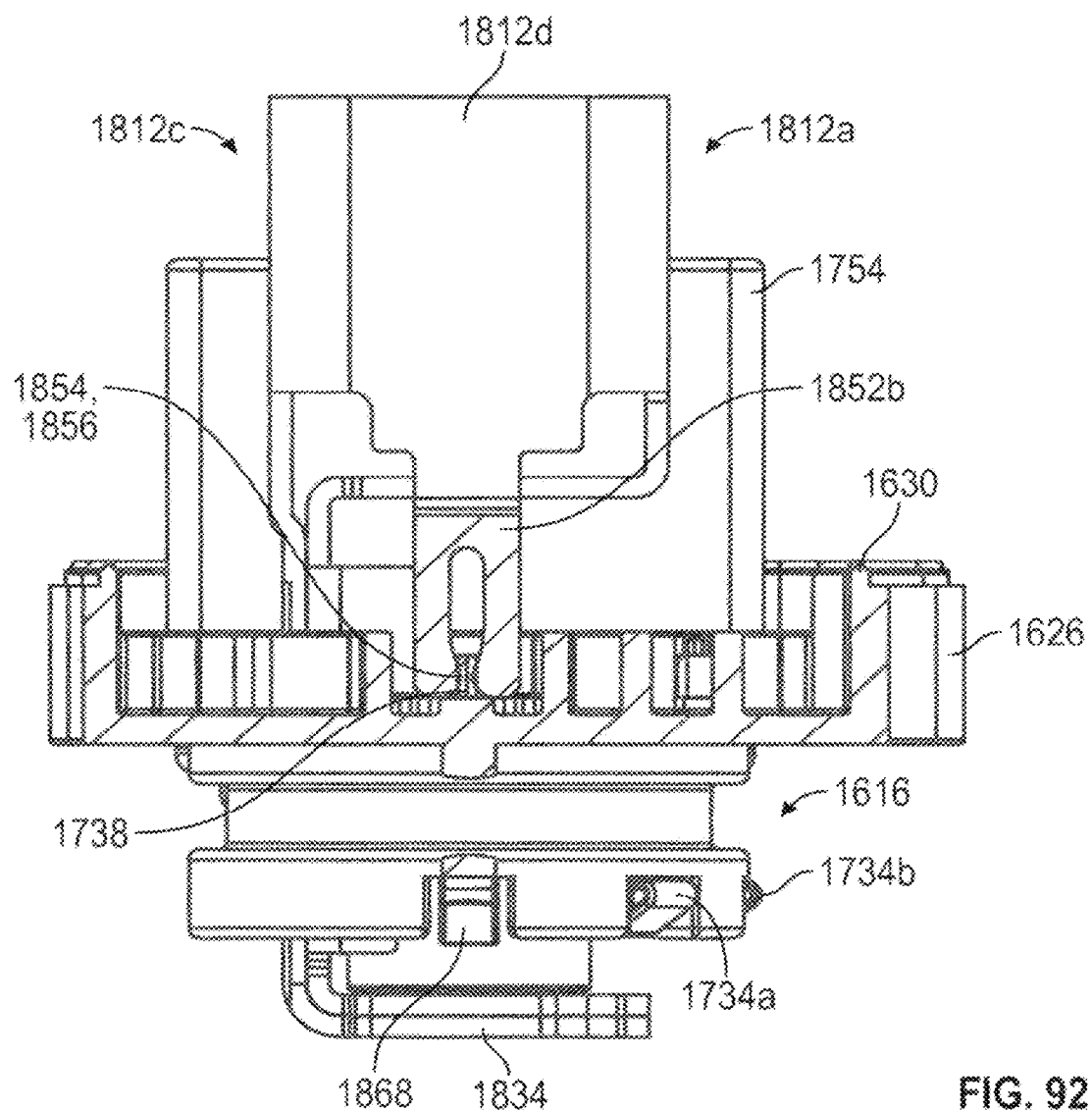
FIG. 92 is a cross-sectional view of the adaptor assembly of FIG. 86 taken along line 92-92 of FIG. 91.
Figure 93:
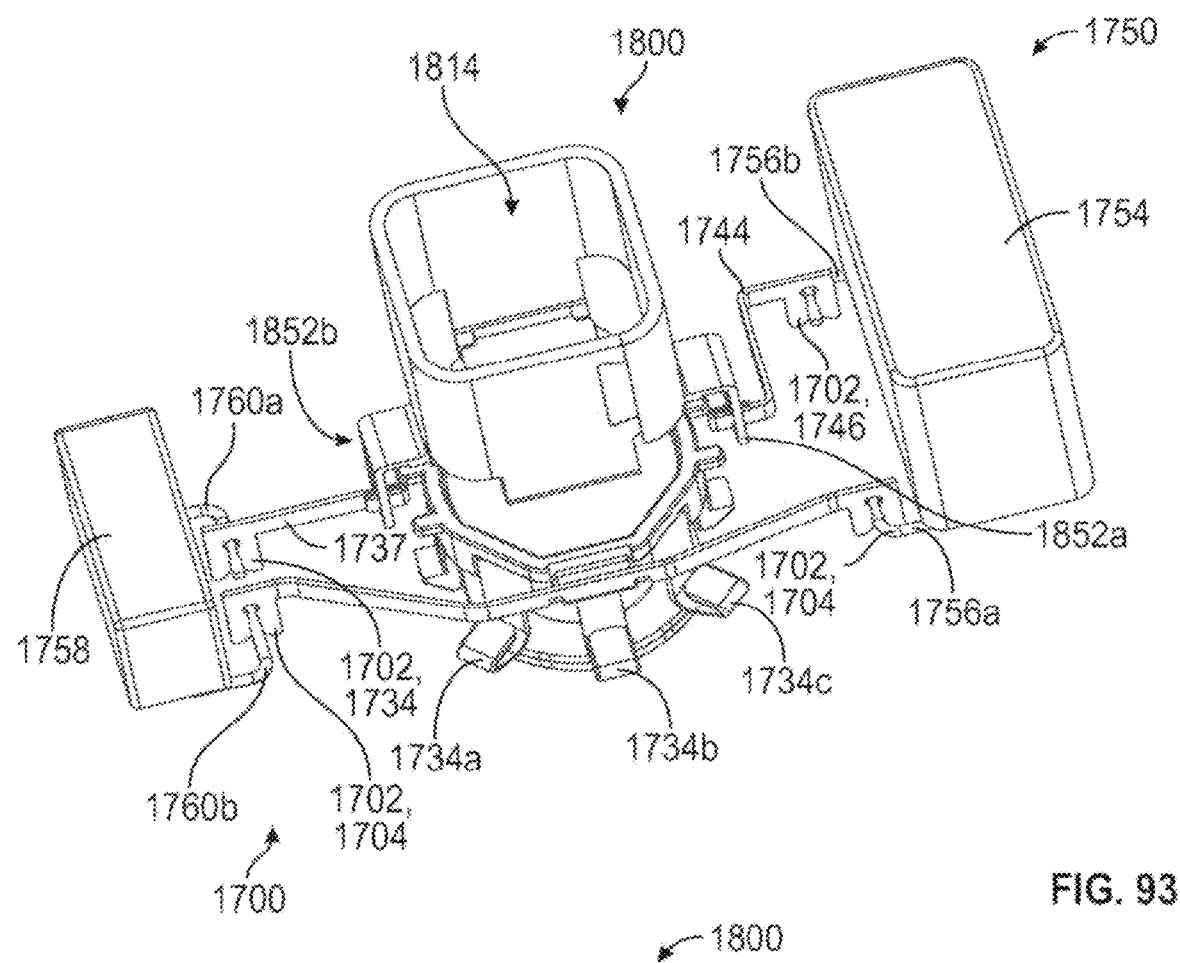
FIG. 93 is a perspective view of a portion of the adaptor assembly of FIG. 86, wherein the lower adaptor housing has been removed to show the coupling of the capacitor assembly, the busbar assembly, and the female terminal assembly.
Figure 94:
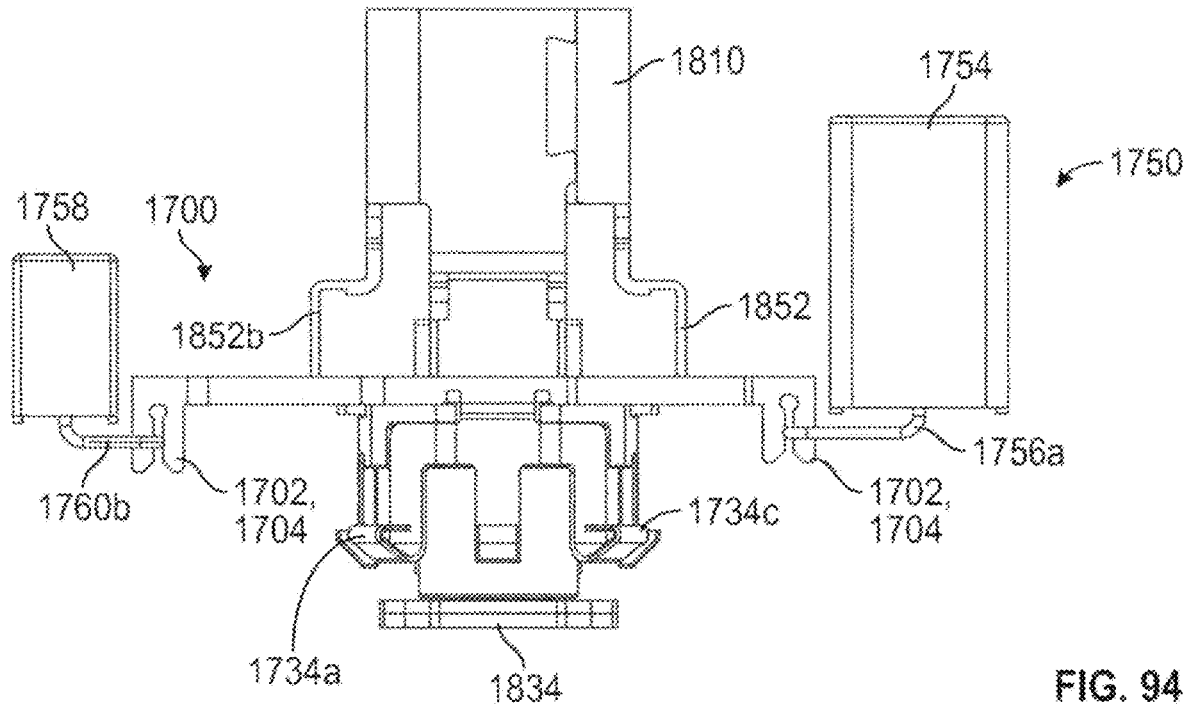
FIG. 94 is a front view of the adaptor assembly of FIG. 93.
Figure 95:
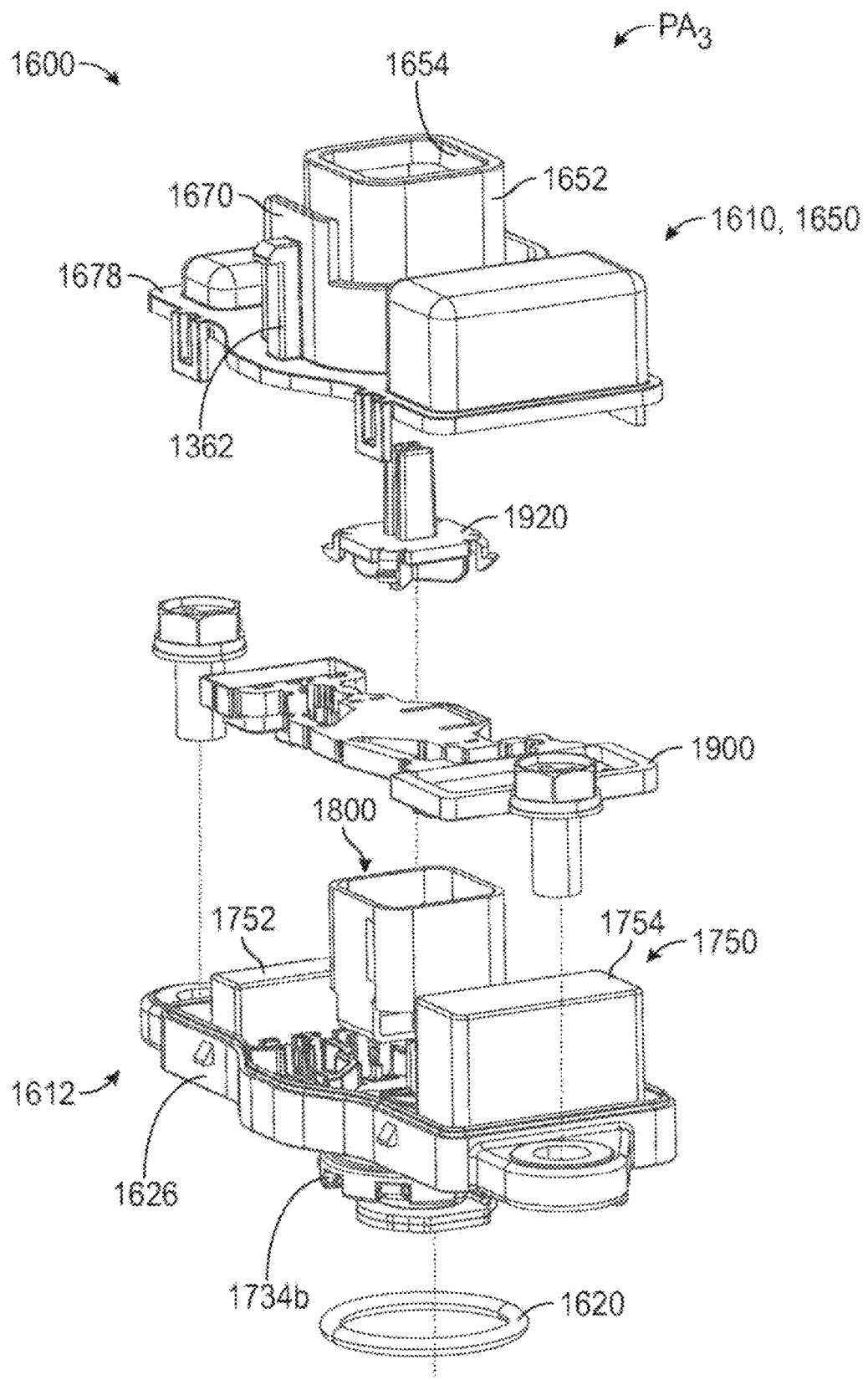
FIG. 95 is a perspective view of the adaptor assembly of FIG. 57 in a third partially assembled state, $PA_3$.
Figure 96:
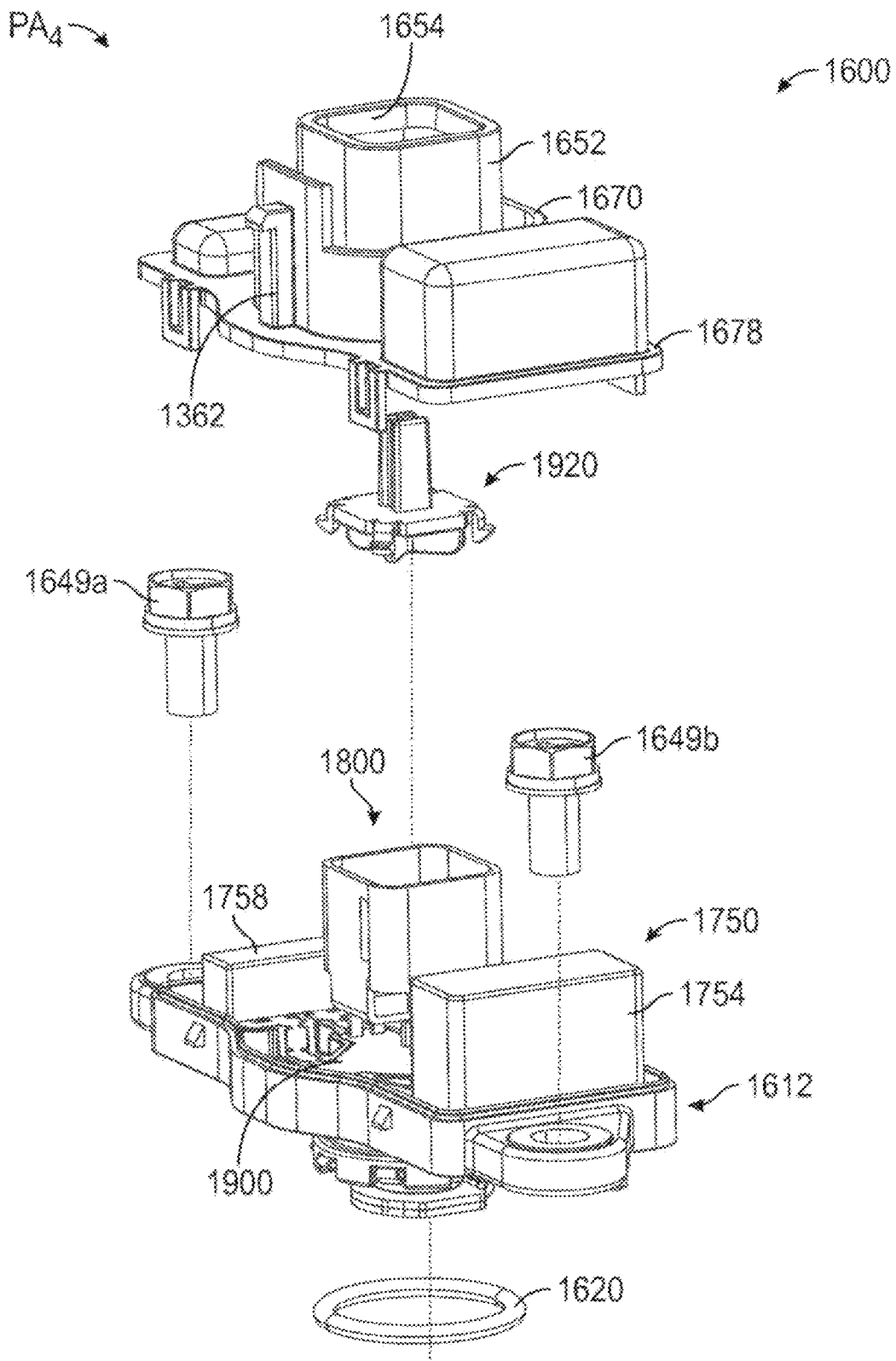
FIG. 96 is a perspective view of the adaptor assembly of FIG. 57 in a fourth partially assembled state, $PA_4$.
Figure 97:
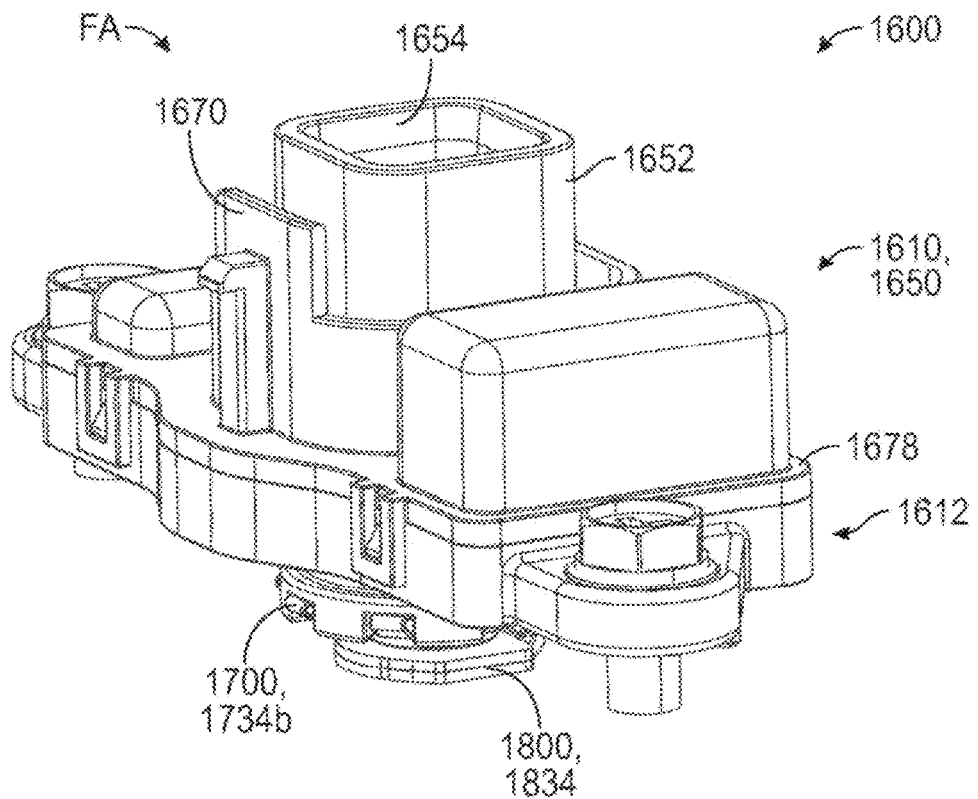
FIG. 97 is a perspective view of the adaptor assembly in a fully assembled state, FA.
Figure 98:
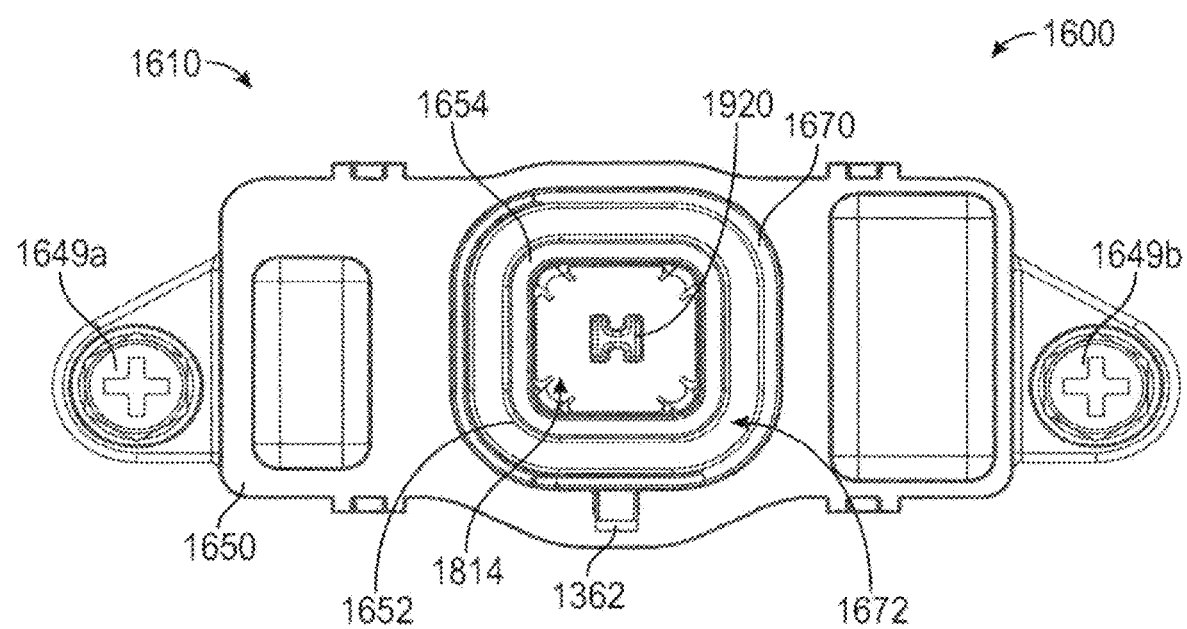
FIG. 98 is a top view of the adaptor assembly of FIG. 97.
Figure 99:
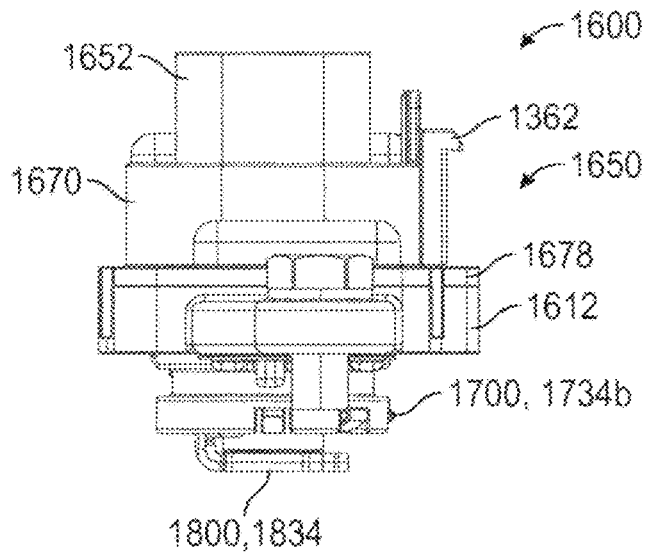
FIG. 99 is an side view of the adaptor assembly of FIG. 97.
Figure 100:
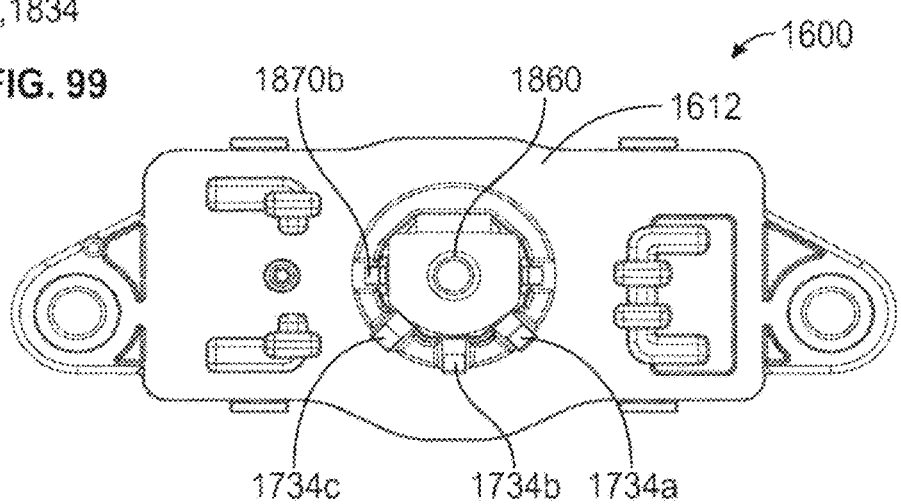
FIG. 100 is a bottom view of the adaptor assembly of FIG. 97.
Figure 101:
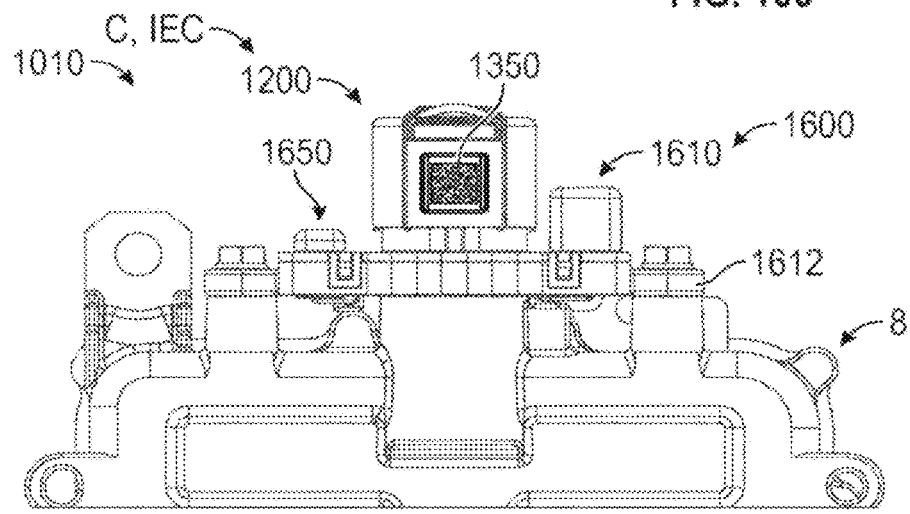
FIG. 101 is a front view of the connector system and the DC-DC converter of FIG. 54.

Similar to the connector assembly 10 as described above, FIGS. 54-105 show another embodiment of an connector assembly 1010. For sake of brevity, the above disclosure in connection with connector assembly 10 will not be repeated below, but it should be understood that across embodiments like numbers represent like structures. For example, the disclosure relating to female terminal assembly 800 applies in equal force to female terminal assembly 1800. Moreover, it is to be understood that any one or more features of the connector assembly 10 can be used in conjunction with those disclosed regarding the connector assembly 1010, and that any one or more features of the connector assembly 1010 can be used in conjunction with those disclosed regarding the connector assembly 10.

The primary differences between the first embodiment of the adaptor assembly 600 and the second embodiment of the adaptor assembly 1600 are: (i) capacitors 1754, 1758 have a different orientation then capacitors 754, 758—namely, capacitors 1754, 1758 have primarily have a vertical orientation and the capacitors 754, 758 primarily have a horizontal orientation, (ii) the busbar assembly 1700 includes multiple busbars 1738, 1744, while busbar 700 only includes one busbar, (iii) female terminal 1810 is indirectly coupled to the capacitors 1754, 1758 via separate busbars, while female terminal 810 is directly coupled to the capacitors 754, 758, (iv) the sealing member 1900 is larger than the sealing member 900, and (v) the number of internal walls contained within the lower housing assembly 1612 is greater than the number of internal walls contained within the lower housing assembly 612.

The vertical orientation and the capacitors 754, 758 does not substantially alter the design of the system 1010 from the system 10 that is shown and disclosed above. Instead, this change in orientation requires minor modifications to be made to the adaptor housing 1610 and bent coupling rods 1756a-1756b, 1760a-1760b. While this vertical orientation of the capacitors 1754, 1758 does not require the additional busbars 1737, 1744 and the alterations to the female terminal coupling means 846, these changes were made to facilitate the assembly of the system 10. In particular, the female terminal coupling means 1846 includes the same basic elements between both embodiments 846, 1846. The only difference between these embodiments 846 and 1846 is that orientation of the female terminal coupling means 1846 is flipped by 180 degrees from the female terminal coupling means 846 and the female terminal coupling means 1846 is now coupled to a busbar 1737, 1744 instead of directly to the coupling rods 1756a-1756b, 1760a-1760b. This alteration to the orientation of the female terminal coupling means 1846 enables the female terminal assembly 800 to be inserted within the system 1010 after the installation of the busbars 1752, 1738, 1744 and the capacitors 1754, 1758. This is beneficial because it allows the female terminal assembly 800 to be inserted within the system 10 at a later time in comparison to the other components, which reduces the chance the terminal assembly 800 will be damaged. It should be understood that in an alternative embodiment, the orientation of the female terminal coupling means 846 may utilize instead of the orientation of the female terminal coupling means 1846 that is disclosed in this embodiment.

The additional busbars 1737, 1744, and specifically the second and third busbars, include the same basic structures that were contained within female terminal coupling means 846. In particular, the second or left busbar 1737 includes: (i) a linear extent 1738 and (ii) a projection 1739 that extends from the linear extent 1738. The projection 1739 has an irregular opening 1740 that is cut or formed therein that is designed to receive an extent of the capacitor assembly 1750. In particular, the irregular opening 1740 has three segments: (i) a v-shaped upper extent 1741a, (ii) a straight extent 1741b, and (iii) a circular lower extent 1741c. The v-shaped upper extent 1741a is designed to have a wider opening to facilitate the coupling of the capacitor assembly 750 to the female terminal body 1810, while the straight extent 1741b is designed to have a narrower opening to keep the capacitor assembly 1750 coupled to the female terminal body 1810. Like the second or left busbar 1737, the right busbar 1744 includes: (i) a linear extent 1745 and (ii) a projection 1746 that extends from the linear extent 1745. The projection 1746 has an irregular opening 1747 that is cut or formed therein that is designed to receive an extent of the capacitor assembly 1750. In particular, the irregular opening 1747 has three segments: (i) a v-shaped upper extent 1748a, (ii) a straight extent 1748b, and (iii) a circular lower extent 1748c. The v-shaped upper extent 1738a is designed to have a wider opening to facilitate the coupling of the capacitor assembly 750 to the female terminal body 1810, while the straight extent 1748b is designed to have a narrower opening to keep the capacitor assembly 1750 coupled to the female terminal body 1810. It should be understood that other structures and designs are contemplated by this disclosure to efficiently and effectively couple the capacitor assembly 1750 to the female terminal body 810.

The assembly of the adaptor assembly 1600 occurs over multiple stages. The first stage in this assembly is assembling the female terminal assembly 1800. This is accomplished by: (i) inserting the catch can 1860 within the catch can retainer 1864 and (ii) placing that combination 1860, 1864 within the female terminal 1810. The next stage in this assembly is installing the capacitor assembly 1750 within the lower adaptor housing 1612 to form the first partially assembled state, $PA_1$. The next stage in this assembly is inserting and seating the busbars 1702, 1737, 1744 within the lower adaptor housing 612 to form the second partially assembled state, $PA_2$. This insertion and seating is achieved by applying a downwardly directed force on each of the busbars 1702, 1737, 1744 in order to position the coupling rods 756a-756b, 760a-760b in the proper extents of the coupling means 702. The next stage in this assembly is installing the female terminal assembly 1800 within the lower adaptor housing 612 to form the third partially assembled state, $PA_3$ Like the insertion and seating of the busbars 1702, 1737, 1744, a downwardly directed force is applied on the female terminal assembly 1800 in order to position the busbars 1702, 1737, 1744 in the proper extents of the female terminal coupling means 846. Next, the sealing member 1900 is poured into the lower adaptor housing 1612 and the material is cured to form a proper seal around the electronic components and create the fourth partially assembled state, $PA_4$. Finally, the upper adaptor housing 1650 is coupled to the lower adaptor housing 1612 via ultrasonic welding to form a fully assembled state, FA. Once the adaptor assembly 1600 is in the fully assembled state, FA, it can be coupled to the DC-DC converter 7 to form an internal electrical connection state, IEC. In particular, this internal electrical connection state, IEC is formed when the second bend 1734a-1734c of the ground connecting portions 1726a-1726c of the busbar 1700 is placed in contact with the inner wall of the DC-DC converter 7.

Once the system 1010 is in this internal electrical connection state, IEC: (i) the female terminal body 1810 is electrically connected to the capacitor assembly 1750 and specifically to at least one the first or second capacitors 1754, 1758, (ii) the capacitor assembly 1750 is electrically connected to the busbar assembly 1700, and (iii) the busbar assembly 1700 is electrically connected to the extent of the component of the power management system 2, which may be a DC-DC converter 7. In this IEC state, each of the three above described electrical connections are sealed from the external environment. In other words, the connection between the female terminal body 1810 and the ground/external case of the DC-DC converter 7 through a pair of capacitors 1754, 1758 is sealed from the sealed from the external environment. While the system 1010 is in the IEC state and prior to coupling the male terminal connector 1200 to the adaptor assembly 1600 to form a connected position, $P_C$, female terminal assembly 1800 is not completely sealed from the external environment.

The above disclosure describes a system 1010 that effectively and efficiently connects the male terminal assembly 1430 to an extent of a DC-DC converter 7. Specifically, the system 1010 couples (i.e., both mechanically and electrically) the male terminal assembly 1430 via the contact arms 1494a-1494h to a female terminal assembly 1800. The female terminal assembly 1800 is coupled between the male terminal assembly 1430 and the pair of capacitors 1754, 1758 that are contained within the capacitor assembly 1750. The capacitor assembly 1750 is coupled between the female terminal assembly 1800 and the busbar assembly 1700. And finally, the busbar assembly 1700 is coupled between the capacitor assembly 1750 and the ground/external case of the DC-DC converter 7. In other words, the system 1010 couples the male terminal assembly 1430 to the ground/external case of the DC-DC converter 7 through a pair of capacitors 1754, 1758. Stated another way, when the system 1010 is in the connected position, $P_C$: (i) male terminal assembly 1430 is electrically connected to the female terminal body 1810, (ii) the female terminal body 1810 is electrically connected to the capacitor assembly 1750 and specifically to at least one the first or second capacitors 1754, 1758, (iii) the capacitor assembly 1750 is electrically connected to the busbar assembly 1700, and (iv) the busbar assembly 1700 is electrically connected to the extent of the component of the power management system 2, which may be a DC-DC converter 7. In this connected position, $P_C$, each of the four above described electrical connections are sealed from the external environment.

The system 10 is a T4/V4/S3/D2/M2, wherein the system 10 meets and exceeds: (i) T4 is exposure of the system 100 to 150° C., (ii) V4 is severe vibration, (iii) S1 is sealed high-pressure spray, (iv) D2 is 200 k mile durability, and (v) M2 is less than 45 Newtons of force is required to connect the male terminal assembly 430 to the female terminal assembly 800. The terminal assemblies 430 shown in the following figures are rated to carry at 55° C. rise over ambient (RoA) or 80° C. with a derating of 80%: (i) FIGS. 1-105 can carry 245 amps with a 50 $mm^2$ wire, 280 amps with a 75 $mm^2$ wire, 330 amps with a 100 $mm^2$ wire, (ii) FIG. 111 can carry 335 amps with a 100 $mm^2$ wire, 365 amps with a 150 $mm^2$ wire, 395 amps with a 200 $mm^2$ wire, (iii) FIG. 112 can carry 190 amps with a 16 $mm^2$ wire, 220 amps with a 25 $mm^2$ wire, 236 amps with a 35 $mm^2$ wire, 245 amps with a 50 $mm^2$ wire, (iv) FIG. 113 can carry 365 amps with a 100 $mm^2$ wire, (v) FIG. 114 can carry 185 amps with a 16 $mm^2$ wire, (vi) FIG. 116 can carry 88 amps with a 16 $mm^2$ wire, and (vii) FIG. 117 can carry 225 amps with a 25 $mm^2$ wire. Additionally, other performance specifications of the system 10 disclosed herein will be obvious to one of skill in the art.

While the figures and disclosure contained herein discuss two different embodiments of the connector system 10, 1010 it should be understood that these are only exemplary embodiments and that other embodiments are possible. For example, any of the embodiments may be modified to include: (i) a shielding that fits within the housing, (ii) a housing that is partially made from conductive plastics, as disclosed within PCT/US2020/13757, (iii) an internal interlock that is disclosed within U.S. Provisional Applications No. 63/058,061, (iv) connector orientation keys disclosed within U.S. Provisional Applications No. 62/988,972.

Further, it should be understood that alternative configurations for connector systems 10, 1010 are possible. For example, any number of male terminal assemblies 430, 1430, 2430, 3430, 4430, 5430, 6430, 7430, 8430 may be positioned within a single male housing assembly 220, 1220. Specifically, the male housing assembly 220, 1220 may be configured to contain multiple (e.g., between 2-30, preferably between 2-8, and most preferably between 2-4) male terminal assemblies 430, 1430, 2430, 3430, 4430, 5430, 6430, 7430, 8430. The female terminal assembly 800, 1800 may be reconfigured to accept these multiple male terminal assemblies into a single female terminal assembly 800, 1800. Alternatively, the female terminal assembly 800, 1800 may be reconfigured to include multiple female terminal assemblies 800, 1800, where each female terminal assembly 800, 1800 receives a single male terminal assemblies 430, 1430, 2430, 3430, 4430, 5430, 6430, 7430, 8430. In other words, the system disclosed herein may include: (i) any number of male terminal assemblies 430, 1430, 2430, 3430, 4430, 5430, 6430, 7430, 8430 and (ii) a number of female terminal assemblies 800, 1800 that is equal to or less than the number of male terminal assemblies 430, 1430, 2430, 3430, 4430, 5430, 6430, 7430, 8430. Also, it should be understood that, if multiple male terminal assemblies 430, 1430, 2430, 3430, 4430, 5430, 6430, 7430, 8430 are utilized, the male terminal assemblies 430, 1430, 2430, 3430, 4430, 5430, 6430, 7430, 8430 may have the same shape, similar shapes, or different shapes.

Moreover, it should also be understood that the male terminal assemblies 430, 1430, 2430, 3430, 4430, 5430, 6430, 7430, 8430 may have any number of contact arms 494, 1494, 2494, 3494, 4494, 5494, 6494, 7494, 8494 (e.g., between 2-100, preferably between 2-50, and most preferably between 2-8) and any number of spring arms 452, 1452, 2452, 3452, 4452, 5452, 6452, 7452, 8452 (e.g., between 2-100, preferably between 2-50, and most preferably between 2-8). As discussed above, the number of contact arms 494, 1494, 2494, 3494, 4494, 5494, 6494, 7494, 8494 may not equal the number of spring arms 452, 1452, 2452, 3452, 4452, 5452, 6452, 7452, 8452. For example, there may be more contact arms 494, 1494, 2494, 3494, 4494, 5494, 6494, 7494, 8494 then spring arms 452, 1452, 2452, 3452, 4452, 5452, 6452, 7452, 8452. Alternatively, there may be less contact arms 494, 1494, 2494, 3494, 4494, 5494, 6494, 7494, 8494 then spring arms 452, 1452, 2452, 3452, 4452, 5452, 6452, 7452, 8452.

MATERIALS AND DISCLOSURE THAT ARE INCORPORATED BY REFERENCE

PCT Application Nos. PCT/US2020/49870, PCT/US2020/50018, PCT/US2020/14484, PCT/US2020/13757, PCT/US2019/36127, PCT/US2019/36070, PCT/US2019/36010, and PCT/US2018/019787, U.S. patent application Ser. No. 16/194,891 and U.S. Provisional Applications 62/897,658 62/897,962, 62/897,962, 62/988,972, 63/051,639 and 63/058,061, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc. Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, an icosahedron, an octahedron, a ellipsoid, or any other similar shape.

It should be understood that the following terms used herein shall generally mean the following:
  a. "High power" shall mean (i) voltage between 20 volts to 600 volts regardless of current or (ii) at any current greater than or equal to 80 amps regardless of voltage.
  b. "High current" shall mean current greater than or equal to 80 amps regardless of voltage.
  c. "High voltage" shall mean a voltage between 20 volts to 600 volts regardless of current.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A connector system coupled to a component of a power management system, the connector system comprising:
    a male connector assembly; and
    an adaptor assembly including:
        a capacitor assembly having at least one capacitor;
        a female terminal assembly having a female terminal that includes: (i) a receptacle, and (ii) a female terminal coupler that electrically couples the female terminal assembly to the at least one capacitor;
        a busbar having: (i) a busbar coupler that is configured to electrically couple the busbar to the at least one capacitor, and (ii) a grounding coupler that is configured to be placed in contact with an extent of the component of the power management system when the adaptor assembly is placed in contact with the component of the power management system to define an internal electrical connection state; and
        wherein in the internal electrical connection state, (i) the female terminal is electrically connected to the at least one capacitor, (ii) the at least one capacitor is electrically connected to the busbar, and (iii) the busbar is electrically connected to the extent of the component of the power management system, and wherein said female terminal, the at least one capacitor and said busbar are sealed from an external environment in the internal electrical connection state.

2. The connector system of claim 1, wherein the female terminal assembly includes a catch can that is configured to prevent material from (i) being dislodged from the component of the power management system and (ii) falling within said component of the power management system.

3. The connector system of claim 1, further comprising an adaptor housing that includes a lower projection that is configured to be inserted within the component of the power management system, and wherein said lower projection has at least one grounding recess formed therein that receives an extent of the busbar.

4. The connector system of claim 1, wherein the female terminal assembly is not completely sealed from the external environment in the internal electrical connection state.

5. The connector system of claim 1, wherein the female terminal coupler includes a projection that has an irregular opening formed therein that receives an extent of the at least one capacitor.

6. The connector system of claim 5, wherein the extent of the at least one capacitor is positioned within the irregular opening using a downwardly directed force that is applied on the at least one capacitor.

7. The connector system of claim 1, wherein the busbar coupler includes a projection that has an irregular opening formed therein that receives an extent of the at least one capacitor.

8. The connector system of claim 7, wherein the extent of the at least one capacitor is positioned within the irregular opening using a downwardly directed force that is applied on the at least one capacitor.

9. The connector system of claim 1, wherein the grounding coupler is comprised of: (i) a linear extent, (ii) at least one deformable leg that is coupled to the linear extent, and (iii) at least one grounding portion that is coupled to the at least one deformable leg.

10. The connector system of claim 9, wherein the at least one grounding portion includes a first extent, a second extent, and a gap that is formed between the second extent and the at least one deformable leg; and wherein when the adaptor assembly is coupled to the component of the power management system, a portion of the second extent of the at least one grounding portion is displaced into the gap.

11. The connector system of claim 1, wherein the male connector assembly includes a male terminal assembly that is received by the receptacle of the female terminal assembly and that includes:
    a male terminal body formed from a first material, the male terminal body having a plurality of elongated contact beams arranged to define a receiver;
    an internal spring member formed from a second material, the internal spring member having a plurality of spring arms; and
    wherein when the internal spring member is inserted into the receiver of the male terminal body, a spring arm of the plurality of spring arms is configured to provide a biasing force on a contact beam of the plurality of elongated contact beams under certain elevated temperature operating conditions of the connector system.

12. The connector system of claim 11, further comprising a male housing assembly that substantially encases the male terminal assembly and includes a connector position assurance assembly having a computer readable indicia.

13. The connector system of claim 11, further comprising (i) an adaptor housing that surrounds an extent of the female terminal assembly and (ii) a male housing assembly that encases a majority of the male terminal assembly; and
    wherein when the male terminal assembly is positioned within the receptacle of the female terminal to define a connected position where the adaptor housing interacts with the male housing assembly to seal the connection between the male terminal assembly and the female terminal assembly from the external environment.

14. The connector system of claim 13, wherein the sealed connection between the male terminal assembly and the female terminal assembly exceeds the requirements of the high pressure spray test of USCAR 2, Revision 6.

15. The connector system of claim 13, wherein the female terminal assembly is not completely sealed from the external environment prior to the connected position and the female terminal assembly is completely sealed from the external environment in the connected position.

16. A component of a power management system for use in a motor vehicle, the power management system component comprising:
    a connector system coupled to the power management system component, the connector system including:
        a male connector assembly; and
        an adaptor assembly including:
            a capacitor assembly having at least one capacitor;
            a female terminal assembly having a female terminal that includes: (i) a receptacle, and (ii) a female terminal coupling means that electrically couples the female terminal assembly to the at least one capacitor;

a busbar having: (i) a busbar coupling means that is configured to electrically couple the busbar to the at least one capacitor, and (ii) a grounding coupler that is configured to be placed in contact with an extent of the component of the power management system when the adaptor assembly is placed in contact with the component of the power management system to define an internal electrical connection state that is sealed from an external environment.

17. The power management system component of claim 16, wherein in the internal electrical connection state, (i) the female terminal is electrically connected to the at least one capacitor, (ii) the at least one capacitor is electrically connected to the busbar, and (iii) the busbar is electrically connected to the extent of the component of the power management system.

18. The power management system component of claim 16, further comprising an adaptor housing that includes a lower projection that is configured to be inserted within the component of the power management system, and wherein said lower projection has at least one grounding recess formed therein that receives an extent of the busbar.

19. The power management system component of claim 16, wherein the grounding coupler is comprised of: (i) a linear extent, (ii) at least one deformable leg that is coupled to the linear extent, and (iii) at least one grounding portion that is coupled to the at least one deformable leg.

20. A power management system for use in a motor vehicle comprising:

a power management system component; and
a connector system coupled to the power management system component, wherein the connector system including:
a male connector assembly; and
an adaptor assembly including:
a capacitor assembly having at least one capacitor;
a female terminal assembly having a female terminal that includes: (i) a receptacle, and (ii) a female terminal coupling means that electrically couples the female terminal assembly to the at least one capacitor;
a busbar having: (i) a busbar coupling means that is configured to electrically couple the busbar to the at least one capacitor, and (ii) a grounding coupler that is configured to be placed in contact with an extent of the component of the power management system when the adaptor assembly is placed in contact with the component of the power management system to define an internal electrical connection state that is sealed from an external environment.

* * * * *